US007292212B2

(12) United States Patent
Makishima et al.

(10) Patent No.: US 7,292,212 B2
(45) Date of Patent: Nov. 6, 2007

(54) LIQUID CRYSTAL DISPLAY DEVICE

(75) Inventors: Tatsuo Makishima, Tokyo (JP); Shinichi Iwasaki, Mobara (JP); Masaaki Kitajima, Hitachioota (JP); Yoshio Oowaki, Mobara (JP); Koji Takahashi, Mobara (JP); Shunsuke Morishita, Mobara (JP)

(73) Assignees: Hitachi, Ltd., Tokyo (JP); Hitachi Device Engineering Co., Ltd., Mobara-shi (JP)

( * ) Notice: Subject to any disclaimer, the term of this patent is extended or adjusted under 35 U.S.C. 154(b) by 394 days.

(21) Appl. No.: 10/973,403

(22) Filed: Oct. 27, 2004

(65) Prior Publication Data

US 2005/0083446 A1 Apr. 21, 2005

Related U.S. Application Data

(63) Continuation of application No. 09/989,171, filed on Nov. 21, 2001, now Pat. No. 6,812,911.

(30) Foreign Application Priority Data

Dec. 4, 2000 (JP) ............................ 2000-372923
Jan. 25, 2001 (JP) ............................ 2001-016504

(51) Int. Cl.
*G09G 3/36* (2006.01)
*G02F 1/1333* (2006.01)

(52) U.S. Cl. ........................ 345/87; 345/103; 349/110; 349/139

(58) Field of Classification Search .................. 345/87, 345/92, 93, 98, 102; 349/110, 139–143, 349/146
See application file for complete search history.

(56) References Cited

U.S. PATENT DOCUMENTS

| | | | |
|---|---|---|---|
| 5,392,143 A * | 2/1995 | Akiyama et al. | 349/55 |
| 6,166,726 A | 12/2000 | Uchida | |
| 6,226,061 B1 * | 5/2001 | Tagusa | 349/84 |
| 6,271,819 B1 | 8/2001 | Fujita | |
| 6,522,379 B1 * | 2/2003 | Ishihara et al. | 349/139 |
| 6,633,272 B1 | 10/2003 | Kumagawa et al. | |
| 6,738,120 B1 * | 5/2004 | Song et al. | 349/139 |
| 6,812,911 B2 * | 11/2004 | Makishima et al. | 345/92 |
| 2001/0011979 A1 | 8/2001 | Hasegawa et al. | |

(Continued)

FOREIGN PATENT DOCUMENTS

EP 0 881 622 12/1998

(Continued)

*Primary Examiner*—Henry N Tran
(74) *Attorney, Agent, or Firm*—Antonelli, Terry, Stout & Kraus, LLP.

(57) ABSTRACT

A liquid crystal display device having first and second substrates with a liquid crystal layer therebetween, a plurality of scanning signal lines and a plurality of video signal lines formed on the first substrate, and a plurality of thin film transistors formed proximate to a crossing point of the scanning signal lines and video signal lines. A light shielding layer is formed on the second substrate and overlapped with at least one of the thin film transistors and with at least one signal line of the scanning signal lines and the video signal lines in plane view. The light shielding layer has an aperture region which is formed proximate to the at least one thin film transistor and formed within the at least one signal line in plane view.

6 Claims, 40 Drawing Sheets

U.S. PATENT DOCUMENTS

2002/0196223 A1 12/2002 Takahashi et al.

FOREIGN PATENT DOCUMENTS

| | | |
|---|---|---|
| GB | 2341713 | 3/2000 |
| JP | 11-14961 | 5/1989 |
| JP | 2-272490 | 11/1990 |
| JP | 9-269476 | 10/1997 |

* cited by examiner

LIQUID CRYSTAL DISPLAY DEVICE

CROSS REFERENCE TO RELATED APPLICATION

This is a continuation of U.S. application Ser. No. 09/989,171, filed Nov. 21, 2001, now U.S. Pat. No. 6,812,911, the subject matter of which is incorporated by reference herein.

BACKGROUND OF THE INVENTION

1. Field of the Invention

The present invention relates to a liquid crystal display device, and more particularly, to an image display device which uses this liquid crystal display device.

2. Description of the Related Art

Liquid crystal display devices have been popularly used because of their characteristics that they are thin in configuration and exhibit the low power consumption. Particularly, a liquid crystal display device having active elements has a function of selectively giving potentials to respective pixel electrodes and holding such potentials and hence, the liquid crystal display device exhibits superior images compared with a liquid crystal display device of a type which has no active elements. Accordingly, the liquid crystal display devices of an active element type have been popularly used.

Further, as an image display device, an image display device which uses a so-called cathode ray tube has been known. Similarly, an image display device which uses a liquid crystal display device has been also known. The latter image display device exhibits less flickering compared with the image display device which uses the cathode ray tube and hence, images provided by the liquid crystal display device are gentle to human eyes. As the image display device using such a liquid crystal display device, versatile image display devices including liquid crystal monitors, notebook type personal computers, liquid crystal television sets, liquid crystal integral type personal computers PDAs and the like have been commercialized.

However, as a result of studies that inventors of the present application have extensively carried out, the inventors have found a new task that, with respect to the liquid crystal display device having active elements, when the operation is stopped, that is, when the supplying of power from the outside is stopped and thereafter the liquid crystal display device is again shifted to the operational state, there exists a case that a so-called flickering, that is, the strong unsteady shining of the screen appears.

The inventors also have found that this phenomenon is noticeable when the time counted from the stop of supplying of power to the supplying of power again is relatively short.

The inventors also have found that the above-mentioned phenomenon is further noticeable when the liquid crystal display device adopts a constitution in which an insulation layer is interposed between pixel electrodes and an orientation film or a constitution in which pixel electrodes and reference electrodes are provided on the same substrate and an insulation layer is interposed between layers forming these pixel electrodes and the reference electrodes.

A typical example of advantages brought about by the use of the liquid crystal display device in place of the cathode ray tube in the image display device is that the image display device exhibits the least flickering in addition to the previously-mentioned thin configuration and the low power consumption. However, the inventors have found that when the time for interruption of the supplying of power to the liquid crystal display device and the time for supplying power to the liquid crystal display device again in the image display device are short, even in the image display device using the liquid crystal display device, there exists a case in which the flickering is generated for several seconds to several 10 s seconds immediately after power is supplied again. This gives rise to a crucial task that the liquid crystal display device may loose one of advantages thereof and hence, the inventors have made efforts to solve the phenomenon of this task and to cope with the task.

As a result of our efforts, we have found that following phenomena which will be explained in detail are main causes of the task.

In the liquid crystal display device having active elements, when selection potentials for making the active elements have the ON state are applied to scanning signal lines, the potentials are selectively written in the pixel electrodes and, for the most of the time, non-selection potentials for making active elements have the OFF state are applied to the scanning signal lines so that the voltage applied in the ON state is held. The reason that the active elements are in the OFF state in most of the time is that since the liquid crystal display device usually sequentially and selectively drive a plurality of scanning signal lines, in the liquid crystal display device which corresponds to XGA having at least 768 scanning signal lines, for example, it is a general driving method that the time in which the OFF state is selected is (768-1) times longer than the time in which the ON state is selected.

Further, to prevent the deterioration of the liquid crystal material, the liquid crystal display device usually converts the potential applied between the pixel electrodes and the reference electrodes into an alternating current so as to prevent the direct current voltage from being continuously applied for a long time. However, this advantageous effect is merely obtained by inverting the polarity of the potential applied between the pixel electrodes and the reference electrode per one or a plurality of unit frames and hence, the effect only aims at the prevention of the applying of direct current voltage as the average for a long time. Accordingly, the fact that the substantially fixed voltage is applied to the pixel electrodes is not changed when viewed per each unit frame.

Further, the drive to invert the polarity of the potential applied between the pixel electrodes and the reference electrode per one or a plurality of unit frames can be performed only when power is supplied to the liquid crystal display device. That is, after such supplying of power is stopped, the applying of the approximately fixed potential to the pixel electrodes is continued. Then, at a point of time that the pixel electrodes are held at the OFF state due to the active elements, the pixel electrodes of the liquid crystal display device to which the supplying of power is interrupted are held at the OFF state for a relatively long time so that the applying of the fixed potential to the pixel electrodes is continued for a long time.

On the other hand, the potential is usually directly supplied to the reference electrode without through the active elements which are provided to respective pixels and hence, contrary to the pixel electrodes, after the supplying of power to the liquid crystal display device is stopped, the reference electrode immediately reaches the GND potential.

As a result, in the liquid crystal display device having active elements, when the supplying of power to the liquid crystal display device is stopped, the direct current potential difference is applied between the pixel electrodes and the reference electrode for a long time and the pixels are charged to the direct current. Accordingly, it has been found that even when power is supplied to the liquid crystal display device again, the potential between the pixel electrodes and the reference electrode at this point of time is driven in a mode that alternating current signals are superposed on the remaining direct current potential so that the imbalance is generated with respect to the liquid crystal drive voltage between polarities thus generating the flickering.

Further, it is found that the following is the reason that the generation of flickering is noticeable when the time counted from the stop of supplying of power to the restarting of supplying of power is relatively short. That is, when the supplying of power to the liquid crystal display device is stopped and a long time elapses thereafter, the potential of the scanning signal lines is converged to the GND state so that the leaking of charge stored in the pixel electrodes is generated through the active elements although a leaking amount is minute. Accordingly, when power is supplied to the liquid crystal display device again after the charge stored in the pixel electrodes is completely leaked, since the holding of the above-mentioned direct current potential between the pixel electrodes and the reference electrode is dissolved, no flickering is generated. Accordingly, when the time counted from the stop of supplying of power to the restarting of supplying of power is relatively short, the flickering is recognized noticeable in appearance.

It is also found that when the orientation film is arranged over the pixel electrodes, the orientation film performs the function of trapping the charge so that the above-mentioned flickering phenomenon is worsened.

It is further found that when an insulation layer is interposed between the pixel electrodes and the orientation film or when the pixel electrodes and the reference electrode are formed on the same substrate and an insulation layer is interposed between the pixel-electrode forming layers and the reference electrode-forming layers, these layers perform the function of trapping the charge and hence, the flickering phenomenon is further worsened.

Particularly, with respect to the liquid crystal display device in which the insulation layer is interposed between the pixel electrodes and the orientation film or the pixel electrodes and the reference electrode are formed on the same substrate and the insulation layer is interposed between the pixel-electrode forming layers and the reference electrode-forming layers, such a liquid crystal display device has been known as a device which can realize the wide viewing angle and hence, the further development of the device is expected as a device used for a liquid crystal monitor or a liquid crystal television set while substituting for a cathode ray tube. The fact that the flickering characteristics is further worsened in the liquid crystal display device having such a constitution constitutes an extremely crucial problem.

SUMMARY OF THE INVENTION

The present invention has been made in view of such circumstances and it is an object of the present invention to provide a liquid crystal display device which can suppress the generation of flickering when power is supplied again to the liquid crystal display device after the interruption of the supplying of power to the liquid crystal display device, and more particularly to an image display device which can suppress the generation of flickering by using such a liquid crystal display device.

The above-mentioned task to be solved is newly found by the same applicant of the present application and this task is described in detail along with means which can overcome the task in Japanese Patent Application 2000-372923 which is a prior application filed by the same applicant.

However, with respect to gate driver ICs or a gate driver circuit, some of them have a constitution which can elevate the gate OFF level but up to only the reference logic potential. Since the reference logic potential is usually at the GND level, that is, it is impossible to elevate the gate OFF level more than the GND level so that the liquid crystal display device which uses the gate driver ICs or the gate drive circuit having such a constitution has to face a new task that the flickering suppression effect is reduced.

Accordingly, it is another object of the present invention to provide a liquid crystal display device having gate drivers ICs or a gate drive circuit of a constitution which can elevate the gate OFF level only up to the reference logic potential or cannot elevate the gate OFF level to the reference logic potential, wherein the liquid crystal display device can suppress the generation of flickering when the supplying of power to the liquid crystal display device is restarted after the interruption of the supplying of power to the liquid crystal display device and to provide an image display device which can suppress the generation of flickering using such a liquid crystal display device.

To explain some typical inventions among inventions disclosed in the present application, they are as follows.

Means 1.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the potential of the scanning signal lines after the supplying of power to the liquid crystal display device from the outside is stopped is set to not less than GND level.

Means 2.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the potential of the scanning signal lines, after the supplying of power to the liquid crystal display device from the outside is stopped, has a mountain-like characteristic that the potential is once elevated after the supplying of power and thereafter is stopped and is converged to the GND level.

Means 3.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the liquid crystal display device includes a circuit which changes over the potential of the scanning signal lines after stopping the supplying of power to the liquid crystal display device from the outside to a potential which differs from the potential of the scanning signal lines in the normal drive state in which power is supplied to the liquid crystal display device.

Means 4.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which-are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the potential of the scanning signal lines is applied by a scanning signal line drive circuit and the scanning signal line drive circuit includes an input terminal to which power for non-selection potential of the scanning signal lines is supplied, the improvement is characterized in that the liquid crystal display device includes a circuit which changes over an input voltage to the input terminal to which power for non-selection potential is supplied after stopping the supplying of power to the liquid crystal display device from the outside with the input voltage to an input voltage which differs from the input terminal in the normal drive state.

Means 5.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the potential of the scanning signal lines is applied by a scanning signal line drive circuit and the scanning signal line drive circuit includes an input terminal to which power for non-selection potential of the scanning signal lines is supplied, the improvement is characterized in that the liquid crystal display device includes a circuit which changes an input voltage to the input terminal to which power for non-selection potential of the scanning signal lines is supplied after the supplying of power to the liquid crystal display device from the outside is stopped to a value which is different from the input voltage to the input terminal in the normal drive state and the circuit includes a Zener diode.

Means 6.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the potential of the scanning signal lines is applied by a scanning signal line drive circuit and the scanning signal line drive circuit includes an input terminal to which power for non-selection potential of the scanning signal lines is supplied, the improvement is characterized in that the potential of the input terminal to which power for non-selection potential of the scanning signal lines is supplied assumes a state in which the potential of the input terminal is set to not less than GND level after stopping of the supplying of power to the liquid crystal display device from the outside.

Means 7.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the potential of the scanning sign al lines is applied by a scanning signal line drive circuit and the scanning signal line drive circuit includes an input terminal to which power for non-selection potential of the scanning signal lines is supplied, the improvement is characterized in that the potential of the input terminal to which power for non-selection potential of the scanning signal lines is supplied has a mountain-like characteristic that the potential is once elevated after stopping the supplying of power to the liquid crystal display device from the outside and thereafter is converged.

Means 8.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the charge of the pixel electrodes is rapidly released at a point of time that the supplying of power to the liquid crystal display device from the outside is stopped.

Means 9.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the holding of charge in the pixel electrodes is suppressed at a point of time that the supplying of power to the liquid crystal display device from the outside is stopped so as to prevent the generation of flickering at a point of time that power is again supplied to the liquid crystal display device.

Means 10.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the liquid crystal display device performs a display by generating the potential difference between the pixel electrodes and the reference electrode, the improvement is characterized in that the potential of the pixel electrodes is reset at a point of time that the supplying of power to the liquid crystal display device from the outside is stopped.

Means 11.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the potential of the scanning signal lines is applied by a scanning signal line drive circuit and the scanning signal line drive circuit includes a non-selection potential input terminal for the scanning signal lines and a reference logic potential input terminal, the improvement is characterized in that the potentials of the non-selection potential input terminal and the reference logic potential input terminal of the liquid crystal display device have a mountain-like characteristic that the potentials are once elevated after stopping the supplying of power to the liquid crystal display device from the outside and thereafter are lowered and the potential of the reference logic potential input terminal is set to a value not less than the potential of the non-selection potential input terminal.

With respect to scanning signal line drive circuits of the liquid crystal display devices, for example, gate driver ICs which are constituted of semiconductor chips or gate drive circuits which are constituted of semiconductors having crystallinity such as polysilicon, crystalline silicon or the like mounted on the substrates, some of them may be constituted such that a gate OFF level can be elevated only to the reference logic potential level. Usually, the reference logic potential level is set to GND level. Accordingly, in the liquid crystal display device having such a constitution, the gate OFF level can be elevated only to the GND level, that is, to 0 V.

Accordingly, in the liquid crystal display device using the scanning signal line drive circuit having the constitution which holds the gate OFF level state after stopping the supplying of power to the liquid crystal display device, it is impossible to sufficiently release the charge stored in the pixel electrodes after stopping the supplying of power from the outside. This is because that the it is impossible to bring the active elements into the complete ON state. In view of the above, the inventors have found a task that the effect to suppress the flickering at the time of interrupting the supplying of power or at the time of restarting the supplying of power becomes insufficient.

In view of the above, in the present invention, the reference logic potential of the scanning signal line drive circuit is separated from the GND level and the reference logic potential is configured to be controllable so that the above-mentioned task can be solved. By controlling the reference logic potential of the scanning signal line drive circuit in the above-mentioned manner, it becomes possible to elevate the gate OFF potential up to the ON potential of the TFT while holding the gate OFF potential to a value equal to or below the reference logic potential level so that the charge stored in the pixel electrodes of the liquid crystal display device can be released.

Here, it is needless to say that the advantageous effect of the present invention can be obtained even when the reference logic potential level of the scanning signal line drive circuit is always set to a constant value substantially equal to the ON potential of the TFT. However, from a viewpoint of the reduction of the power consumption, it is desirable that the reference logic potential level takes the usual GND level, that is, 0 V when power is supplied from the outside, reaches the state not less than the ON potential of the TFT after stopping of the supplying of power, and is converged to O V again thereafter so that both of the reduction of the power consumption and the flicker reduction effect can be achieved.

Means 12.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the potential of the scanning signal lines is applied by a scanning signal line drive circuit, the improvement is characterized in that the potential of the reference electrode becomes a negative potential after stopping the supplying of power to the liquid crystal display device from the outside.

To suppress the flickering which is generated at the time of cutting the supplying of power or at the time of supplying power again, it is sufficient to release the charge stored in the pixel electrodes at the time of cutting the supplying of power. To achieve such an aim, it is necessary to set the active elements to the ON state after stopping the supplying of power. In addition to a method which sets the potential of the scanning signal lines to the ON state, it becomes possible to set the active elements to the ON state by lowering the potential of the pixel electrodes to a value not more than a given value for the potential of the scanning signal lines. Usually, the potential of the pixel electrodes is the potential which is written when the active elements are in the ON state and cannot be directly changed when the active elements are in the OFF state.

However, since the capacitance is generated between the pixel electrodes and the reference electrode, by changing the potential of the reference electrode, the potential of the pixel electrodes can be changed due to the capacitive coupling. In this case, the reference electrode is mounted on a substrate which faces the pixel electrodes in an opposed manner as an inevitable component in a so-called vertical electric field system. Further, a reference signal line may be formed on the same substrate on which the pixel electrodes are formed and the holding capacitance is generated between the reference signal line and the pixel electrodes. Further, in a so-called lateral electric field system, the reference electrode is formed on the same substrate on which the pixel electrodes are mounted and the holding capacitance is generated between the pixel electrodes and the reference electrode or the reference signal line to which the reference electrode is connected.

By lowering the potential of the reference electrode below the level in the usual drive state such that the potential takes a value not more than a given negative value, the potential of the pixel electrodes is lowered due to the capacitive coupling. As a result, it becomes possible to realize the state in which the potential of the scanning signal lines is elevated to a voltage which enables the potential of the pixel electrodes to make the active elements assume the ON state. In this state, the charge stored in the pixel electrodes is rapidly released and the potential of the pixel electrodes rapidly approaches the potential of the reference electrode. Accordingly, it becomes possible to prevent the generation of flickering at the time of restarting the supplying of power.

Means 13.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the potential of the scanning signal lines is applied by a scanning signal line drive circuit and the scanning signal line drive circuit has a mode setting function which is capable of selecting either the state in which the scanning signal lines are sequentially selected or the state in which the scanning signal lines are simultaneously selected, the improvement is characterized in that the mode setting function has a state in which the scanning signal lines are set to a simultaneous selection after stopping the supplying of power to the liquid crystal display device from the outside.

Due to such a constitution, since all scanning signal lines assume the ON state after the interruption of the supplying of power to the liquid crystal display device, it becomes possible to rapidly release the charge from the pixel electrodes.

Means 14.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the potential of the scanning signal lines is applied by a scanning signal line drive circuit, the position of the selected scanning signal line is determined in response to selection signal data inputted to the scanning signal line drive circuit, and the liquid crystal display device includes a control circuit which generates at least a clock which is inputted to the scanning signal drive circuit, the improvement is characterized in that the control circuit has a self-running mode in which the control circuits makes the clock continuously oscillated even in the state that signals are not inputted to the control circuit, and the selection signal data has the state in which the potential for instructing the selection after stopping the supplying of power to the liquid crystal display device from the outside is continuously held.

Various signals and clocks which are supplied to the video signal line drive circuit and the scanning signal line drive circuit in the inside of the liquid crystal display device are supplied through a control circuit (usually referred to as TCON:TFT Controller). The TCON is roughly classified into two kinds wherein one stops the output irrespective of the power supply when the input signals are stopped and the other which enters a self-running mode which generates existing signals or clocks when the input signals are stopped. Particularly, in the liquid crystal display device which adopts the TCOM having the latter self-running mode, even after the supplying of power is stopped, it is possible to make given clocks or signals oscillated until the potential of power for operation is lowered to a value equal to or below the operable potential. The length of time which enables such an oscillation can be set to a desired value of several ms to several seconds by providing a capacitor td the power supply which supplies power to the control circuit. Here, by holding the selection signal data at the selection potential, the number of scanning signal lines in the selection state can be increased for every clock so that the selection state of all lines can be realized eventually. Further, the clock in the self-running mode may elevate the frequency compared with the clocks in the usual operation mode and hence, all selected mode can be obtained in a further shorter time in this case. Accordingly, the charge stored in the pixel electrodes can be released so that the flickering can be suppressed.

Means 15.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements which are all mounted on one substrate, an orientation film which is inserted between the pixel electrodes and the liquid crystal layer and reference electrodes which are mounted on either one or the other substrate, wherein the potential of the scanning signal lines is applied by a scanning signal line drive circuit, the position of the selection scanning signal line is determined in response to selection signal data inputted to the scanning signal line drive circuit, and the liquid crystal display device includes a control circuit which generates at least a clock which is inputted to the scanning signal drive circuit, the improvement is characterized in that the control circuit has a self-running mode in which the control circuits makes the clock continuously oscillated even in the state that signals are not inputted to the control circuit, and the scanning signal line drive circuit is comprised of a plurality of groups of scanning signal line drive circuits and logic elements are provided between the groups of scanning signal line drive circuits, and the selection signal data are supplied in parallel to a plurality of groups of scanning signal line drive circuits by making the logic elements continuously assume the ON state after stopping the supplying of power to the liquid crystal display device from the outside.

Usually, the groups of the scanning signal line drive circuits, for example, gate driver ICs are connected in a cascade connection, wherein when the scanning performed by supplying the selection signal to the nth IC is finished, the selection signal is applied to the (n+1)th IC and the scanning signal line corresponding to the (n+1)th IC is sequentially selected. By constituting the logic circuits such that the logic circuit is provided to this signal interface part between the ICs and the selected signals are inputted to the respective ICs in parallel at the time of interrupting the supplying of power from the outside, the number of the scanning signal lines in the state that the respective ICs are simultaneously selected is increased for every inputting of clock and soon the full selection state is obtained. According to the constitution of this means, the time necessary for obtaining the full selection state using the means 4 can be reduced. For example, when the number of the gate driver ICs is three, the full selection state can be obtained within a time which is approximately ⅓ of the time necessary when the means 4 is used, and when the number of the gate driver ICs is six, the full selection state can be obtained within a time which is approximately ⅙ of the time necessary when the means 4 is used. Accordingly, the charge of the pixel electrodes can be rapidly released. At the same time, this implies that the operation continuation time of the TCON after the interruption of the supplying of power can be shortened. Accordingly, when a capacitor which supplies the potential for operating the TCON after the interruption of the supplying of power is provided, the capacitance can be reduced so that the low power consumption can be realized by an amount that the electric power stored in the capacitor is reduced.

Means 16.

In a liquid crystal display device including first and second substrates which are arranged to face each other in an opposed manner, a liquid crystal layer which is inserted between the first and second substrates, active elements, scanning signal lines for operating the active elements and pixel electrodes to which video signals are supplied upon operation of the active elements, video signal lines to which video signals are supplied and an orientation film which is inserted between the pixel electrodes and the liquid crystal layer which are all mounted on one substrate, and reference electrodes which are mounted on either one or the other substrate, wherein the potential of the scanning signal lines is applied by a scanning signal line drive circuit, the potential of the video signal lines is applied by a video signal drive circuit, and the polarity of the potential applied to the video signal lines from the video signal line drive circuit for the potential applied to the reference electrode is different between the neighboring video signal lines, the improvement is characterized in that the video signal line drive circuit has a function of changing over the state to a state in which the same potential is outputted to the neighboring video signal lines and the video signal line drive circuit has a state in which the function is performed after the interruption of the supplying of power to the liquid crystal display device from the outside so that the same given potential is applied to the neighboring video signal lines.

Here, by setting the given potential to the potential of the reference electrode, the subsequent storage of the charge to the pixel electrodes can be prevented. Further, by combining the above-mentioned provision with a technique which brings the scanning signal lines into the selection state, the release of the charge from the pixel electrodes can be surely realized.

By adopting at least one of the above-mentioned means, it becomes possible to suppress the holding of the charge in the pixel electrodes and hence, the liquid crystal display device which can solve the task of the present application and the image display device which can solve the task of the present application can be realized.

Further means and advantageous effects of the present invention will be apparent hereinafter in the following description including claims.

DESCRIPTION OF THE PREFERRED EMBODIMENTS

Preferred embodiments of a liquid crystal display device and an image display device according to a present invention are explained in conjunction with attached drawings hereinafter.

Embodiment 1

The inventors have found that, with respect to the liquid crystal display device having active elements, when the operation is stopped, that is, after the supplying of power from the outside is stopped and thereafter the liquid crystal display device is again shifted to the operational state, there exists a case that a so-called flickering, that is, the flickering of the screen appears.

Particularly, the inventors also have found that this phenomenon is noticeable when the time counted from the stop of supplying of power to the supplying of power again is relatively short.

Figure 41:
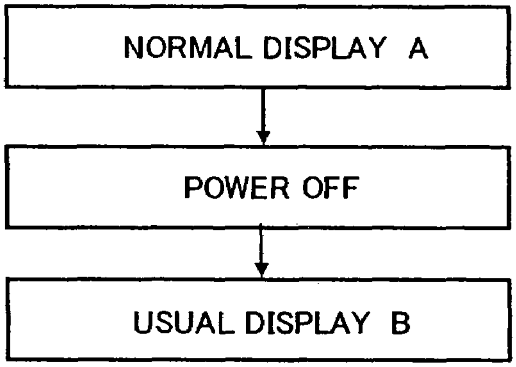
FIG. 41 is a view for explaining an example which generates a task of the present invention.

FIG. 41 shows an example in which such a phenomenon is generated. In a usual display state which is indicated by a normal display A, the flickering is not generated. However, when the supplying of power to the liquid crystal display device is once stopped, that is, the liquid crystal display device assumes a state in which the supplying of power is cut and thereafter the liquid crystal display device again returns to the usual display state which is indicated by a usual display B, there may be a case that a strong unsteady shining, that is, a so-called flickering is generated. The inventors have found that this phenomenon is particularly noticeable when the time counted from the stop of supplying of power to the restarting of supplying of power is relatively short.

Figure 42:
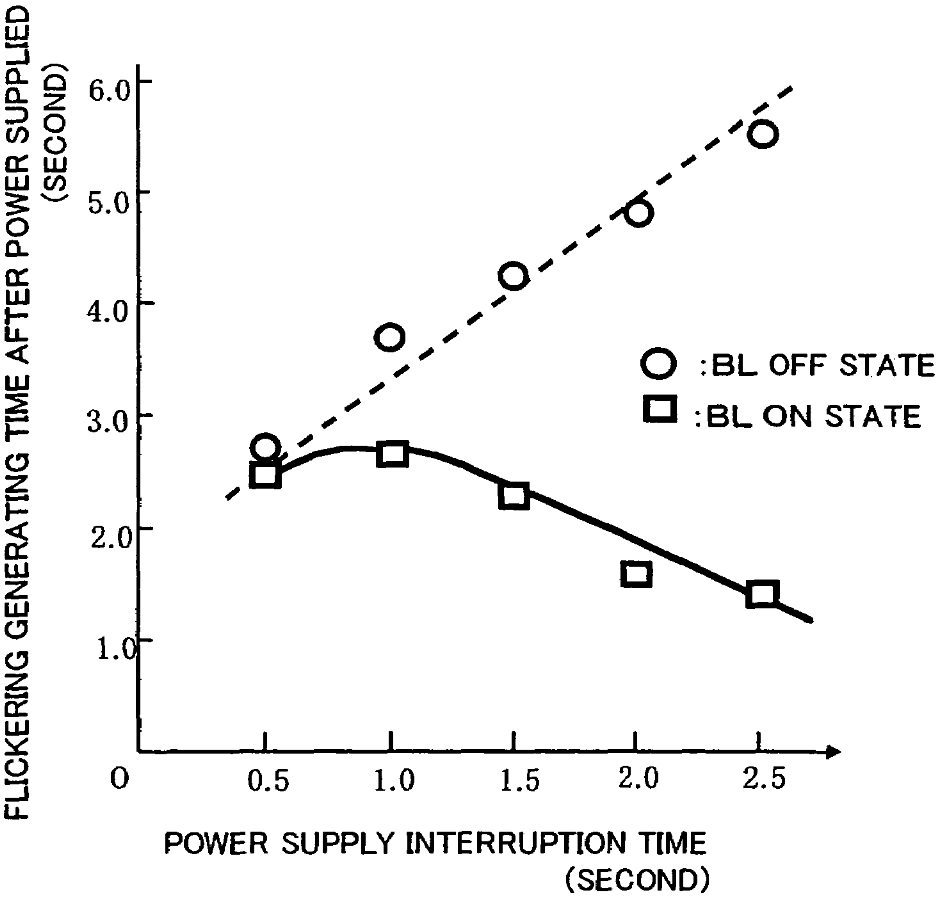
FIG. 42 is a view showing one example of a task of the present invention.

FIG. 42 shows an example of the evaluation which indicates the flickering generating time after power is supplied again provided that the power supply interruption time, that is, the power supply cut state is short. When the interruption of supplying of power is performed with a backlight in the ON state, the longer the power supply interruption time, the flicker generating time after the restarting of supplying of power, that is, the flicker generating time at the point of time that the usual display state indicated by the usual display B shown in FIG. 41 is restarted is increased. Although not shown in the drawing, the inventors have found that the flickering generating time after the restarting of supplying of power exhibits the maximum value when the power supply interruption time is approximately 5 minutes and thereafter is decreased and the flickering is no more generated when the power supply interruption time exceeds 1 hour. The inventors also have found that when the interruption of the supplying of power is performed with the backlight BL in the ON state, within a range that the power interruption time exceeds 1 second, the flickering generation time after the restarting of the supplying of power is reduced corresponding to the increase of the interruption time.

The inventors have found that following phenomena which will be explained in detail are main causes of such a phenomenon. That is, in the liquid crystal display device having active elements, when selection potentials for making active elements have the ON state are applied to scanning signal lines, the potentials are selectively written in the pixel electrodes. Further, for most of the time, non-selection potentials for making active elements have the OFF state are applied to the scanning signal lines so that the voltage which is applied in the ON state is held. The reason that the active elements are in the OFF state in most of the time is as follows. That is, the liquid crystal display device usually sequentially and selectively drives a plurality of scanning signal lines. Accordingly, with respect to the liquid crystal display device which satisfies XGA and has at least 768 scanning signal lines, for example, in a general driving technique, the time in which the OFF state is selected is (768-1) times longer than the time in which the ON state is selected. Further, to prevent the deterioration of the liquid crystal material, the liquid crystal display device usually converts the potential applied between the pixel electrodes and the reference electrodes into an alternating current so as to prevent the direct current voltage from being continuously applied to the liquid crystal material for a long time. However, this advantageous effect only aims at the prevention of the applying of direct current voltage as the average for a long time by inverting the polarity of the potential applied between the pixel electrodes and the reference electrode per one or a plurality of unit frames and hence, the effect only. Accordingly, the fact that the substantially fixed potential is applied to the pixel electrodes is not changed when viewed per each unit frame.

Further, the drive to invert the polarity of the potential applied between the pixel electrodes and the reference electrode per one or a plurality of unit frames can be performed only when power is supplied to the liquid crystal display device. That is, after such supplying of power is stopped, a substantially fixed potential is continuously applied to the pixel electrodes. Then, at a point of time that the pixel electrodes are held at the OFF state by the active elements, the pixel electrodes of the liquid crystal display device the supplying of power to which is interrupted are held at the OFF state for a relatively long time so that the fixed potential is continuously applied to the pixel electrodes for a long time.

On the other hand, the potential is usually directly supplied to the reference electrode without being fed through the active elements per unit pixels and hence, contrary to the pixel electrodes, after the supplying of power to the liquid crystal display device is stopped, the reference electrode immediately assumes the GND potential.

As a result, in the liquid crystal display device having active elements, when the supplying of power to the liquid crystal display device is stopped, the direct current potential difference is applied between the pixel electrodes and the reference electrode for a long time and the pixels are charged to the direct current. Accordingly, it has been found that even when power is supplied to the liquid crystal display device again, the potential between the pixel electrodes and the reference electrode at this point of time is driven in a mode that alternating current signals are superposed on the remaining direct current potential so that the imbalance is generated with respect to the liquid crystal drive voltage between polarities thus generating the flickering.

Then, it has been found that, in the liquid crystal display device having such active elements, to improve the holding characteristics in the usual display state, either one or both of the additional capacitance Cadd which is formed by forming a superposed region between the scanning signal line and the common electrode of the preceding stage through an insulation layer and the holding capacitance Cstg which is formed by forming a superposed region on the same substrate between the reference potential and the common electrode through an insulation layer are used and hence, the fixed potential is further continuously applied to the pixel electrodes for a long time.

Further, the inventors have made the following finding based on FIG. 42. That is, according to an experiment, depending on whether the backlight BL is in the ON state or the OFF state, there lies the difference in the flickering generating time after the restarting of supplying of power. Particularly, when the backlight BL is in the ON state, the longer the power supply interruption time, the generation of the flickering is reduced. The reason of this phenomenon is explained first of all. The liquid crystal display device which is served for this experiment uses the TFTs as the active elements and hence, the liquid crystal display device has semiconductor layers. Accordingly, more or less, a photo conduction, that is, a phenomenon that the charge held in the pixel electrodes leaks when the light is irradiated to the semiconductor layers is generated. In FIG. 42, the leaking derived from this phenomenon is considered to become noticeable from approximately 0.5 to 1.0 second. Since the holding period in the actual use is only 16.6 ms at maximum when the frame frequency is 60 Hz, as an example, the leaking is restricted to a very low level in the actual use. This is because that, to achieve such an object, a light shielding layer BM is formed to prevent the light from being directly irradiated to the semiconductor layers. However, when the power supply interruption time reaches 2.5 second shown in FIG. 42, it has been found that the leaking of the TFT is generated so that it has been found that the charge in the pixel electrodes is released in a reverse manner whereby the flicker generation time after restarting the supplying of power becomes shorter than the case in which the blacklight BL is turned off.

Another feature which FIG. 42 suggests is that when the backlight BL is turned off, corresponding to the increase of the power supply interruption time, the flickering generation time after the supplying of power is started again is increased. After studying this phenomenon, the inventors have obtained the following finding. This finding is explained in conjunction with the structure of the pixels of a liquid crystal display panel 2 used in a liquid crystal display device 1 of the present invention.

Figure 16:
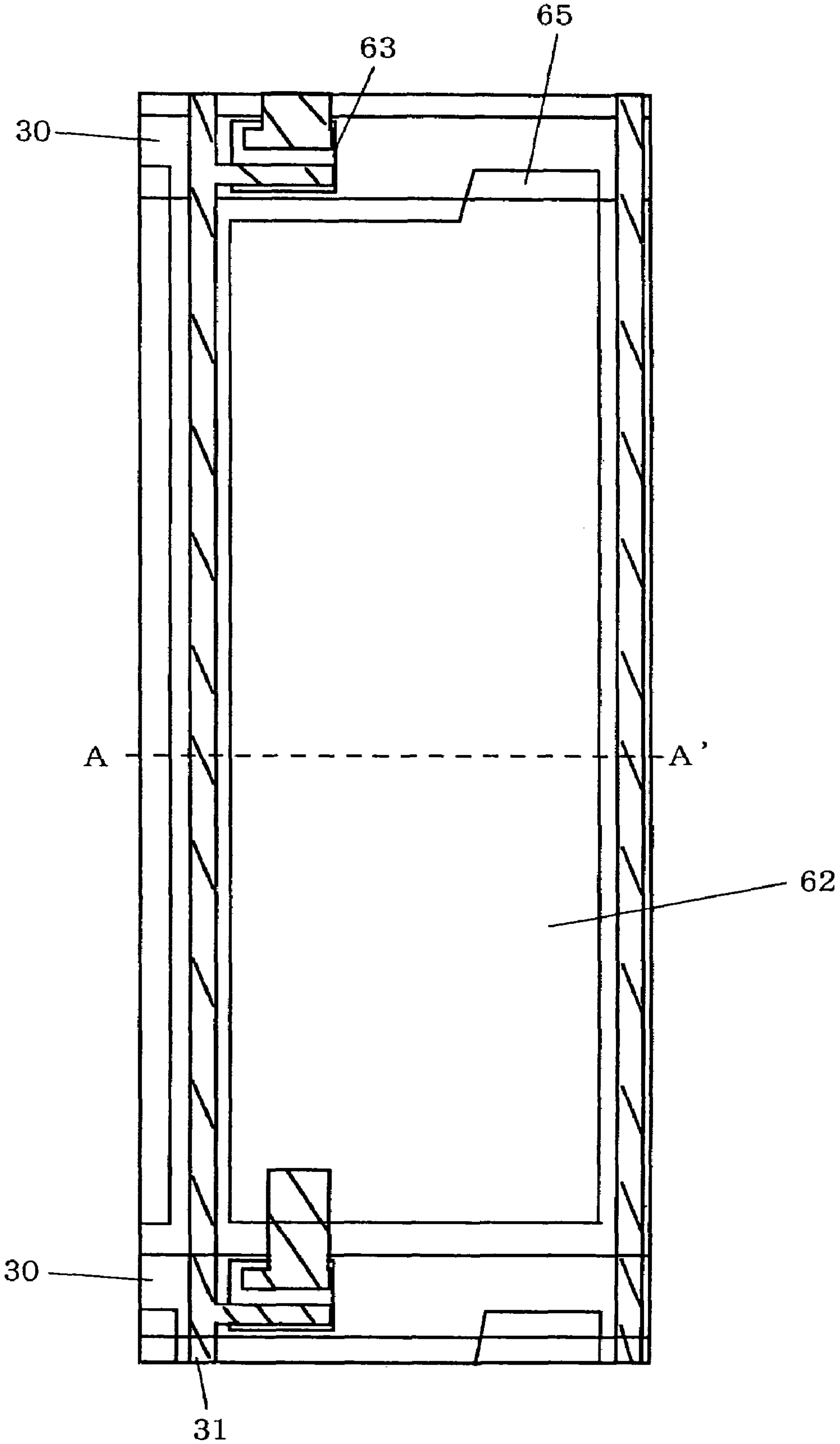
FIG. 16 is a view showing an example of a planer structure of a pixel of a liquid crystal panel used in a liquid crystal display device according to the present invention.
Figure 17:
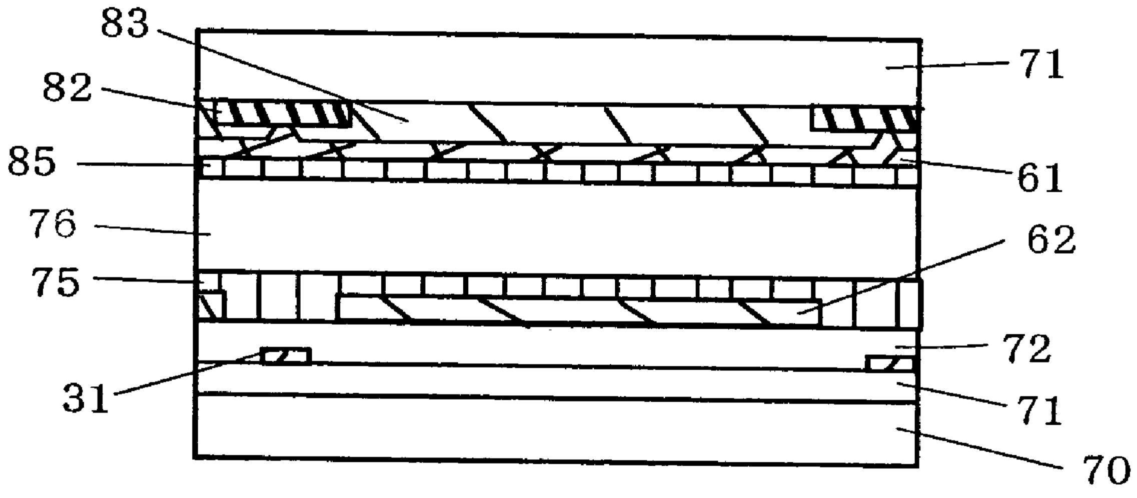
FIG. 17 is a view showing an example of a cross-sectional structure of a pixel of a liquid crystal panel used in a liquid crystal display device according to the present invention.
Figure 18:
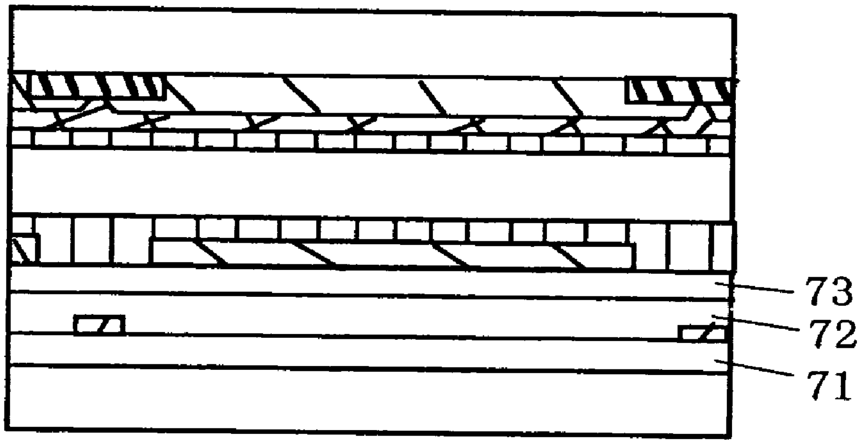
FIG. 18 is a view showing an example of a cross-sectional structure of a pixel of a liquid crystal panel used in a liquid crystal display device according to the present invention.
Figure 19:
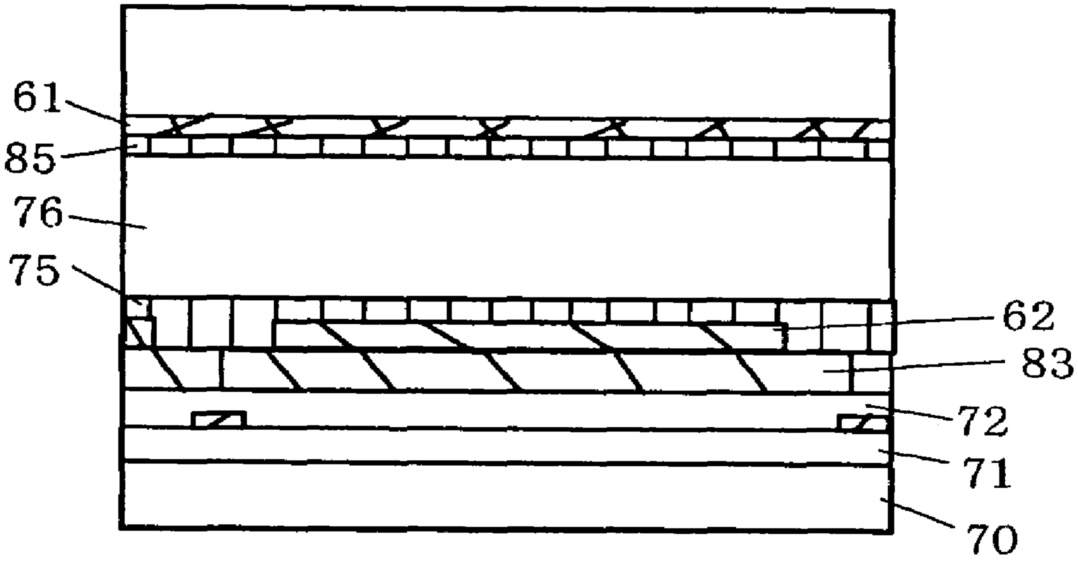
FIG. 19 is a view showing an example of a cross-sectional structure of a pixel of a liquid crystal panel used in a liquid crystal display device according to the present invention.

FIG. 16 shows an example of a planar structure of a pixel portion of a so-called TN-type liquid crystal display panel. Further, examples of cross-sectional structures taken along a line A-A' of FIG. 16 are shown in FIG. 17, FIG. 18 and FIG. 19. When the potential in the ON state is applied to a scanning signal line 30, the potential from a video signal line 31 is written in a pixel electrode 62 by way of a TFT.

Then, by applying the potential in the OFF state to the scanning signal line 30, the leaking of the TFT is prevented and the charge is held in the pixel electrode. FIG. 17 shows an example of the cross-sectional structure. An insulation layer (hereinafter referred to as "PAS1") 71 is formed on a substrate 70, the video signal line 31 and an insulation layer (hereinafter referred to as "PAS2") 72 are formed on the PAS1 71 and the pixel electrode 62 is formed on the PAS2 72. On the other substrate, a light shielding layer (hereinafter referred to as "BM") 82, color filters (hereinafter referred to as "CF") 83, reference electrodes 61 and an orientation film 85 are formed. A liquid crystal layer 76 is interposed between an orientation film 75 and the orientation film 85.

FIG. 18 shows an example of the structure in which an insulation layer (PAS3) is interposed between the insulation layer PAS2 and the pixel electrode 62. Here, PAS3 is preferably formed of an organic insulation film having a low dielectric constant. Further, FIG. 19 shows an example of the structure in which CF is interposed between PAS2 72 and the pixel electrode 62. In both cases, the orientation film 75 is interposed between the pixel electrode 62 and the liquid crystal layer 76. When the direct current voltage is applied to the pixel electrode 62 for a long time, the charges is gradually trapped by the insulation layer 71. This is a phenomenon which is generated with respect to both of the insulation film below the pixel electrode 62 and the orientation film above the pixel electrode 62.

Here, the orientation film 75 is arranged closer to the liquid crystal layer side than the pixel electrode 62. Accordingly, the charge stored in the orientation film 75 is directly superposed on the potential difference applied between the pixel electrode 62 and the reference electrode for an image display purpose. This brings about a drive in a form that at the time of performing the usual image display in the state that the charge remains in the orientation film 75, 85, the potential between the pixel electrode 62 and the reference electrode superposes alternating current signals on the remaining direct current potential as mentioned previously and hence, the imbalance is generated with respect to the liquid crystal drive voltage between polarities whereby the flickering is generated.

In FIG. 42, when the back light BL is turned off, the longer the power supply interruption time, the flickering generation time after the restarting of the supplying of power becomes longer. It has been found that this is caused by a fact that the charge is also gradually trapped by the orientation film in the power supply interruption state, that is, the state in which the charge is held in the pixel electrode and hence, an amount of charge stored in the orientation film is increased along with the lapse of time and the flickering generation time after the restarting of the supplying of power is prolonged due to the increase of an amount of the charge.

To solve such a problem, the orientation film may be removed. However, the provision of the orientation film on the pixel electrode constitutes substantially an inevitable component to provide the orientation of the liquid crystal. Accordingly, it is necessary to prevent the storage of the charge in the orientation film.

In view of the above, according to the present invention, by rapidly releasing the charge of the pixel electrode at the time of cutting the supplying of power, the storage of charge into the orientation film after the cutting of supplying of power can be suppressed so that the generation of the flickering at the time of restarting the supplying of power can be prevented.

Embodiment 2

The inventors have found that when the liquid crystal display device uses a liquid crystal display panel which forms pixel electrodes and reference electrodes on a same substrate, the phenomenon which is explained in conjunction with the embodiment 1 is further worsened.

Figure 20:
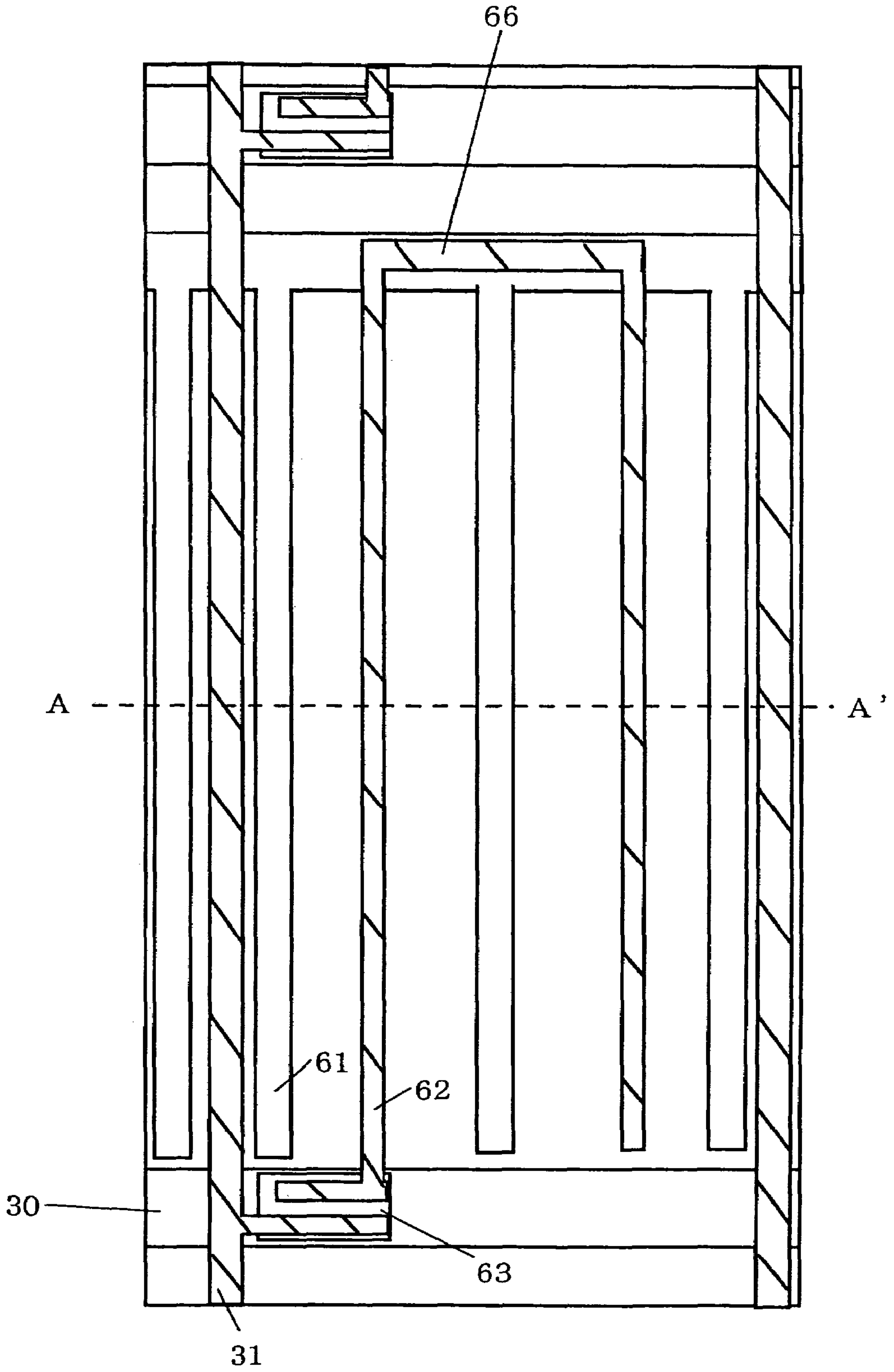
FIG. 20 is a view showing an example of a planer structure of a pixel of a liquid crystal panel used in a liquid crystal display device according to the present invention.
Figure 21:
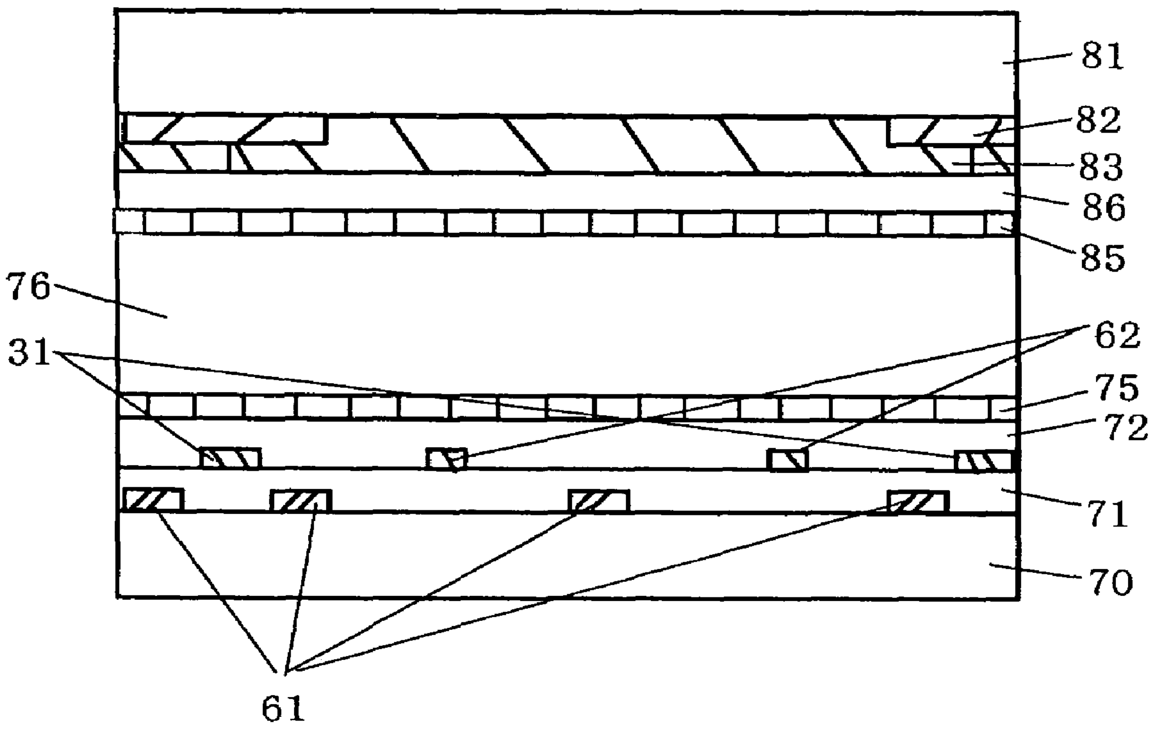
FIG. 21 is a view showing an example of a cross-sectional structure of a pixel of a liquid crystal panel used in a liquid crystal display device according to the present invention.

FIG. 20 shows an example of a planer structure of a pixel portion of a liquid crystal display panel of a so-called lateral electric field system. Here, an example of a cross-sectional structure taken along a line A-A' of FIG. 20 is shown in FIG. 21. When a potential on the ON state is applied to a scanning signal line 30, a potential from a video signal line 31 is written in a pixel electrode 62 by means of a TFT. Then, by applying a potential in the OFF state to the scanning signal line 30, the leaking of TFT is prevented so that the charge is held in the pixel electrode. A holding capacitance (Cstg) 66 is provided to increase the capacitance.

FIG. 21 shows an example of the cross-sectional structure. Reference electrodes 61 and an insulation layer (hereinafter referred to as "PAS1") 71 are formed on a substrate 70. The video signal line 31, a pixel electrode 62 and an insulation layer (hereinafter referred to as "PAS2") 72 are formed on the PAS1 71 and an orientation film 75 is formed on the PAS2 72. There may be a case that an organic PAS is formed on an upper layer of the insulation layer PAS2. On the other substrate, a light shielding layer (hereinafter referred to as "BM") 82, color filters (hereinafter referred to as "CF") 83, a protective film 86 and an orientation film 85 are formed. A liquid crystal layer 76 is interposed between the orientation film 75 and the orientation film 85.

This embodiment has the same constitution as the embodiment 1 with respect to a point that the orientation film 75 is interposed between the pixel electrode 62 and the liquid crystal layer 76. Accordingly, the flickering is generated at the time of cutting the supplying of power and at the time of restarting the supplying of power as in the case of the embodiment 1.

Further, it has been found that the liquid crystal display panel of the lateral electric field system of this embodiment worsens the flickering than the liquid crystal display panel of a so-called vertical electric field system described in the embodiment 1.

As shown in FIG. 21, in the liquid crystal display panel of a so-called lateral electric field system, the pixel electrode 62 and the reference electrodes 61 are arranged on the same substrate 70 in a spaced-apart manner by way of an insulation film. Then, by applying the potential difference between the pixel electrode 62 and the reference electrode 61, an electric field is generated and this electric field modulates optical characteristics of the liquid crystal layer. Accordingly, the potential difference is applied to the insulation film 71 between the pixel electrode 62 and the reference electrode 61.

When the supplying of power to the liquid crystal display device is stopped, since most of the TFTs are in the OFF state, the charge is held in the pixel electrode 62 of each pixel. On the other hand, the potential of the reference electrode 61 is rapidly lowered to reach the GND level. As a result, the charge held by the pixel electrodes 62 is gradually trapped by the orientation film 75, 85 and, at the same time, the charge is trapped in the insulation film 71 between the pixel electrode 62 and the reference electrode 61 due to the direct current potential difference between the pixel electrodes 62 and the reference electrode 61.

Here, it has been found that since the distance between the pixel electrodes 62 and the reference electrode 61 is longer than the distance between the pixel electrode and the orientation film 75, the charge which is trapped by the insulation film 72 which makes the pixel electrode 62 and the reference electrode 61 spaced apart from each other on the same substrate 70 is less released than the charge which is trapped by the orientation film 75 so that the flickering generation time after the restarting of the supplying of power is prolonged.

Accordingly, in the liquid crystal display device of a so-called lateral electric field system, the countermeasure to cope with the flickering becomes further necessary. In view of the above, in this embodiment, by rapidly releasing the potential of the pixel electrodes 62 at the time of cutting the supplying of power, the storage of the charge to the orientation film 75 and the insulation film 72 interposed between the pixel electrodes 62 and the reference electrodes 61 which are formed on the same substrate 70 after cutting of the supplying of power is suppressed, whereby the generation of the flickering at the time of restarting the supplying of power can be prevented.

Embodiment 3

This embodiment describes an example which reduces the storage of the charge in the insulation film interposed between the pixel electrodes and the reference electrode which are formed on the same substrate in the liquid crystal display device of the lateral electric field system in the embodiment 2 in view of the structure of the pixels.

Figure 22:
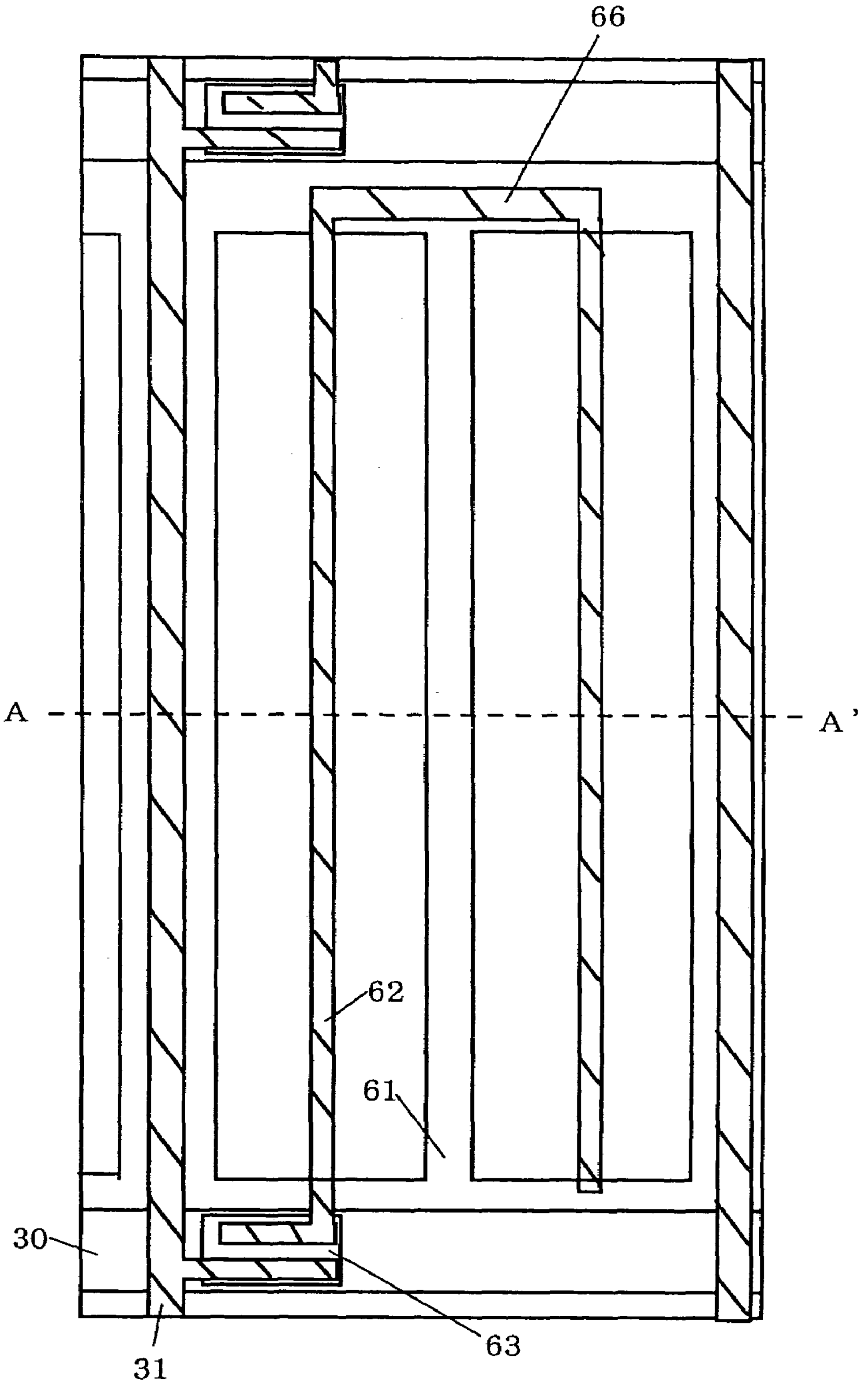
FIG. 22 is a view showing an example of a planer structure of a pixel of a liquid crystal panel used in a liquid crystal display device according to the present invention.
Figure 23:
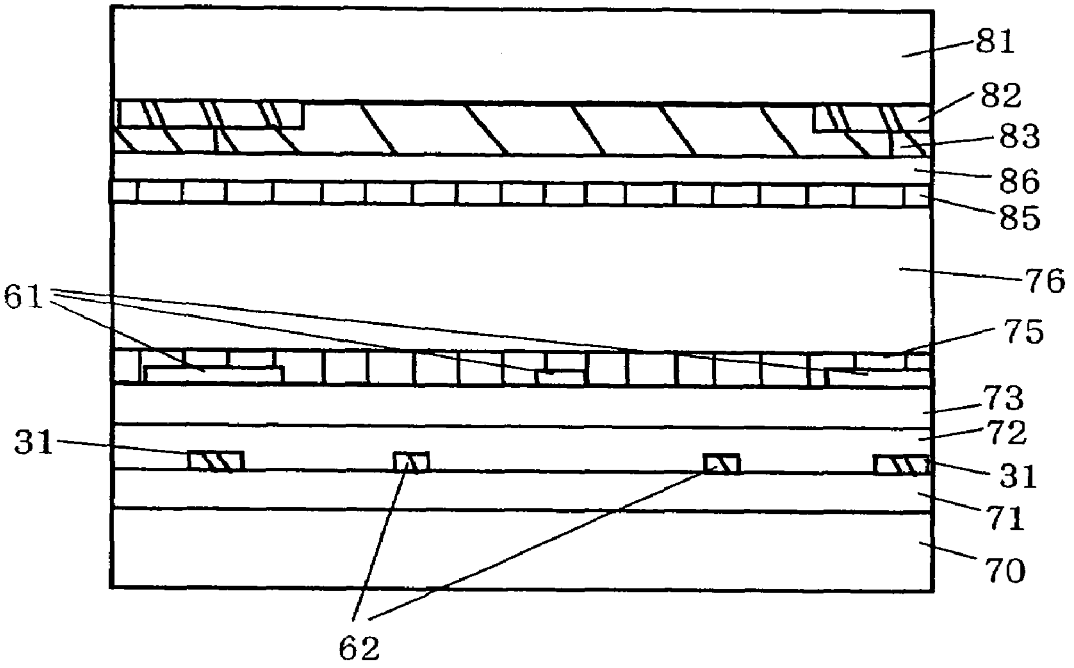
FIG. 23 is a view showing an example of a cross-sectional structure of a pixel of a liquid crystal panel used in a liquid crystal display device according to the present invention.
Figure 24:
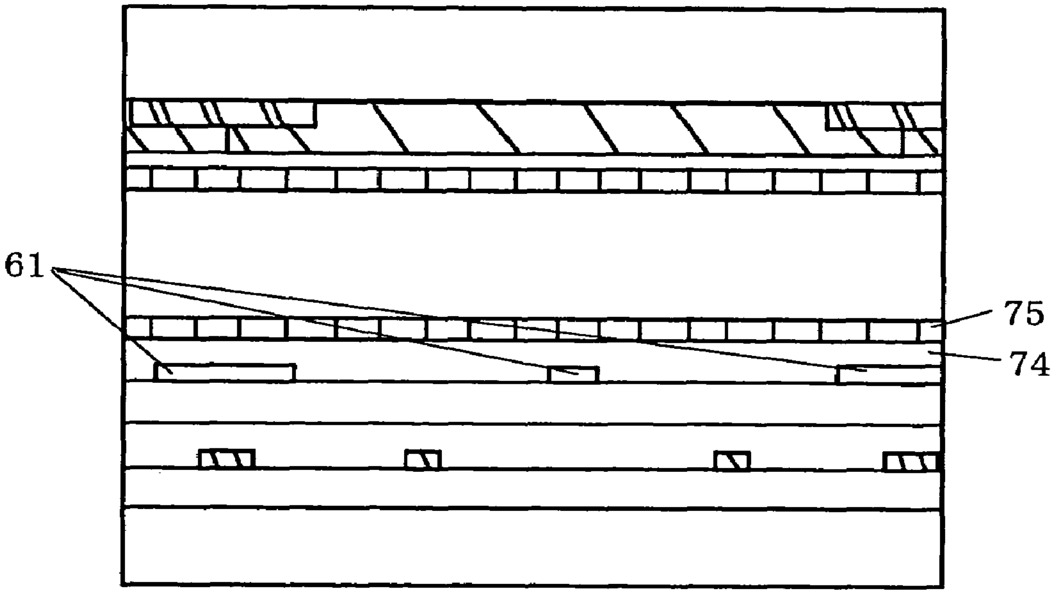
FIG. 24 is a view showing an example of a cross-sectional structure of a pixel of a liquid crystal panel used in a liquid crystal display device according to the present invention.

FIG. 22 corresponds to FIG. 20 of the embodiment 2 and FIG. 23 and FIG. 24 correspond to FIG. 21 of the embodiment 2.

The main difference between the embodiment 3 and the embodiment 2 is explained in conjunction with FIG. 23 and FIG. 24. The embodiment 3 and the embodiment 2 have a common constitution with respect to a point that the pixel electrode 62 and the reference electrode 61 are formed on the same substrate 70. However, in this embodiment, the reference electrode 61 is formed as a layer above the pixel electrode 62 through an insulation film 72. It has been found that as a result of an investigation performed by the inventors, when the charge is trapped in the insulation film 72 interposed between the pixel electrode 62 and the reference electrode 61 due to the direct current potential difference between the pixel electrodes 62 and the reference electrode 61, the influence to the generation of the flickering is increased as the pixel electrode 62 approaches the liquid crystal layer 76.

This is because that the liquid crystal layer 76 is driven by an electric field generated in the liquid crystal so that the remoter the distance between the liquid crystal layer 76 and the pixel electrodes 62, the intensity of the electric field which the same charge generates in the liquid crystal layer 76 is lowered. Accordingly, in the liquid crystal display device which forms the pixel electrodes 62 and the reference electrodes 61 on the same substrate 70, by forming the reference electrode 61 as a layer above the pixel electrode 62 by way of the insulation film 72, the flickering at the time of restarting the supplying of power after cutting the supplying of power can be suppressed.

Further, in this case, it is preferable to interpose an insulation film 73 of a low dielectric constant, particularly an organic PAS between the pixel electrodes 62 and the liquid crystal layer 76. This is because that the pixel electrodes 62 and the liquid crystal layer 76 can be made further remoter from each other electrically and with respect to the distance.

In the same manner, with provision of the fourth insulation film (PAS4) which is indicated by numeral 74 as shown in FIG. 24, this advantageous effect can be further enhanced.

Further, in the same manner, by interposing CF83 between reference electrodes forming layer and a pixel electrode forming layer in place of a counter substrate, the advantageous effect can be enhanced. In the same manner, by interposing a protective film 86 between the reference electrode forming layer and the pixel electrode forming layer in place of a counter substrate, the advantageous effect can be enhanced. In both cases, it is preferable that the reference electrode forming layer constitutes a layer which is disposed above a pixel electrode forming layer. Further, these constitutions may be combined.

Further, although a plurality of pixel electrodes 62 are connected within the pixel in this embodiment, the pixel electrode 62 may be formed in a single form or may be used in a planer shape.

Embodiment 4

Figure 25:
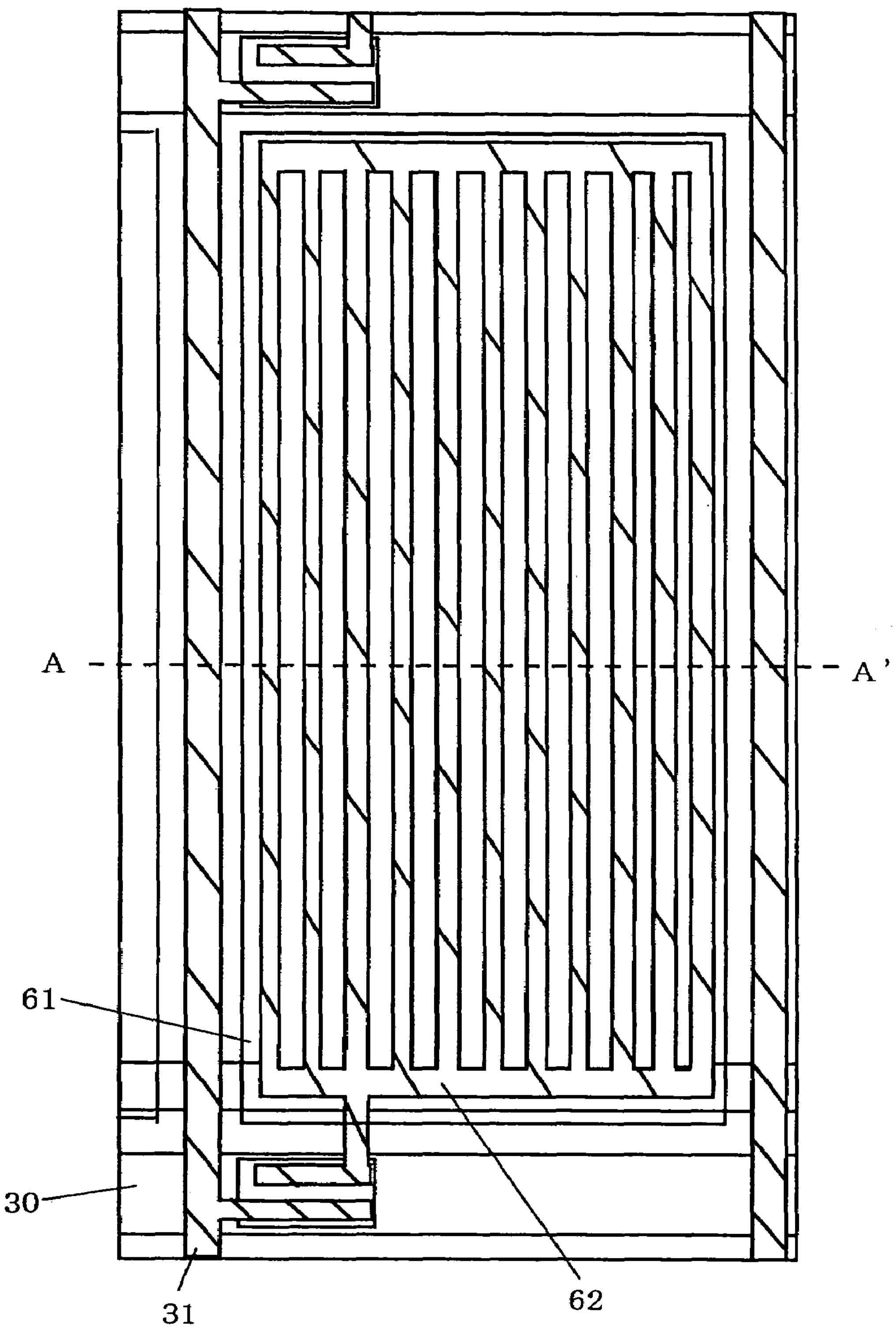
FIG. 25 is a view showing an example of a planer structure of a pixel of a liquid crystal panel used in a liquid crystal display device according to the present invention.
Figure 26:
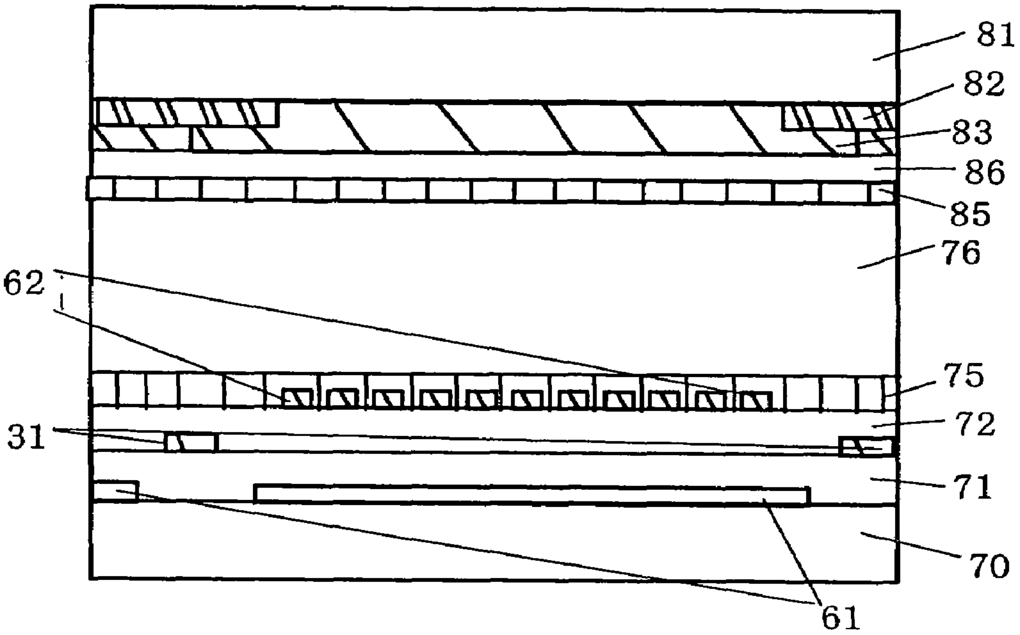
FIG. 26 is a view showing an example of a cross-sectional structure of a pixel of a liquid crystal panel used in a liquid crystal display device according to the present invention.
Figure 27:
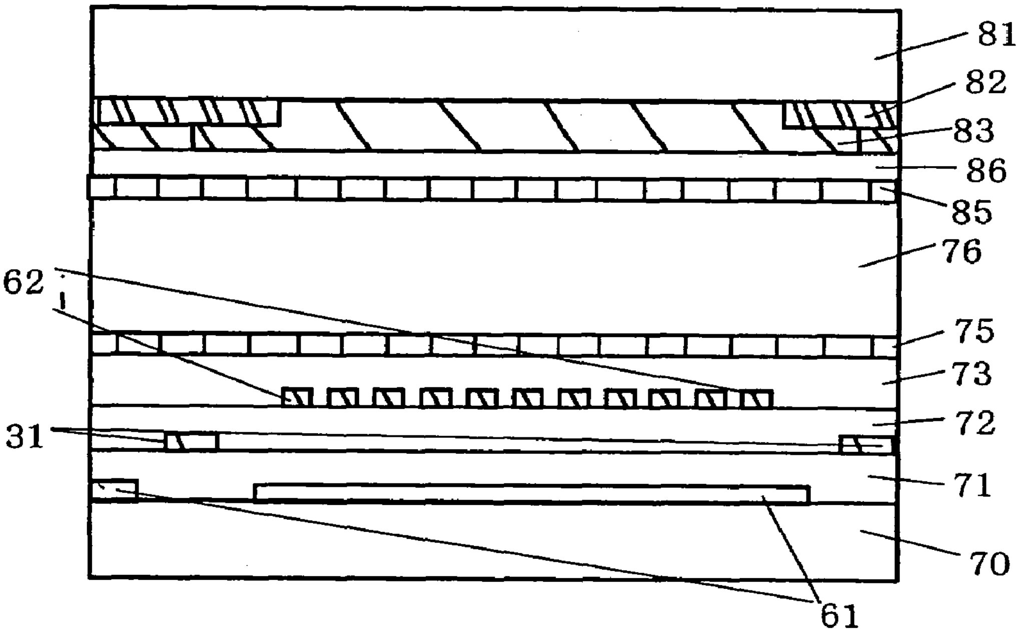
FIG. 27 is a view showing an example of a cross-sectional structure of a pixel of a liquid crystal panel used in a liquid crystal display device according to the present invention.

This embodiment describes another example which reduces the storage of the charge in the insulation film interposed between the pixel electrode 62 and the reference electrode 61 which are formed on the same substrate 70 in the embodiment 2. FIG. 25 corresponds to FIG. 20 of the embodiment 2 and FIG. 26 and FIG. 27 correspond to FIG. 21 of the embodiment 2. In this embodiment, as shown in FIG. 26 and FIG. 27, the pixel electrodes 62 and the reference electrodes 61 are formed on the same substrate 70 and the reference electrodes 61 are superposed on the pixel electrodes 62 as a layer below the pixel electrodes 62 by way of an insulation film. The pixel electrodes 62 are provided in a plural number and the reference electrode 61 is constituted of a planner member.

When the supplying of power to the liquid crystal display device is stopped, most of the TFTs are in the OFF state and hence, the charge is stored in the pixel electrode 62 in each pixel. On the other hand, the potential of the reference electrode 61 is rapidly lowered and reaches the GND level. As a result, the potential difference between the pixel electrodes 62 and the reference electrodes 61 are enlarged so that the charge stored in the pixel electrodes 62 is rapidly trapped by the insulation film interposed between the pixel electrodes 62 and the reference electrodes 61 due to such an enlarged potential difference. Here, an amount of the charge stored in the pixel electrodes 62 at the time of interrupting the supplying of power is limited so that an amount of the charge trapped by the insulation film which is arranged relatively closer to the liquid crystal layer 76 side than the pixel electrode 62, particularly by the orientation film 75 can be reduced.

Due to such a constitution, this embodiment can reduce the generation of flickering at the time of cutting the supplying of power and at the time of restarting the supplying of power.

Embodiment 5

Figure 28:
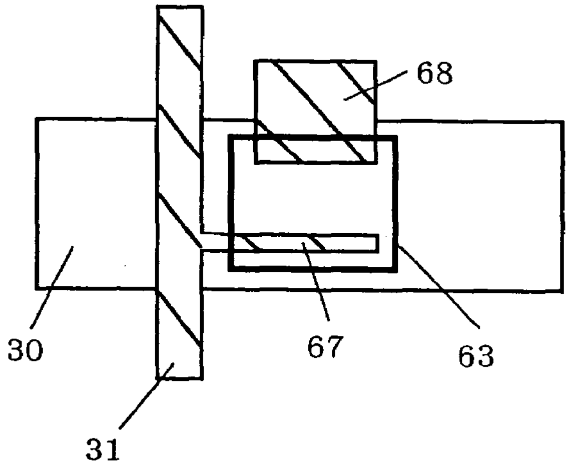
FIG. 28 is a view which schematically shows a planer structure of one embodiment of an active element of a liquid crystal panel used in a liquid crystal display device according to the present invention.

FIG. 28 is a planer schematic view showing an example of a TFT element. When an ON potential is applied to a scanning signal line 30, that is, when the scanning signal lines is in a so-called ON state, a semiconductor layer 63 becomes the ON state so that the potential of a video signal line 31 passes via a drain electrode 67 which is integrally formed with the video signal line, a semiconductor layer 63 and a source electrode 68, whereby the charge is electrically written in a pixel electrode. There may be a case that the source electrode and the pixel electrode are integrally formed.

Then, when an OFF potential is applied to the scanning signal line 30, that is, when the scanning signal line 30 is in a so-called OFF state, the channel of the semiconductor layer 63 assumes the state in which the channel is not formed so that the state which is similar to the state in which they are not electrically conductive is established between the source electrode and the drain electrode whereby the charge can be held in the pixel electrode 62 for a long time.

As has been explained with respect to the embodiment 1, in FIG. 42, the flickering generation time differs between a case in which the backlight BL is turned on and a case in which the backlight BL is turned off during the power supply interruption period. This implies that by properly setting the leaking characteristics of active elements, the generation of the flickering can be suppressed. However, in the state based on the actual specification, the active elements are required to have the sufficient holding characteristics. The inventors have found that the compatibility of these characteristics can be optically indicated by using the display brightness B2 of the pixel for every lapsed time T in the OFF state relative to the display brightness B1 of the pixel in the ON state.

That is, at least at one display gray scale in the intermediate tone region, in the normally black mode, with respect to the time T in the OFF state, the display brightness B1, B2 are set such that B2/B1>90% at T=16.6 ms and B2/B1<70% at T=1 s. Further, in the normally white mode, at least at one display gray scale, with respect to the time T in the OFF state, the display brightness B1, B2 are set such that B2/B1<110% at T=16.6 ms and B2/B1>130% at T=1 s.

Further, by combining the constitution of this embodiment with any one of the constitutions of embodiments 1 to 4, the advantageous effect can be further increased.

Embodiment 6

Figure 29:
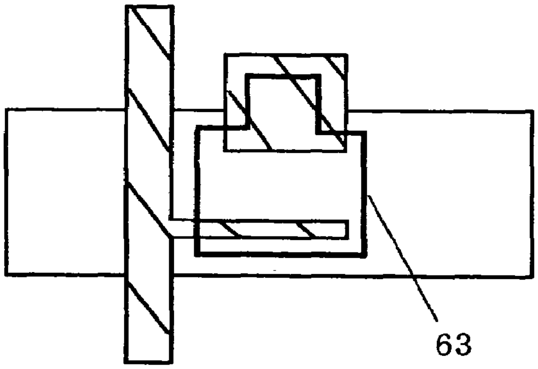
FIG. 29 is a view which schematically shows a planer structure of one embodiment of an active element of a liquid crystal panel used in a liquid crystal display device according to the present invention.
Figure 30:
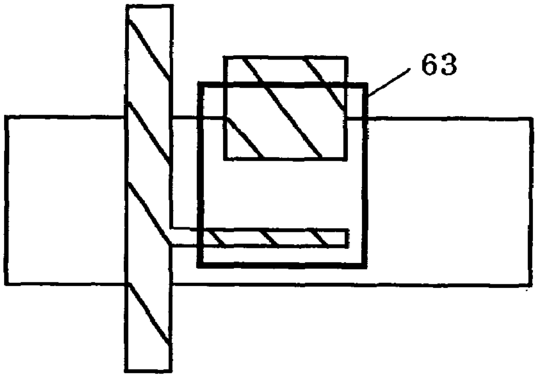
FIG. 30 is a view which schematically shows a planer structure of one embodiment of an active element of a liquid crystal panel used in a liquid crystal display device according to the present invention.

As explained with respect to the embodiment 5, by properly setting the leak characteristics of the active elements, the flickering at the time of cutting the supplying of power and at the time of restarting the supplying of power can be suppressed. Among structures of the TFT elements, structures which can properly set the leak characteristics are shown in FIG. 29 and FIG. 30. In FIG. 29, a semiconductor layer 63 is exposed from a scanning signal line below a source electrode. On the other hand, in FIG. 30, a partial region of a semiconductor layer 63 is completely exposed from a scanning signal line. Due to such constitutions, the TFT elements are configured to make the charge easily leaked at the exposed regions due to the photo conduction derived from light of a backlight so that the flickering can be suppressed.

Further, by combining the constitution of this embodiment with any one of the constitutions of embodiments 1 to 5, the advantageous effect can be further increased.

Embodiment 7

Figure 31:
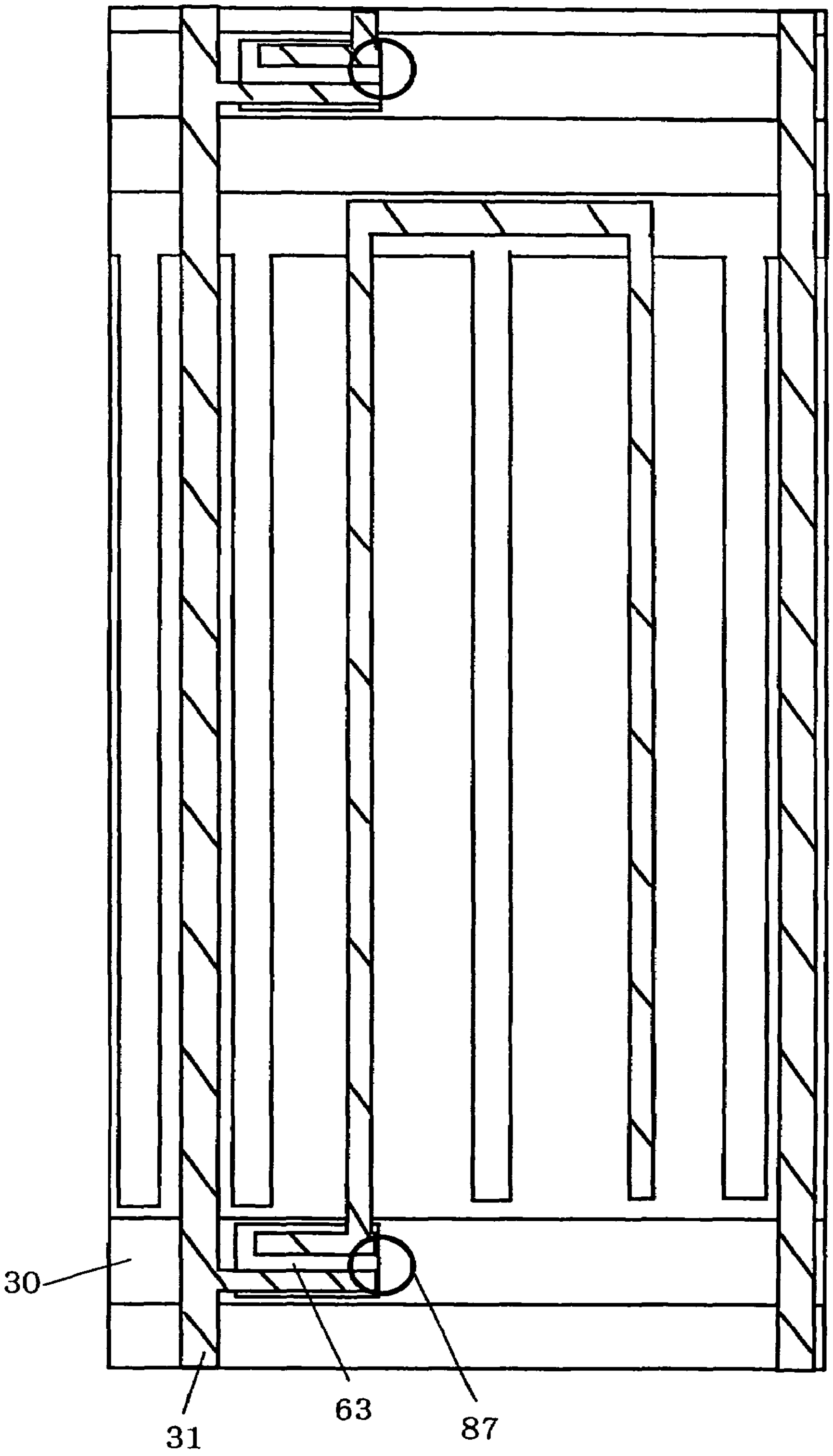
FIG. 31 is a view showing an example of a planer structure of one embodiment of a liquid crystal panel used in a liquid crystal display device according to the present invention.

Another example which makes use of the photo conduction explained in the embodiment 6 is shown in FIG. 31. The constitution of this embodiment shown in FIG. 31 differs from the constitution shown in FIG. 20 in that a random reflection medium 87 is provided such that the medium 87 is superposed on a portion of a TFT element. Due to such a constitution, an oblique light irradiated from a backlight is partially introduced to a semiconductor layer due to the random reflection. Accordingly, it becomes possible to make the TFT element have the constitution which can easily leak the charge so that generation of the flickering can be suppressed.

As the random reflection medium, it is preferable to appropriate a gap support member. That is, the gap support member is formed of resin transparent beads. Further, by providing transparent columnar spacers on one substrate, the random reflection effect can be increased. This is because that the arrangement position and the size of the columnar spacers can be freely controlled compared with beads. Particularly, compared with the beads which usually have a spherical shape, the columnar spacers can independently set the size thereof in the height direction which is necessary for supporting the gap and the size in the width direction which is necessary for the random reflection and hence, the columnar spacers are extremely desirable. Further, since the beads are usually formed using a scattering method, the provability that the beads are positioned on the TFTs is small. The transparent columnar spacers can be formed at predetermined positions so that the random reflection effect can be increased compared with the beads scattering method provided that at least one piece is arranged every 10 pixels.

Although this embodiment is explained in conjunction with drawing which show an IPS system, other systems are applicable to this embodiment.

Further, by combining the constitution of this embodiment with any one of the constitutions of embodiments 1 to 6, the advantageous effect can be further enhanced.

Embodiment 8

Figure 32:
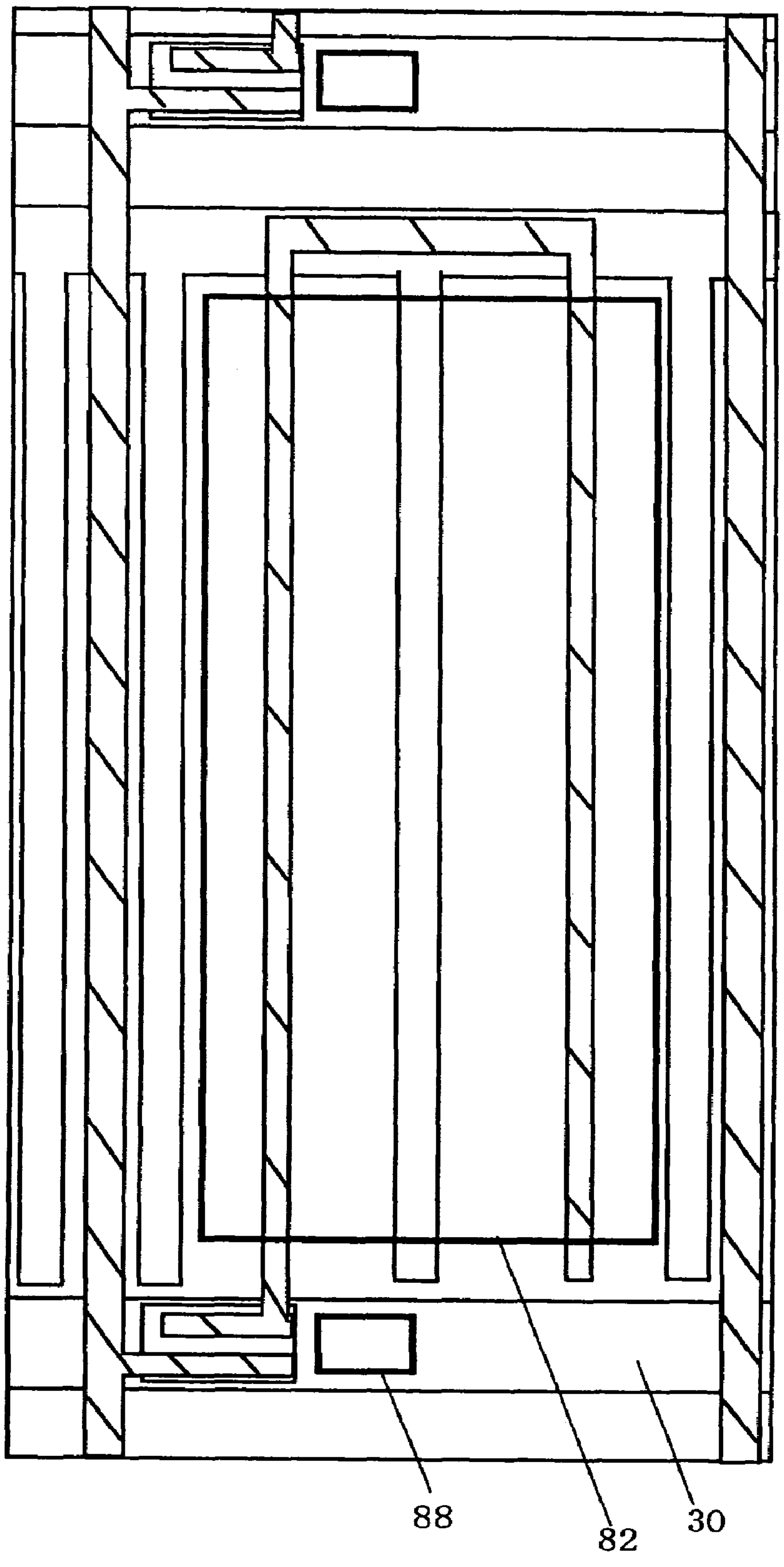
FIG. 32 is a view showing an example of a planer structure of one embodiment of a liquid crystal panel used in a liquid crystal display device according to the present invention.

Another example which makes use of the photo conduction explained in the embodiment 6 is shown in FIG. 32. The constitution of this embodiment shown in FIG. 32 is different from the constitution shown in FIG. 20 in that besides the fact that a light shielding layer 82 naturally includes aperture regions in the inside of an effective display region, the light shielding layer 82 also has aperture regions 88 on scanning signal lines 30. These aperture regions 88 may be formed on the video signal lines. Due to such a constitution, using the light from the display surface side, it becomes possible to induce the photo conduction into TFT elements.

This brings about an advantageous effect that even when a backlight incorporated in a display device is in the extinguished state, the leaking effect can be realized using the light in a room or an external light. In one method, these aperture portions 88 may be preliminarily formed in given positions.

Further, in this type, the photo conduction can be easily controlled with the size of the apertured regions 88. Accordingly, it becomes possible to obtain an advantageous effect in terms of yield that even when a TFT element which has leak characteristics different from the desired leaking characteristics due to problems on manufacturing is produced, the desired characteristics can be recovered by forming holes in a BM of a liquid crystal display panel after completion of assembling using the laser beam radiation. These holes are minute holes of several micron and it is difficult for a viewer to recognize these holes. However, at the time of performing the processing using a laser, it is preferable not to superpose the laser on the TFT. There exists the possibility that the TFT per se is ruptured due to the intensity of the laser beams.

Although this embodiment has been explained in view of the drawing which shows the IPS system, this embodiment is applicable to other systems in the same manner.

Further, by combining the constitution of this embodiment with the constitution of any one of the embodiments 1 to 7, the advantageous effect is further enhanced.

Embodiment 9

Figure 1:
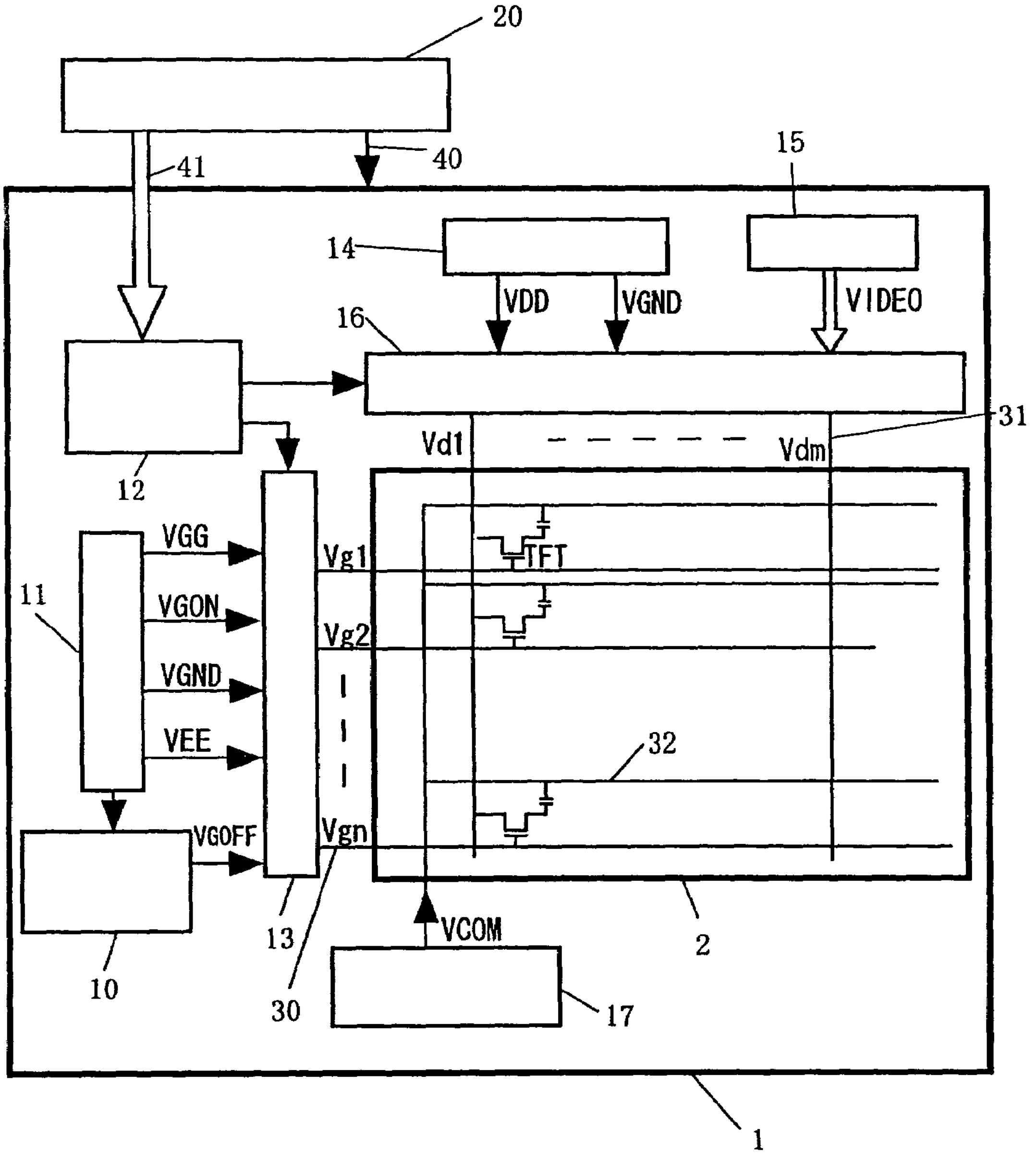
FIG. 1 is a view showing the constitution of one embodiment of a liquid crystal display device according to the present invention.

FIG. 1 is a view which shows the constitution of one embodiment of the liquid crystal display device of the present invention. To a liquid crystal display device 1, interface signals (hereinafter referred to as "I/F signals") 41 and the display power 40 are inputted from a system circuit 20. The interface signals 41 and the display power 40 may be fed through a same group of cables. Alternatively, they may be supplied using a cable which is particularly provided separately from a cable for a BL (backlight) power supply. The interface signals 41 are inputted to a control circuit 12. Further, the display power 40 is supplied to a scanning power supply circuit 11, a common voltage generation circuit 17, a video power supply circuit 14 and a gray tone power supply circuit 15. These circuits 11, 17, 14, 15 may be integrally constituted.

From the video power supply circuit 14 to the video signal drive circuit 16, a logic voltage VDD for operating video signal driver circuit and a GND voltage VGND are supplied. Further, a gray scale voltage is supplied from the gray scale power supply circuit 15. The video signal drive circuit 16 inputs the video signals to the video signal line 31 in response to the signals from the control circuit 12. A reference voltage Vcom is supplied to the reference electrode from the common voltage generation circuit 17. Although the reference electrode is described as a line in the drawing, the description is made only for the convenience sake. Accordingly, the reference electrode has not only a line shape but also a plane shape. Further, the reference electrode may be on the same substrate or on the separate substrate.

Further, a logic voltage VGG for operating scanning signal drive circuit, an ON potential voltage VGON for scanning signal line, a GND voltage VGND and a minus-side voltage VEE for driving the scanning signal drive circuit are supplied from the scanning power supply circuit 11 to the scanning signal drive circuit 13. Either the ON potential or the OFF potential is supplied to respective scanning signal lines 30 from the scanning signal drive circuit 13 in response to signals from the control circuit 12.

In a liquid crystal display panel 2, to crossing portions of the video signal lines 31 and the scanning signal lines 30, active elements are provided for respective pixels. Typical examples are TFTs. Even with respect to MIMs, although there exist some differences including a major difference that video signal lines also function as reference electrodes and are formed on one substrate different from the other substrate on which scanning signal lines are formed, the MIMs can take the similar constitution. In case that the TFTs are adopted, by writing the video signals from the video signal lines 31 in the pixel electrodes through the TFTs when the ON potential is applied to the scanning signal lines 30 and thereafter by using the potential of the scanning signal lines 30 as the OFF potential, it becomes possible to hold the potential of the written video signals for a long time compared with the case in which the liquid crystal display panel 2 does not have the active elements. This potential is held by the liquid crystal capacitance generated between the scanning signal lines and the reference electrode.

Further, as a method which improves such holding characteristics, there has been known a technique which forms a region where the scanning signal line and the pixel electrode in the pre-stage are superposed each other by way of the insulation film thus constituting a so-called additional capacitance Cadd. There has been also known a method which forms the reference signal lines or the reference electrode on the same substrate and forms regions where they are superposed with the pixel electrodes thus constituting the holding capacitance Cstg. The holding characteristics can be improved using either one or both of these techniques.

Then, due to the potential difference between the potential written in the pixel electrodes and the reference electrode, the image display can be realized by modulating the optical characteristics of the liquid crystal.

The potential VGOFF for forming the OFF potential of the scanning signal lines has been conventionally directly supplied from the scanning power supply circuit commonly with or independently from the potential VEE. Accordingly, in the conventional liquid crystal display device, when the supply of the display power 40 was stopped, the supply of the potential VGOFF was also stopped and was gradually converged to the GND potential from the minus potential. Here, the scanning signal drive circuit 13 usually has, different from the video signal drive circuit 16, a so-called switching constitution which always supplies the OFF potential to the lines on which the ON potential is not selected.

Accordingly, after stopping the supply of the display power 40, the potential which gradually approaches the GND potential from the original OFF potential formed by the potential VGOFF is supplied from the scanning signal drive circuit 13 to the scanning signal lines and hence, the active elements formed in the inside of the liquid crystal display panel 2 are also held for some time in the state which is similar to the OFF state. As a result, the charge written in the pixel electrodes cannot be leaked in a short time through the active elements resulting in the flickering phenomenon which has been explained as the task of the present invention heretofore.

Accordingly, in this embodiment, as shown in FIG. 1, a gate OFF voltage control circuit 10 is interposed between the scanning signal power supply circuit 11 and the scanning signal drive circuit 13 and the VGOFF potential is generated through this circuit 10. Then, with respect to the voltage for usual operation in which the display power 40 is supplied, the potential VGOFF is changed over immediately after stopping the supply of the display power 40 so as to input the leak potential to the scanning signal lines.

Figure 5:
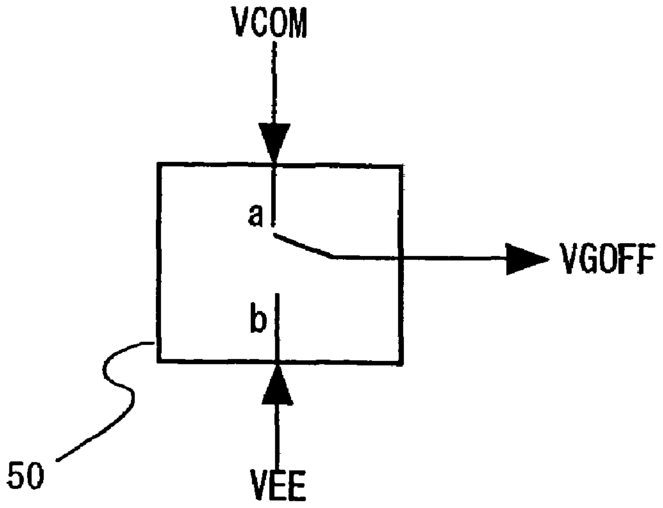
FIG. 5 is a view showing the constitution of one embodiment of a liquid crystal display device according to the present invention.

FIG. 5 shows the operation of the gate OFF voltage changeover circuit 50 as a concept of a switch. This is an example of a concept of the gate OFF voltage control circuit 10 shown in FIG. 1. At the time of performing the usual operation shown in FIG. 1, the switch is connected to a contact b and hence, the potential VEE is supplied to the potential VGOFF. When the stopping of the supply of the display power 40 is sensed, the switch is changed over to a contact a. The VCOM voltage which is higher than the potential VEE is inputted to the contact a. Due to such an operation, the voltage higher than the potential VEE is supplied to the potential VGOFF so that the leak potential can be supplied to the scanning signal line.

Figure 6:
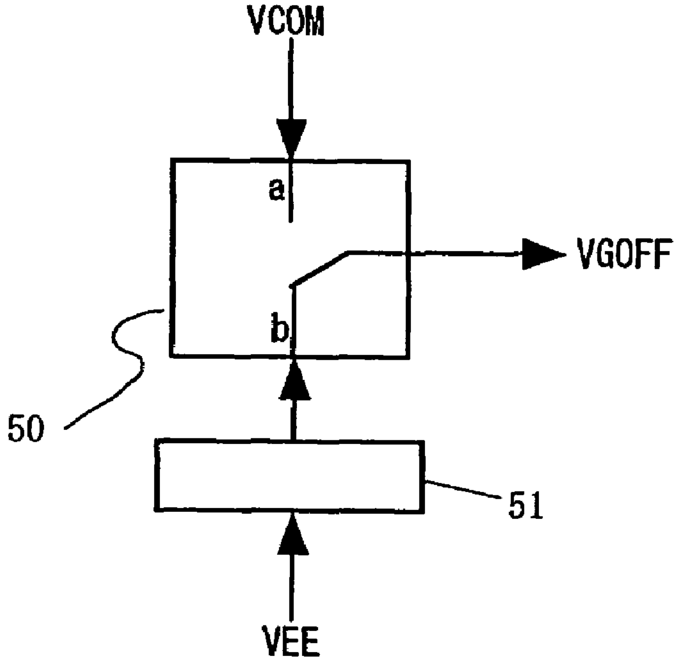
FIG. 6 is a view showing the constitution of one embodiment of a liquid crystal display device according to the present invention.

FIG. 6 is an example in which the voltage VEE in FIG. 5 is inputted to a gate OFF voltage changeover circuit through a bias circuit 51. Here, the optimum potential VGOFF can be generated through the potential VEE in the usual operation state, the holding characteristics at the time of performing the usual operation can be improved.

Figure 7:
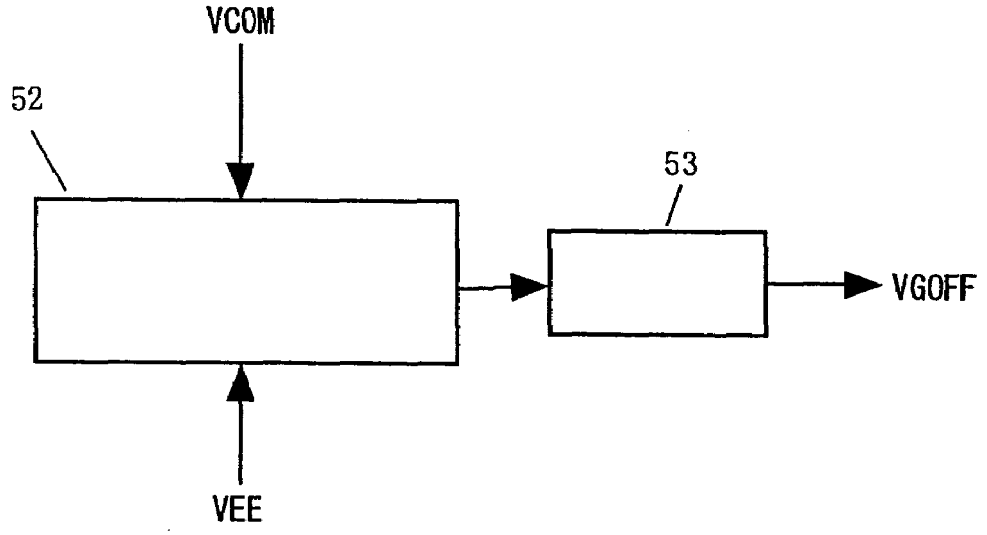
FIG. 7 is a view showing the constitution of one embodiment of a liquid crystal display device according to the present invention.

Further, instead of the switching concepts shown in FIG. 5 and FIG. 6, the concept of the gate OFF voltage control circuit 10 shown in FIG. 1 may include a concept shown in FIG. 7 in which a VEE step-up circuit 52 is provided and an intermediate potential is generated from the potential VEE and the potential VCOM and thereafter these potentials and other potential are synthesized in an adding circuit 53 thus producing the potential VGOFF. In this case, by constituting the VEE step-up circuit 52 or the adding circuit 53 such that the circuit performs the operation different from the usual operation when the supply of display power 40 is stopped, the supply of the leak potential to the scanning signal lines is prevented. Any of these examples adopts the concept which supplies the leak potential to the potential VGOFF in response to the stopping of the supply of the display power 40 and this concept is included in the gate OFF control circuit 10 shown in FIG. 1.

It is preferable that the changeover is performed within 5 seconds after stopping the supplying of power. This is because that, as explained in the previously-mentioned embodiment, the storage of the charge in the orientation film progresses along with the lapse of time and hence, to reduce the flickering after restarting the supplying of power, it is necessary to rapidly change over the active elements in the pixels into the leaking state so as to leak the charge stored in the pixel electrodes and to remove the charge from the pixel electrodes.

Figure 2:
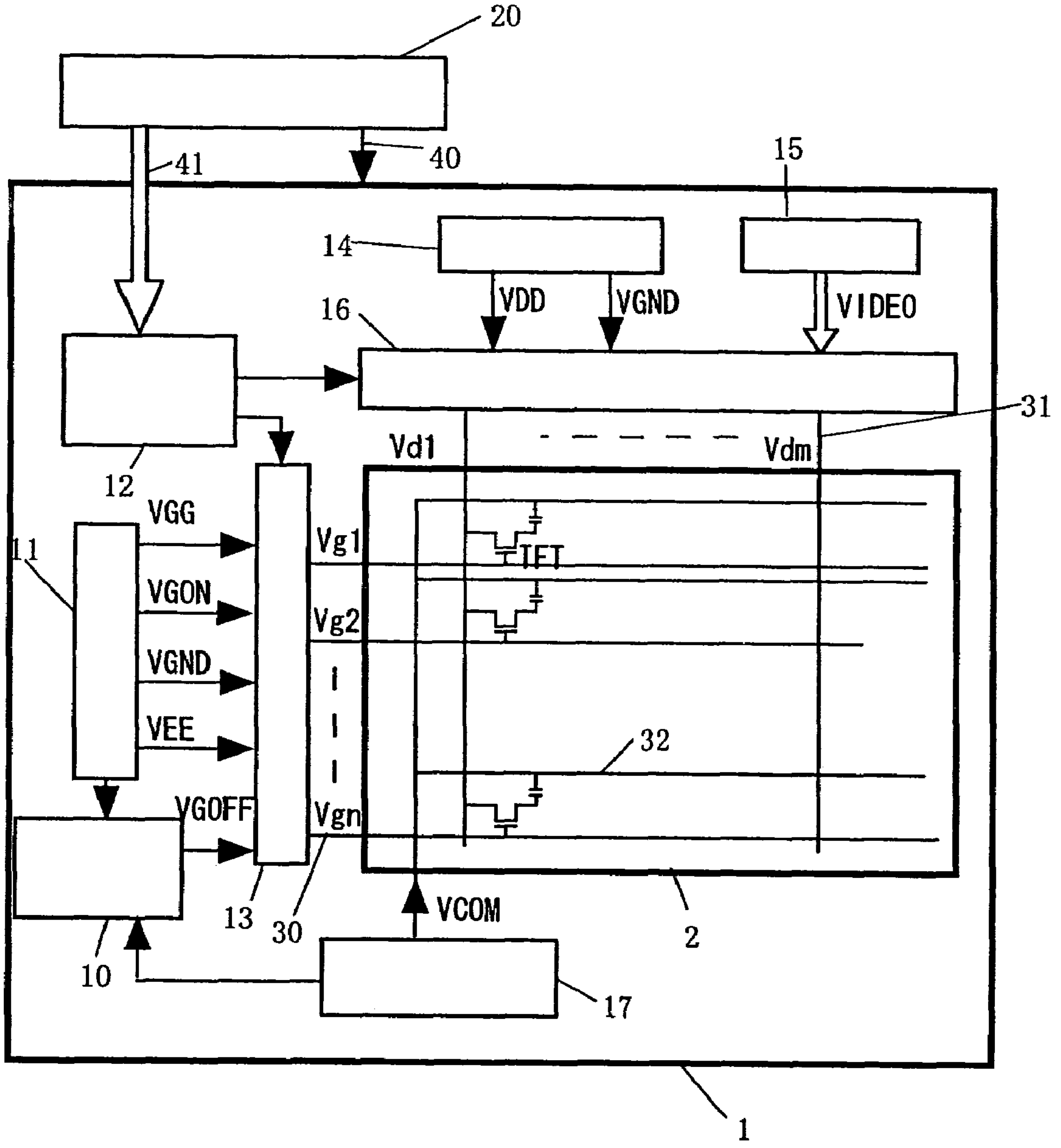
FIG. 2 is a view showing the constitution of one embodiment of a liquid crystal display device according to the present invention.
Figure 3:
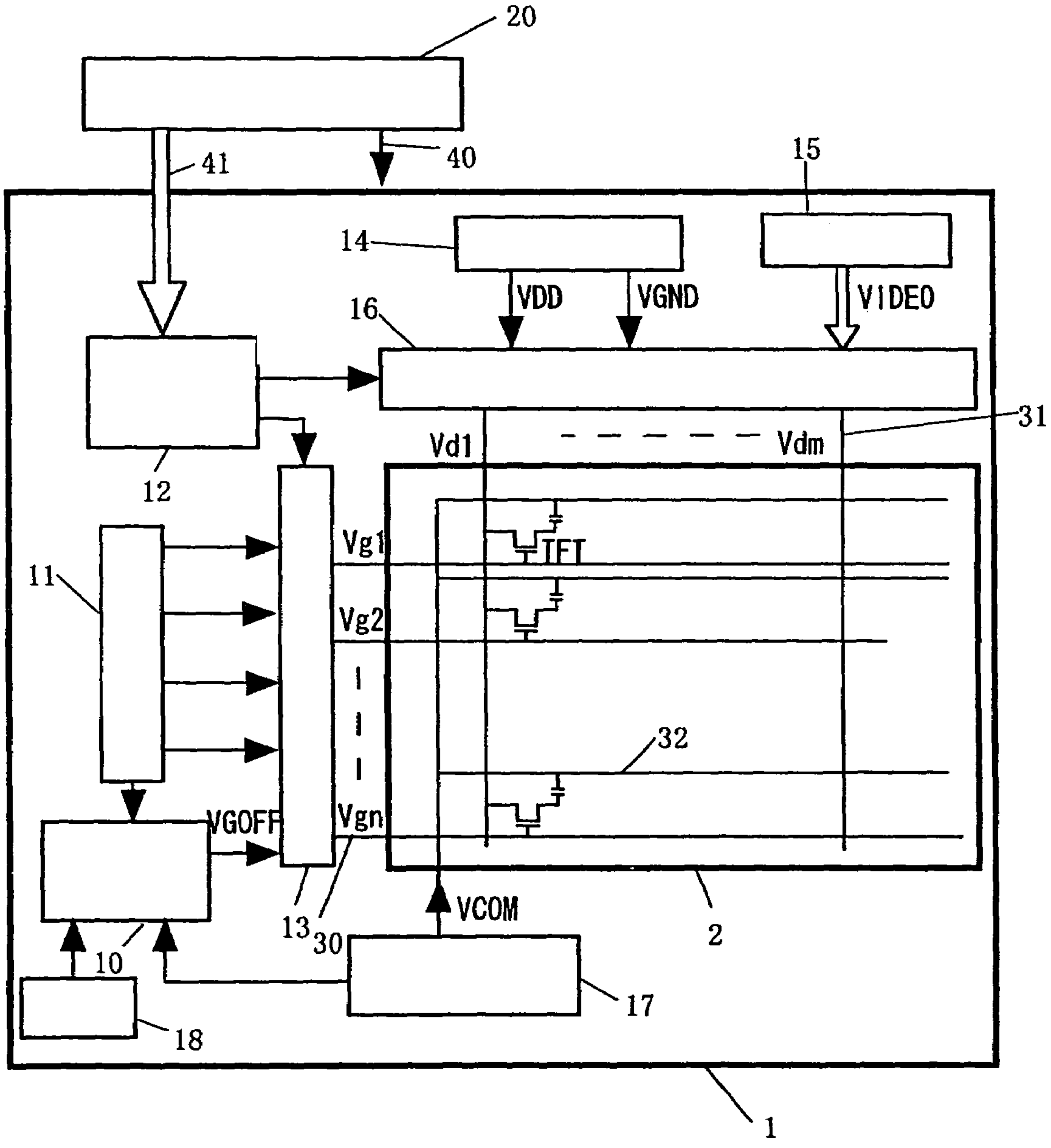
FIG. 3 is a view showing the constitution of one embodiment of a liquid crystal display device according to the present invention.
Figure 4:
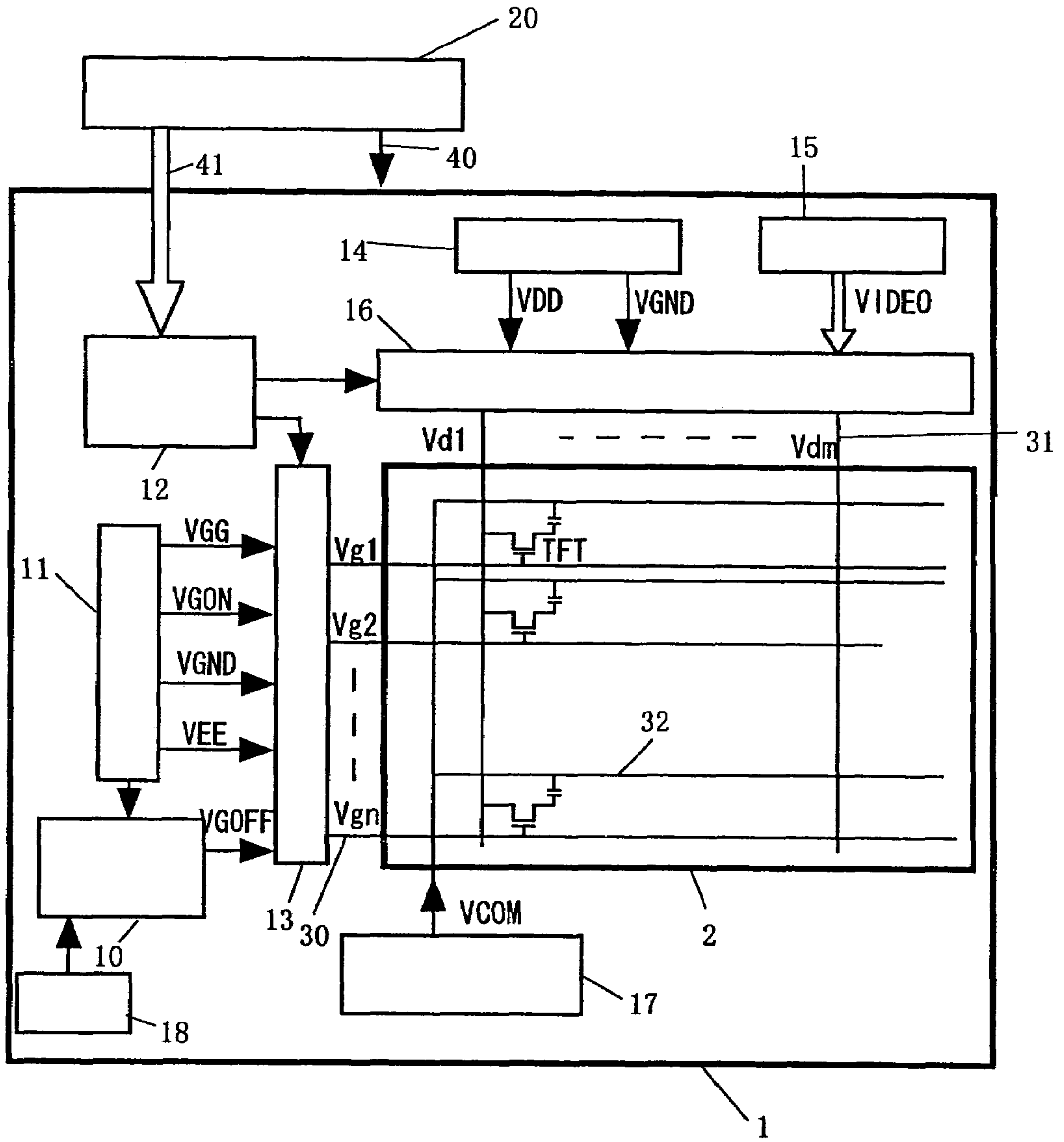
FIG. 4 is a view showing the constitution of one embodiment of a liquid crystal display device according to the present invention.

FIG. 1 illustrates the case in which the potential is not supplied to the gate OFF voltage control circuit 10 from the common voltage generation circuit 17. However, the liquid crystal display device 1 may be constituted as shown in FIG. 2 in which the potential is supplied to the gate OFF voltage control circuit 10 from the common voltage generation circuit 17. The constitution shown in FIG. 2 can be more easily formed from a viewpoint of an actual circuit constitution. Further, as shown in FIG. 3, the liquid crystal display device 1 may be provided with a voltage storage circuit 18 separately, wherein immediately after stopping the supply of the display power 40, the potential for generating the leak potential in the gate OFF voltage control circuit 10 or the potential for operating the gate OFF voltage control circuit 10 per se may be supplied from the voltage storage circuit 18. In this case, it becomes possible to obtain an advantageous effect that even when the circuit can be large-sized, the control of the leak potential is facilitated or alternatively the operation of the gate OFF voltage control circuit is made stable. FIG. 3 and FIG. 4 correspond to FIG. 1. and FIG. 2.

Further, by combining the above-mentioned constitution with the constitutions of one or a plurality of embodiments 1 to 8, the advantageous effect can be further enhanced in any one of a plurality of these embodiments 1 to 8.

Embodiment 10

Figure 8:
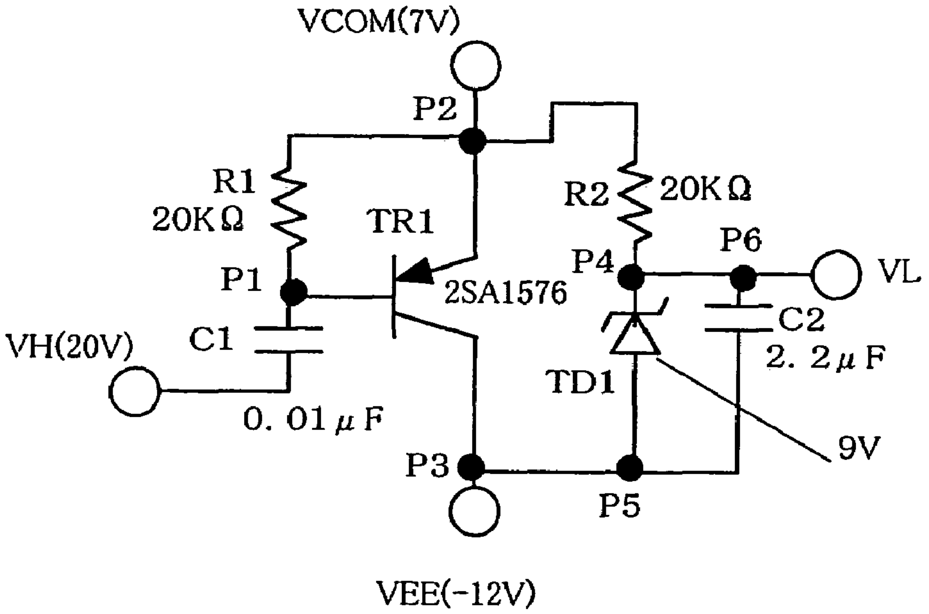
FIG. 8 is a view showing one embodiment of a circuit used in a liquid crystal display device according to the present invention.

A further example of the gate OFF voltage control circuit 10 of the embodiment 9 is shown in FIG. 8. However, this embodiment is not limited to the power, the voltage values, the circuit constants, the constitution and parts described in the drawing. That is, FIG. 8 shows only an example for the purpose of explanation of the concept of the operation and all circuit constitutions which can obtain the similar operational result are included in this embodiment.

In FIG. 8, in the usual state, the supply of display power is stopped at three potentials, that is, the potential VH corresponding to the potential VGON in FIG. 1 (or equal to the potential VGON), the potential VCOM and the potential VEE as the voltage, and when the lowering of the voltage absolute value starts, the potential VL is changed over from the usual potential to the leak potential. The operation of the circuit shown in FIG. 8 is explained in conjunction with the graph shown in FIG. 9.

First of all, in performing the usual operation, at a time before a point of time T1, the voltage VL is supplied as a potential which exceeds the voltage VEE by a fixed voltage due to a Zener diode TD1 provided between the VEE terminal and the VL terminal. In FIG. 8, since 9 V is used as the fixed voltage, the voltage which is higher than the potential VEE by 9 V is supplied to the potential VL. In this state, a transistor element TR1 interposed between the potential VCOM and the potential VEE is in the OFF state.

Figure 9:
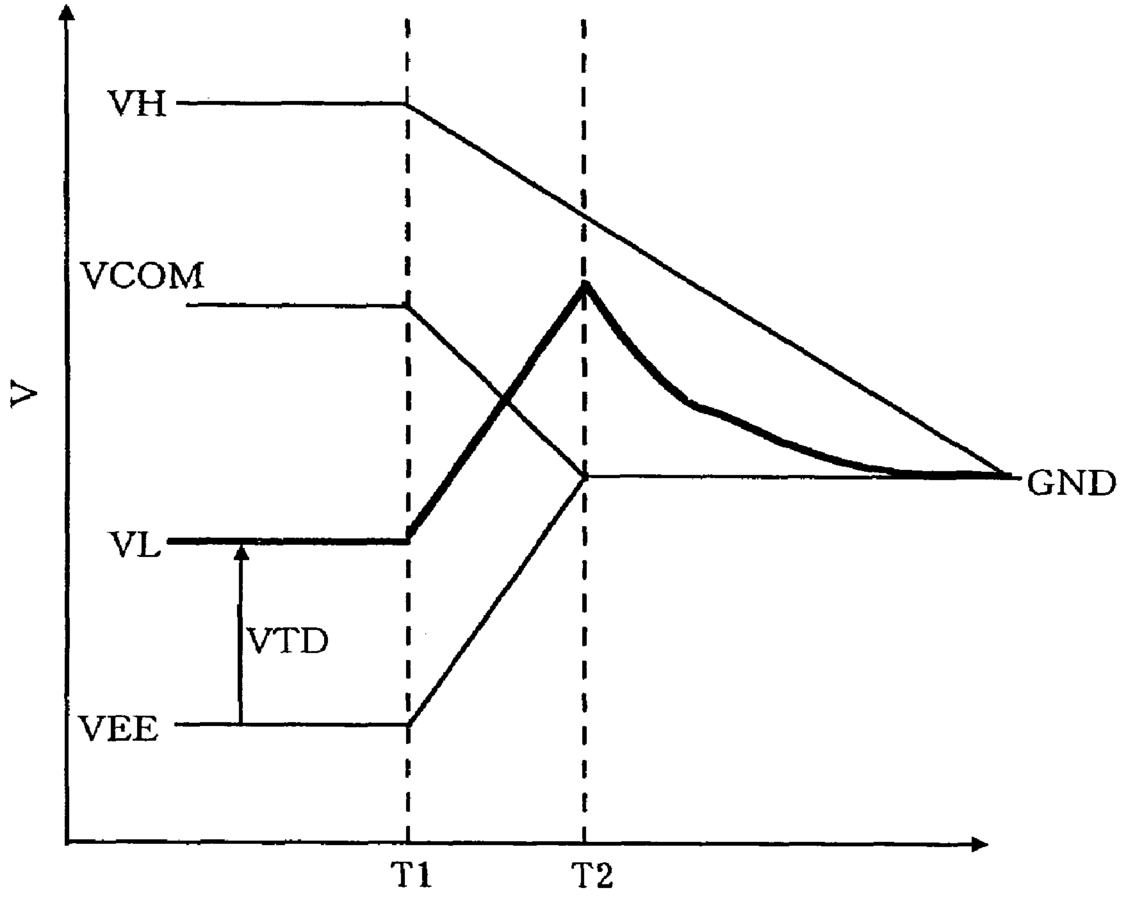
FIG. 9 is a graph showing the voltage change of one embodiment of a liquid crystal display device according to the present invention.

Subsequently, when the supplying of power is interrupted at a point of time T1, the potential VH starts the lowering thereof and approaches the GND potential. Here, a P1-side potential of a capacitor C1 is lowered correspondingly and hence, the potential of a point P1 becomes lower than the potential of a point P2 by not less than a threshold value. Accordingly, the transistor TR1 assumes the conductive state so that the points P2 and P3 are short-circuited. As a result, the voltage VEE at the point P3 and the voltage VCOM at the point P2 are cancelled each other so that these voltages rapidly approach the GND potential. Simultaneously, this, implies that the voltage value at the point P5 (=potential at the point P3) is sharply elevated from the minus potential to the GND potential. Accordingly, the potential VL at the position P4 (=potential at the point P6) is sharply elevated as shown in FIG. 9 due to the presence of the Zener diode TD1.

Finally, when the potential of the point P5 reaches the GND potential at a point of time T2, the potential at the point 4 also assumes the maximum value. Thereafter, the potential at the point P4, that is, the potential VL is gradually lowered toward the GND potential. At this point of time, it is preferable that the capacitor C2 is interposed between the point P5 and the point P6. This is because that the period until the potential VL falls to the GND potential after the potential VL reaches the maximum value at a point of time T2 can be prolonged. Although the Zener diode TD1 per se has the capacitance component so that the Zener diode TD1 may be also used as a capacitor, it is preferable to use the separate capacitance element to stabilize the capacitance and to control the time prolonging effect.

Returning back to FIG. 9, the potential VL exhibits the mountain-like characteristic in which, in the operation after the time T1, the potential VL is once elevated to a value between the potential VL and the potential VH and thereafter reaches the GND potential. This particular characteristic is important. Accordingly, since the VL output of the gate OFF voltage control circuit exhibits this characteristic, or this voltage appears at a gate OFF voltage input terminal of the scanning signal drive circuit, or this characteristic appears at the potential of the scanning signal lines, the constitution which supplies the leak potential to the scanning signal lines after the supply of the display power is stopped and leaks the charge of the pixel electrodes using the leak potential can be realized.

Further, as mentioned above, the characteristics of the gate OFF voltage control circuit 10 of the present invention lies in that the circuit returns the voltage drop after stopping the supplying of power to the original level thus forming the leak potential which is different from the potential of the usual operational state. This potential is formed based on the charged remaining or stored in the inside of the circuit of the liquid crystal display device 1 at the point of time of interrupting the supplying of power. In this manner, since the constitution can be completed in the inside of the liquid crystal display device 1, it becomes possible to obtain a remarkable advantageous effect that the liquid crystal display device can easily replace an existing liquid crystal display device.

Further, by combining the above-mentioned constitution with the constitutions of one or a plurality of embodiments 1 to 9, the advantageous effect can be further enhanced in any one or a plurality of these embodiments 1 to 9.

Embodiment 11

Figure 10:
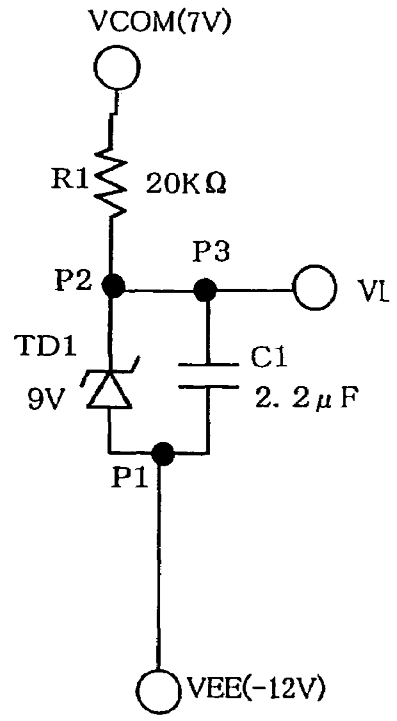
FIG. 10 is a view showing one embodiment of a circuit used in a liquid crystal display device according to the present invention.

A further example of the gate OFF voltage control circuit of the embodiment 9 is shown in FIG. 10. However, this embodiment is not limited to the power, the voltage values, the circuit constants, the constitution and parts described in the drawing. That is, FIG. 10 shows only an example for the purpose of explanation of the concept of the operation and all circuit constitutions which can obtain the similar operational result are included in this embodiment.

In FIG. 10, using two potentials VCOM and VEE as the voltages, the leak potential is formed by lowering the voltage absolute value at the time of stopping the supply of display power. In this manner, the gate OFF voltage control circuit has the simple constitution which includes only the passive elements.

In FIG. 10, a resistor R1 is interposed between the potential VCOM and the VL potential P2, a Zener diode TD1 is interposed between the potential VEE and the VL potential point P2, and a capacitor C1 is arranged parallel to the Zener diode TD1. The resistor R1 is provided for stabilizing the VL potential at the time of performing the usual operation. The manner of operation of the circuit shown in FIG. 10 is explained in conjunction with FIG. 11.

First of all, at the time of performing the usual operation, during the period before the time T1, the potential VL is supplied as a potential which exceeds the voltage VEE by a fixed voltage due to the Zener diode TD1 provided between the VEE terminal and the VL terminal. In FIG. 10, since 9V is used as the fixed voltage, the voltage which is higher than the potential VEE by 9 V is supplied to the potential VL.

Subsequently, when the supplying of power is interrupted at a point of time T1, the potential VEE starts its elevation toward the GND potential. Due to the presence of the Zener diode TD1, the VL potential becomes higher than the potential VEE by an amount corresponding to the characteristic value of the Zener diode TD1 and hence, the potential VL is also simultaneously elevated.

Finally, when the potential of the point P1 reaches the GND potential at a point of time T2, the potential at the point P2 also assumes the maximum value. Thereafter, the potential at the point P2, that is, the potential VL is gradually lowered toward the GND potential. At this point of time, in the same manner as the embodiment 10, it is preferable that a capacitor C1 is interposed in parallel with the Zener diode TD1.

Figure 11:
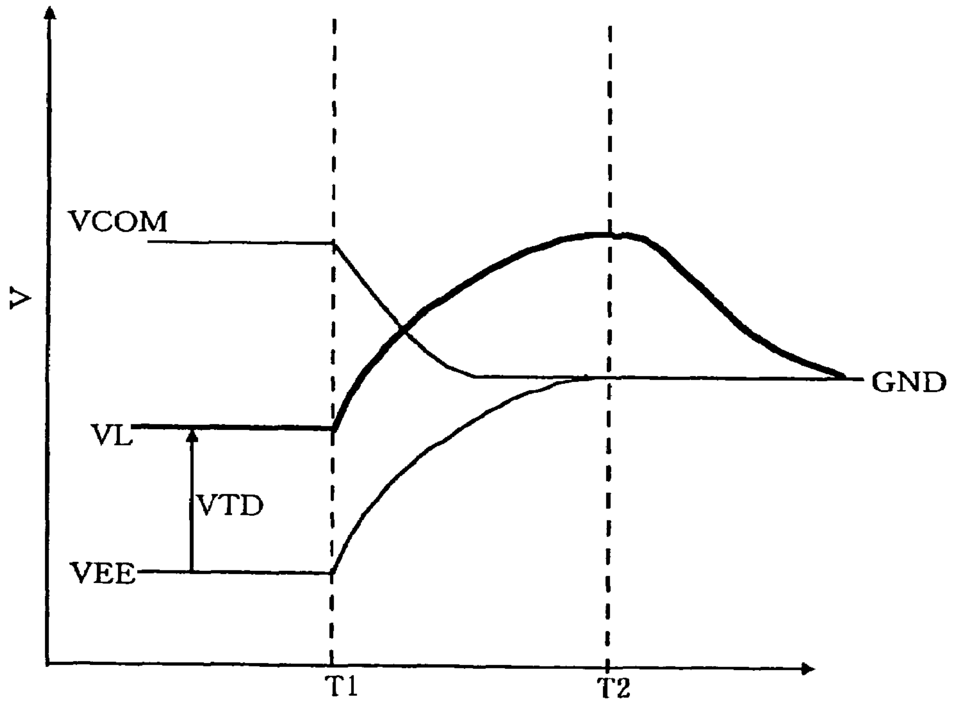
FIG. 11 is a graph showing the voltage change of one embodiment of a liquid crystal display device according to the present invention.

In the same manner as the characteristic shown in FIG. 9 of the embodiment 10, in FIG. 11, the potential VL exhibits the mountain-like characteristic in which, in the operation after a point of time T1, the potential VL is once elevated and thereafter reaches the GND potential. This particular characteristic is important. Accordingly, since the VL output of the gate OFF voltage control circuit exhibits this characteristic, or this voltage appears at a gate OFF voltage input terminal of the scanning signal drive circuit, or this characteristics appears at the potential of the scanning signal lines, the constitution which supplies the leak potential to the scanning signal lines after stopping the supply of the display power and leaks the charge of the pixel electrodes using the leak potential can be realized.

Further, as mentioned above, the characteristics of the gate OFF voltage control circuit 10 of the present invention lies in that the circuit returns the voltage drop after stopping the supplying of power to the original level thus forming the leak potential which is different from the potential of the usual operational state. This potential is formed based on the charge remaining or stored in the inside of the circuit of the liquid crystal display device 1 at the point of time of interrupting the supplying of power. In this manner, since the constitution can be completed in the inside of the liquid crystal display device 1, it becomes possible to obtain a remarkable advantageous effect that the liquid crystal display device can easily replace an existing liquid crystal display device.

Further, this embodiment has a remarkable advantageous effect that the liquid crystal display device has no active elements and hence, the device can be constituted at a low cost.

Further, by combining the above-mentioned constitution with the constitutions of one or a plurality of embodiments 1 to 9, the advantageous effect can be further enhanced in any one of or a plurality of these embodiments 1 to 9.

Embodiment 12

Figure 12:
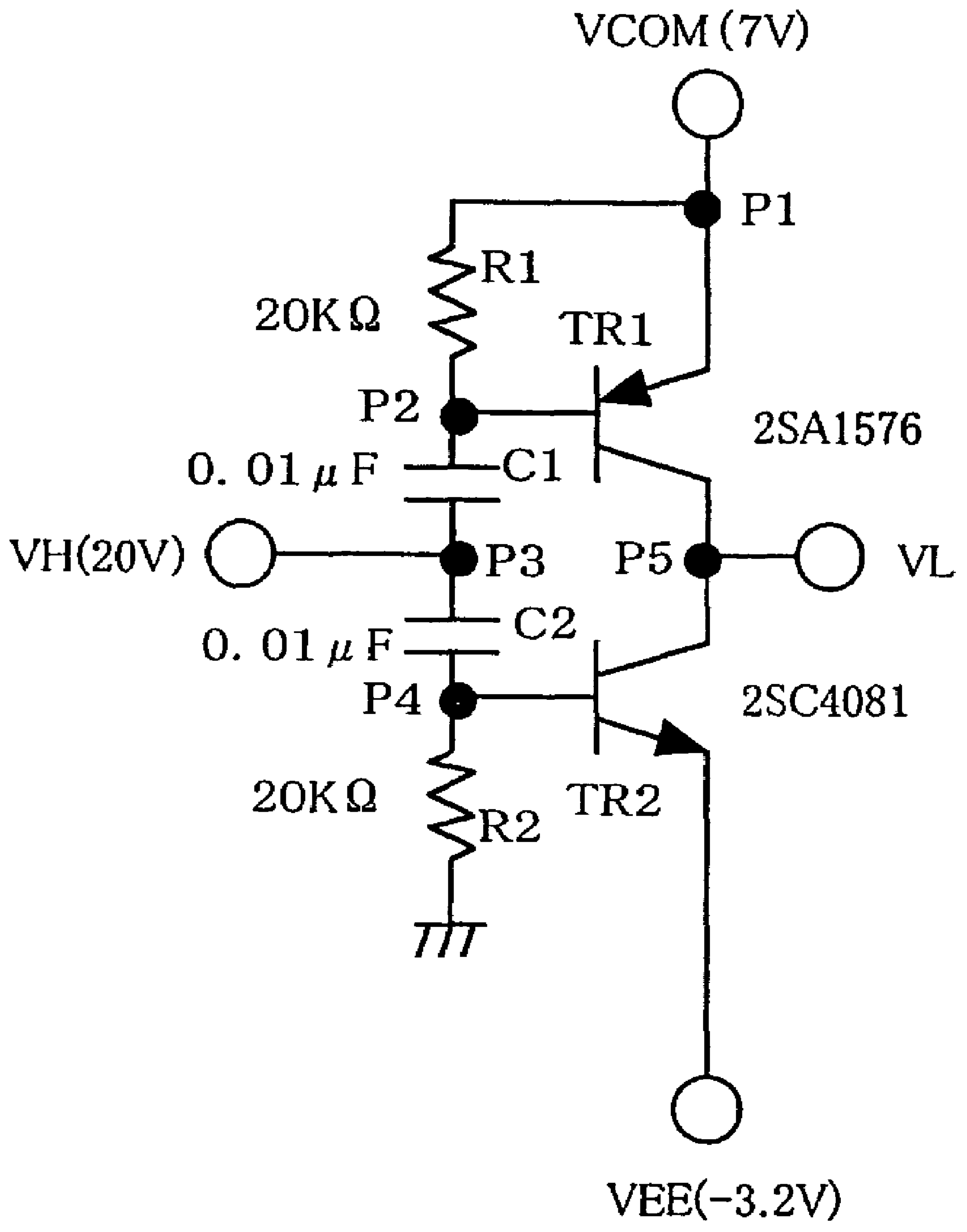
FIG. 12 is a view showing one embodiment of a circuit used in a liquid crystal display device according to the present invention.

A further example of the gate OFF voltage control circuit of the embodiment 9 is shown in FIG. 12. However, this embodiment is not limited to the power, the voltage values, the circuit constants, the constitution and parts described in the drawing. That is, FIG. 12 shows only an example for the purpose of explanation of the concept of the operation and all circuit constitutions which can obtain the similar operational result are included in the category of this embodiment.

Figure 13:
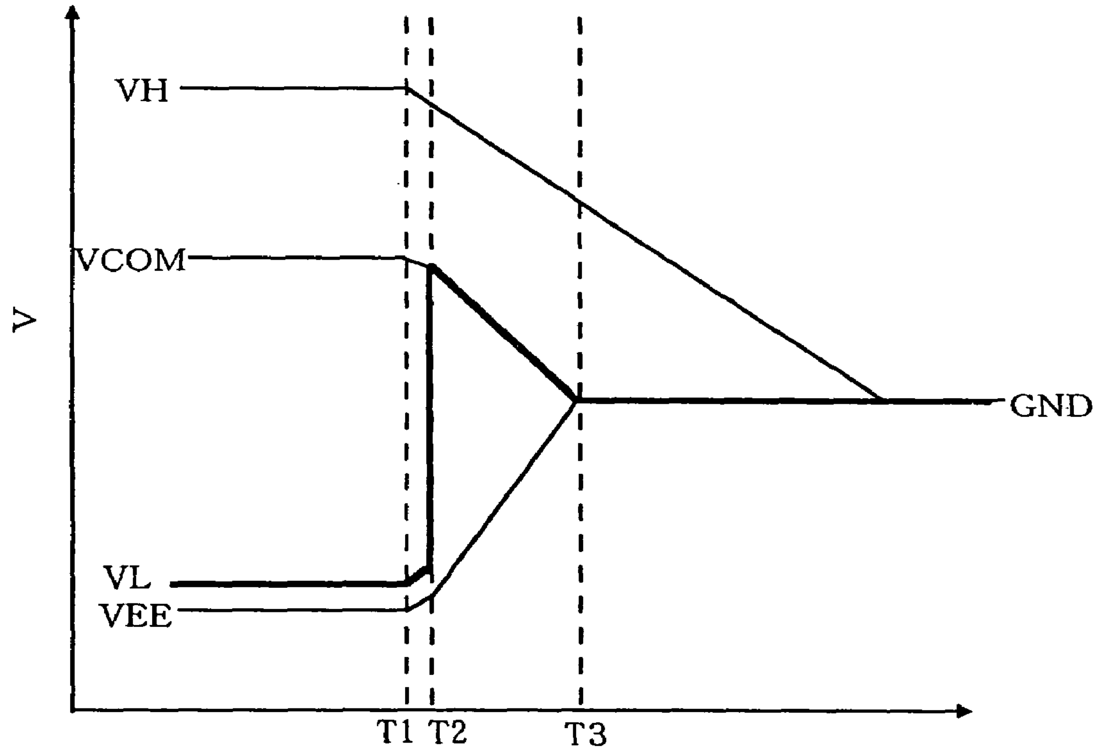
FIG. 13 is a graph showing the voltage change of one embodiment of a liquid crystal display device according to the present invention.

In FIG. 12, three potentials, that is, the potential VH which corresponds to the potential VGON in FIG. 1, the potentials VCOM and the potential VEE are used as the voltages and when the supply of display power is stopped and the lowering of the voltage absolute value is started, the potential VL is changed over from the usual potential to the leak potential. The manner of operation of the circuit shown in FIG. 12 is explained in conjunction with a graph shown in FIG. 13.

First of all, at the time of performing the usual operation, during the period before the time T1, the transistor TR1 is in the OFF state and the transistor TR2 is in the ON state. Accordingly, the point P5 and the potential VEE are in the conductive state through the transistor TR2 and the potential VL is higher than the potential VEE by an amount corresponding to the voltage loss of the transistor TR2.

Subsequently, when the supply of the power is interrupted at a point of time T1, the potential VH starts the lowering thereof toward the GND potential. At this point of time, a P2-side of a capacitor C1 is lowered correspondingly and the potential at the point P2 is lowered by an amount not less than a threshold value. Accordingly, the transistor TR1 assumes the conductive state and the potential at the point P5 between the transistors TR1 and TR2, that is, the VL potential immediately becomes the maximum potential.

Finally, when the potential VCOM is converged to the GND potential, the potential VL is also converged to the GND potential.

Returning back to FIG. 13, the potential VL exhibits the mountain-like characteristic in which, in the operation performed after a point of time T1, the potential VL is once elevated to a value between the potential VL and the potential VH and thereafter reaches the GND potential. This particular characteristic is important. Accordingly, since the VL output of the gate OFF voltage control circuit exhibits this characteristic, or this voltage appears at a gate OFF voltage input terminal of the scanning signal drive circuit, or this characteristics appears at the potential of the scanning signal lines, the constitution which supplies the leak potential to the scanning signal lines after stopping the supply of the display power and leaks the charge of the pixel electrodes using the leak potential can be realized.

Further, as mentioned above, the characteristics of the gate OFF voltage control circuit 10 of the present invention lies in that the circuit returns the voltage drop after stopping the supplying of power to the original level thus forming the leak potential which is different from the potential of the usual operational state. This potential is formed based on the charge remaining or stored in the inside of the circuit of the liquid crystal display device 1 at the point of time of interrupting the supplying of power. In this manner, since the constitution can be completed in the inside of the liquid crystal display device 1, it becomes possible to obtain a remarkable advantageous effect that the liquid crystal display device can easily replace an existing liquid crystal display device.

Further, in this embodiment, the time until the potential VL reaches the maximum potential after the interruption of the supplying of power is extremely small. By properly selecting members, the specification of the members and the circuit constitution, the time can be shortened to not more than 1 second. Accordingly, it becomes possible to leak the pixel electrode in an extremely short period so that this embodiment can exhibit an extremely high flickering preventing effect with respect to a point that the storage of the charge to the orientation film can be further suppressed.

Further, by combining the above-mentioned constitution with the constitutions of one or a plurality of embodiments 1 to 9, the advantageous effect can be further enhanced in any one of or a plurality of these embodiments 1 to 9.

Embodiment 13

Figure 14:
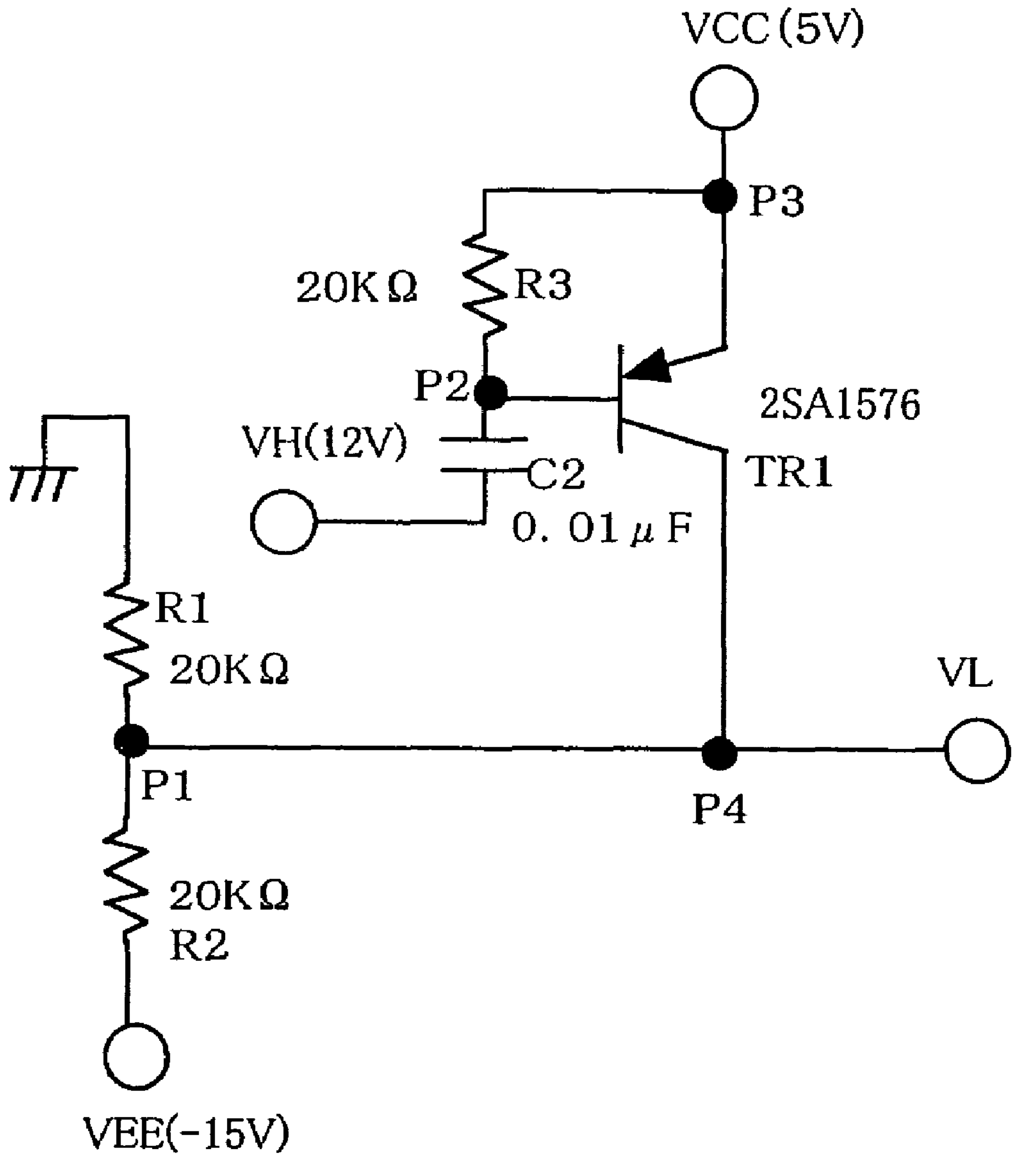
FIG. 14 is a view showing one embodiment of a circuit used in a liquid crystal display device according to the present invention.

A further example of the gate OFF voltage control circuit of the embodiment 9 is shown in FIG. 14. However, this embodiment is not limited to the power, the voltage values, the circuit constants, the constitution and parts described in the drawing. That is, FIG. 14 shows only one example for the purpose of explanation of the concept of the operation and all circuit constitutions which can obtain the similar operational result are included in the category of this embodiment.

In FIG. 14, three potentials, that is, the potential VH which correspond to the potential VGON in FIG. 1, the potential VCC which corresponds to the potential VGG and the potential VEE are used as the voltages and when the supply of display power is stopped and the lowering of the voltage absolute value is started, the potential VL is changed over from the usual potential to the leak potential.

That is, the voltage which is divided by the resistors R1 and R2 between the potential VEE and the GND potential becomes the potential VL at the time of performing the usual operation. On the other hand, at the time of interrupting the supplying of power, the potential VH is lowered and hence, the potential of the transistor TR1 at the point P2 is lowered below the potential at the point P3 by an amount exceeding a threshold value. Accordingly, the potential VCC is supplied to the potential VL thus exhibiting the mountain-like potential fluctuation that the VL potential is elevated and then is gradually converged to the GND potential.

Further, as mentioned above, the characteristics of the gate OFF voltage control circuit 10 of the present invention lie in that the circuit returns the voltage drop after stopping the supplying of power to the original level thus forming the leak potential which is different from the potential of the usual operational state. This potential is formed based on the charge remaining or stored in the inside of the circuit of the liquid crystal display device 1 at the point of time of interrupting the supplying of power. In this manner, since the constitution can be completed in the inside of the liquid crystal display device 1, it becomes possible to obtain a remarkable advantageous effect that the liquid crystal display device can easily replace an existing liquid crystal display device.

Further, by combining the above-mentioned constitution with the constitutions of one or a plurality of embodiments 1 to 9, the advantageous effect can be further enhanced in any one or a plurality of these embodiments 1 to 9.

Embodiment 14

Figure 15:
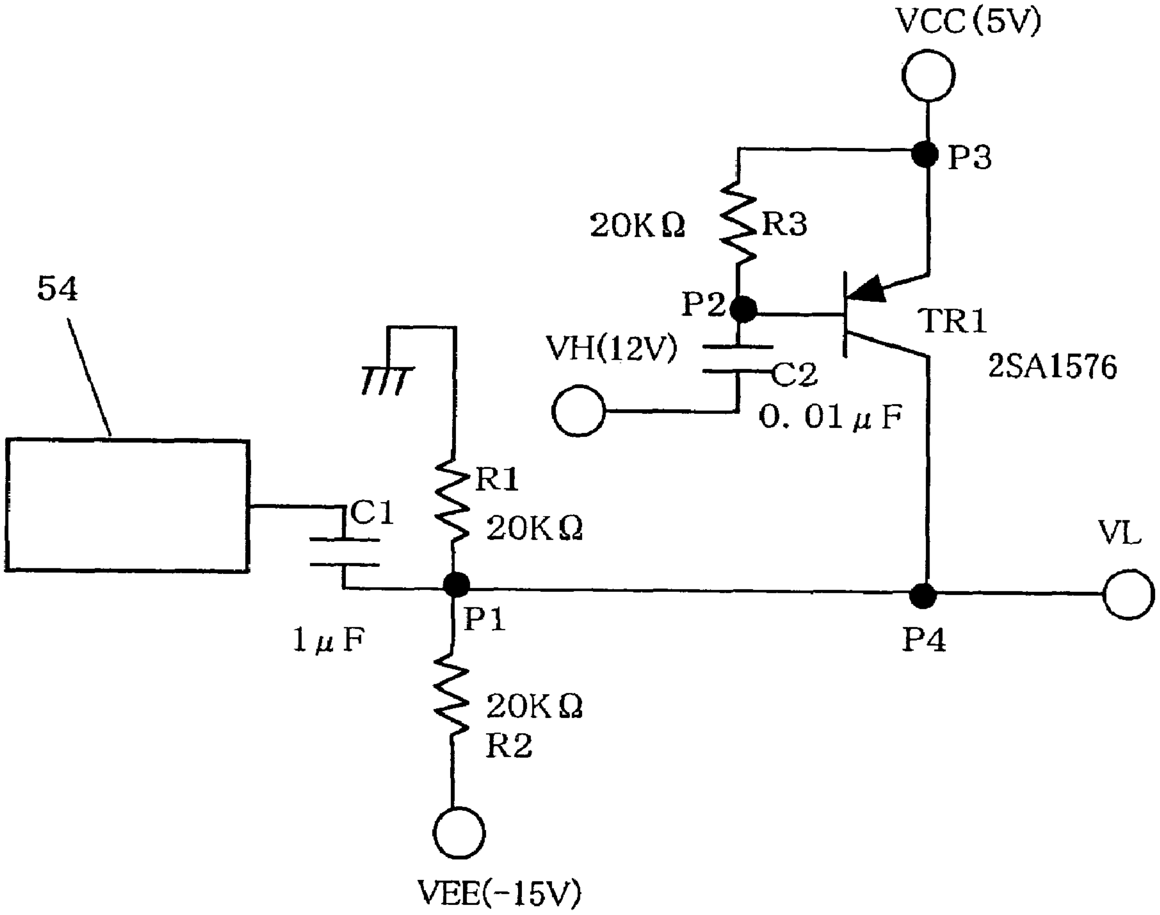
FIG. 15 is a view showing one embodiment of a circuit used in a liquid crystal display device according to the present invention.

This embodiment is a modification of the embodiment 13. FIG. 15 is a view which corresponds to FIG. 14 of the embodiment 13. The constitution shown in FIG. 15 differs from the constitution of FIG. 14 in that the capacitor C1 and a VL pulse generating circuit 54 are formed behind the point P1. Due to such a constitution, in addition to the advantageous effects obtained by the embodiment 13, it becomes possible to modulate the OFF potential of the gate with a phase equal to that of a common potential in the usual driving at the time of performing the common inversion driving.

Embodiment 15

This embodiment provides an exclusive resetting function in place of the gate OFF voltage control circuit of the embodiment 9 and resets the potential in the inside of the pixels using this resetting function.

The resetting function may be realized by a constitution in which the scanning signal drive circuit is provided with an exclusive circuit which outputs an intermediate potential between the ON potential and the OFF potential and this exclusive circuit outputs the intermediate potential upon sensing the potential VDD or the lowering of the potential VDD. As an example of the circuit, the circuit shown in the embodiment 9 to the embodiment 14 may be incorporated into the scanning signal drive circuit.

Due to such a constitution, the flickering can be reduced in the same manner as the above-mentioned embodiments. Further, by combining the above-mentioned constitution with the constitutions of one or a plurality of embodiments 1 to 9, the advantageous effect can be further enhanced in any one or a plurality of these embodiments 1 to 9.

Embodiment 16

This embodiment is characterized by constituting an image display device which can prevent the generation of flickering even when power is supplied again within a short period after the interruption of the supplying of power by using any one of the liquid crystal display devices described in the embodiments 1 to 15.

Figure 33:
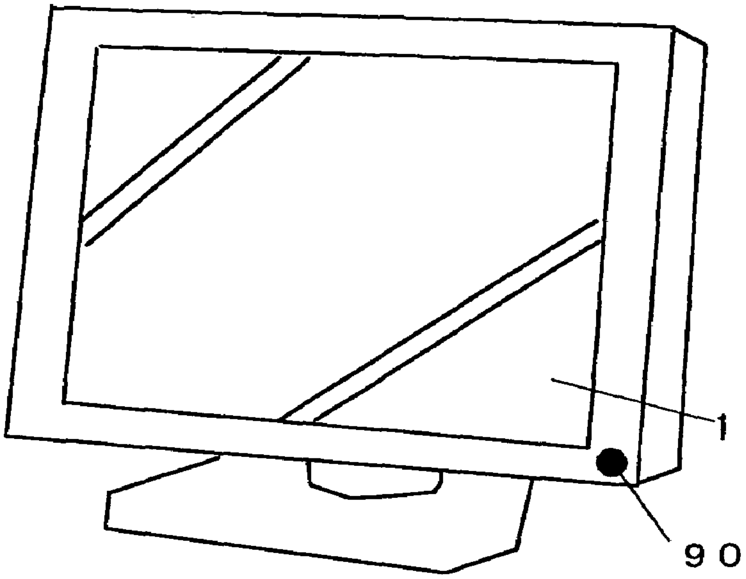
FIG. 33 is a view showing one embodiment of an image display device which uses a liquid crystal display device according to the present invention.
Figure 34:
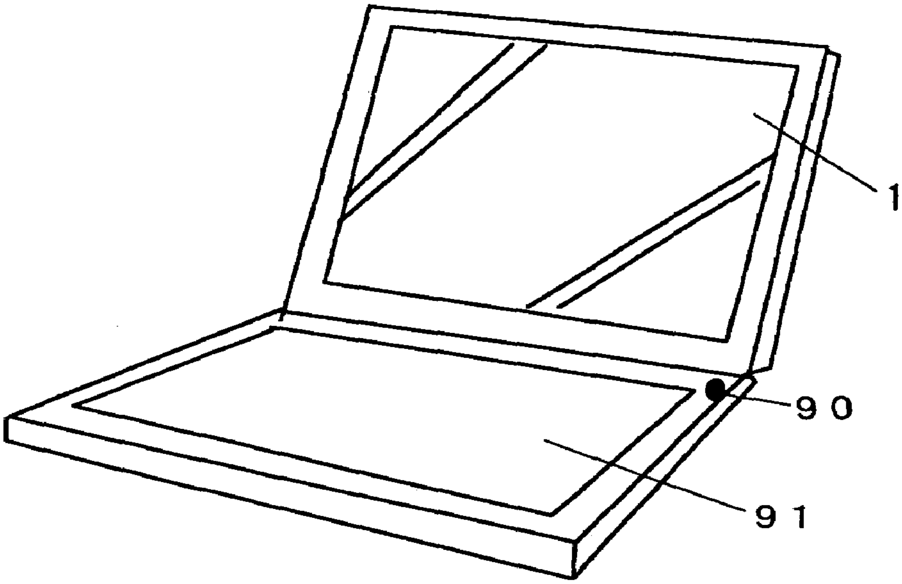
FIG. 34 is a view showing one embodiment of an image display device which uses a liquid crystal display device according to the present invention.
Figure 35:
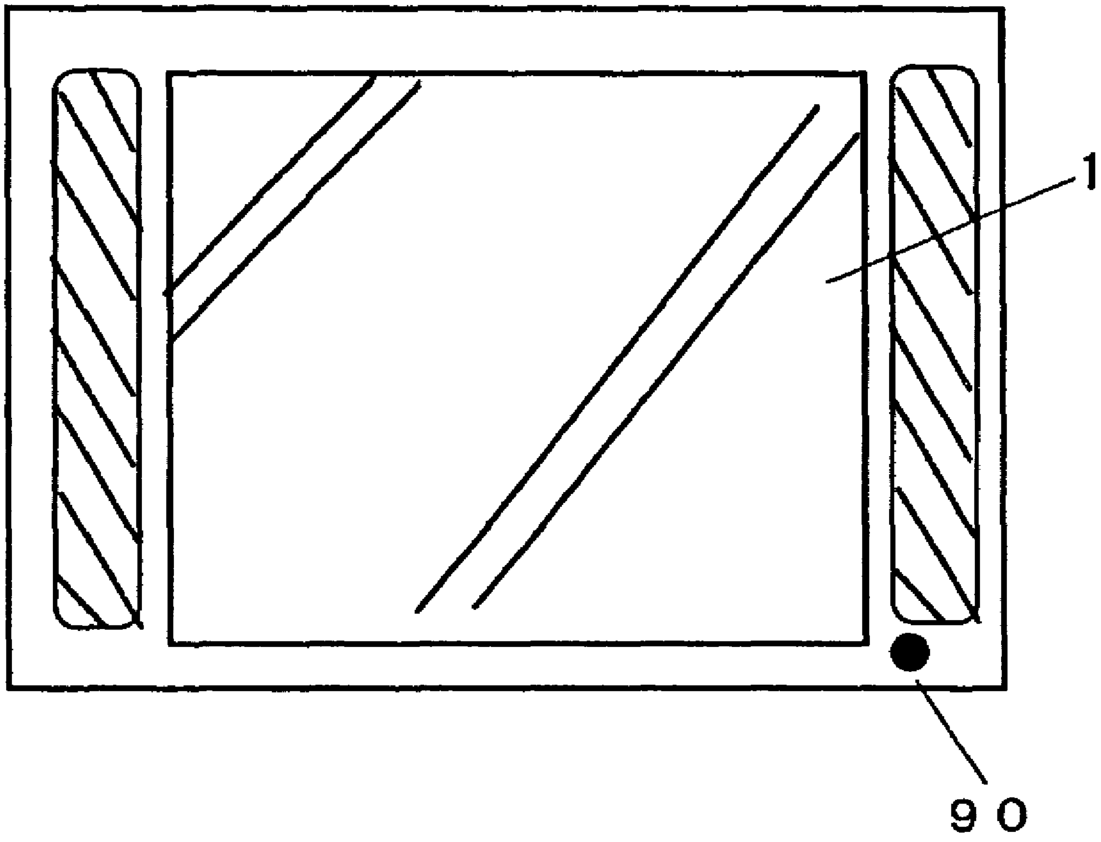
FIG. 35 is a view showing one embodiment of an image display device which uses a liquid crystal display device according to the present invention.

An example of the image display device which is constituted in a liquid crystal monitor mode is shown in FIG. 33. An example of the image display device which is constituted in a notebook type personal computer mode is shown in FIG. 34. An example of the image display device which is constituted in a liquid crystal television set mode is shown in FIG. 35. Further, the image display device may be constituted in other mode such as a PDA mode or a liquid-crystal-integral-type personal computer mode besides the above-mentioned modes.

Any one of the devices of this embodiment is characterized by having a power supply switch 90. Due to such a provision, it becomes possible for a user to repeat the interruption and the restarting the supplying of power in a short time and hence, on the contrary, with the use of the any one of the liquid crystal display devices described in the embodiments 1 to 15, it becomes necessary to prevent the generation of flickering at the time of interrupting or restarting the supplying of power.

Embodiment 17

Figure 36:
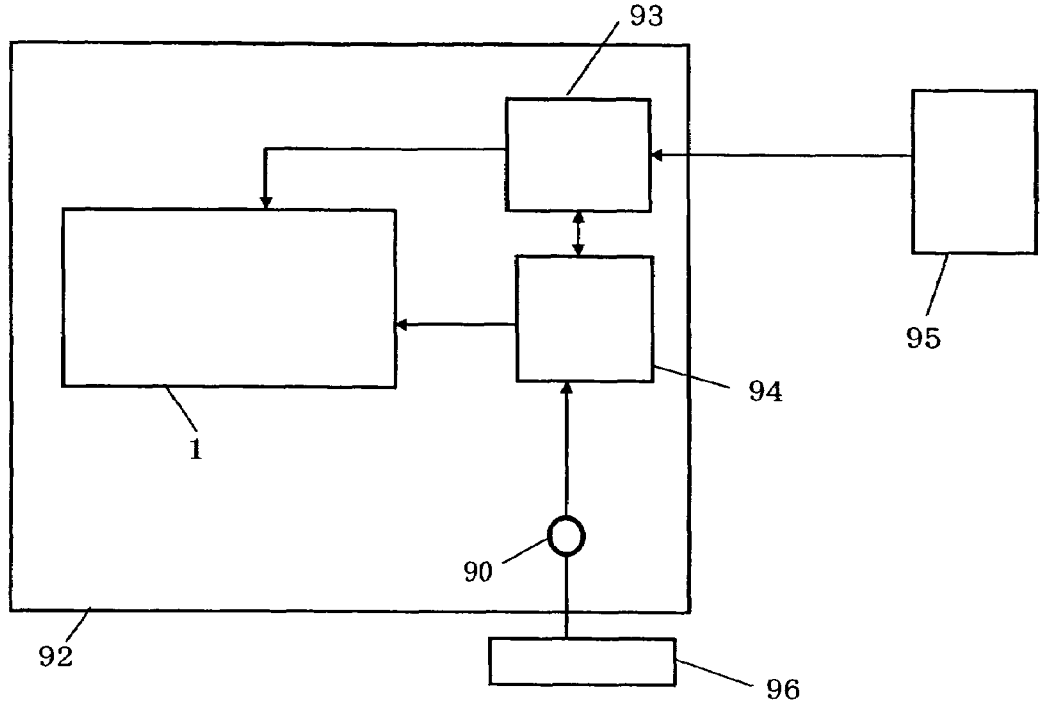
FIG. 36 is a view showing one embodiment of an image display device which uses a liquid crystal display device according to the present invention.

FIG. 36 shows the manner of supplying power to the liquid crystal display device 1 of the image display device shown in the embodiment 16. In a housing 92, the liquid crystal display device 1, a control circuit 93, a power supply circuit 94 and the power supply switch 90 are provided. The control circuit 93 and the power supply circuit 94 constitute the system circuit indicated by numeral 20 in FIG. 1 when viewed with reference to the liquid crystal display device 1. A voltage with which the power supply circuit is compatible is supplied to the power supply circuit from an external power supply 96 irrespective of whether the voltage is AC or DC.

In this constitution, the signals are inputted to the control circuit 93 from the external CPU 95 and the power supply circuit 94 is instructed by the control circuit 93 to supply power to the liquid crystal display device 1 or to interrupt such a supplying of power.

Further, from a viewpoint of the reduction of the unnecessary power consumption, the control circuit 93 is provided with a function of stopping the supplying of power to the liquid crystal display device 1 when there are no inputting of signals from a CPU for a fixed time. Accordingly, the control circuit 93 is configured to perform the interruption of the supplying of power and the restarting of the supplying of power relatively frequently and hence, the countermeasures to cope with the flickering generated in the process becomes further necessary.

Further, with respect to a recent CPU device, when there is no manipulation of an inputting device by a user for a fixed time, from a viewpoint of the low power consumption, a function to instruct the control unit to shift the operation mode to the low power consumption mode is incorporated in the CPU device on an OS level in advance while centering around a so-called WINDOW-system OS. Upon receiving the instruction to shift the operation mode to the low power consumption mode which is generated here, the control circuit 93 instructs the interruption to the power supply circuit 94. Particularly, with respect to the power saving function which is incorporated into the CPU device in an OS level, along with the spreading of personal computers to users of all walks of life, users who do not know the manner of changing the setting time are increasing in number.

These users are usually instructed to move a mouse when a monitoring disappears during operation. In such a case, they tend to promptly turn on the monitor again by moving a mouse when the screen disappears during the manipulation. Here, when the supplying of power to the liquid crystal display device 1 from the power supply circuit 94 is interrupted, the power is immediately supplied to the monitor again. Accordingly, the situation in which the flickering frequently occurs becomes the usual mode of operation. Further, from a viewpoint of the low power consumption, a trend in which the setting time until the CPU outputs an instruction to shift the operation mode to the low power consumption mode is required to be shortened will arise. The inventors are afraid this trend further accelerate the situation that the flickering frequently occurs in the usual mode of operation.

To cope with such a problem, the inventors have realized the use of the liquid crystal display devices of the present invention described in the embodiments 1 to 16 as the liquid crystal display device of the image display device. With the use of such liquid crystal display device, it becomes possible to meet the further demand for the low power consumption of the image display device.

Figure 37:
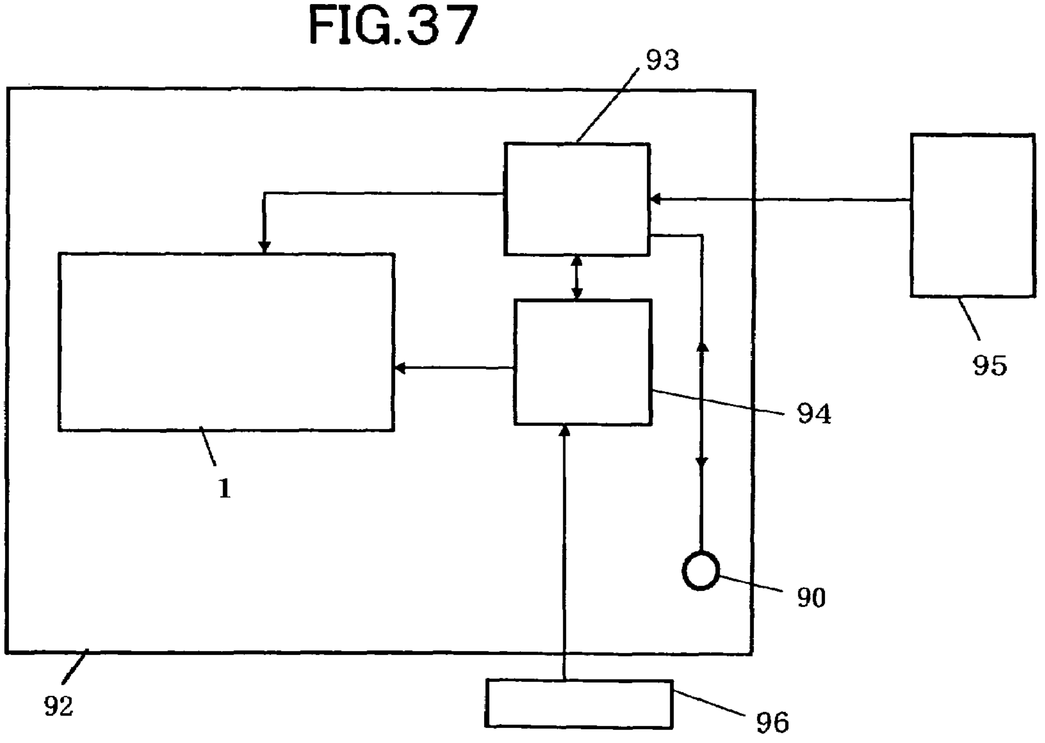
FIG. 37 is a view showing one embodiment of an image display device which uses a liquid crystal display device according to the present invention.

Further, the power supply switch 90 may be constituted of a software switch and an example of the software switch is shown in FIG. 37.

Figure 38:
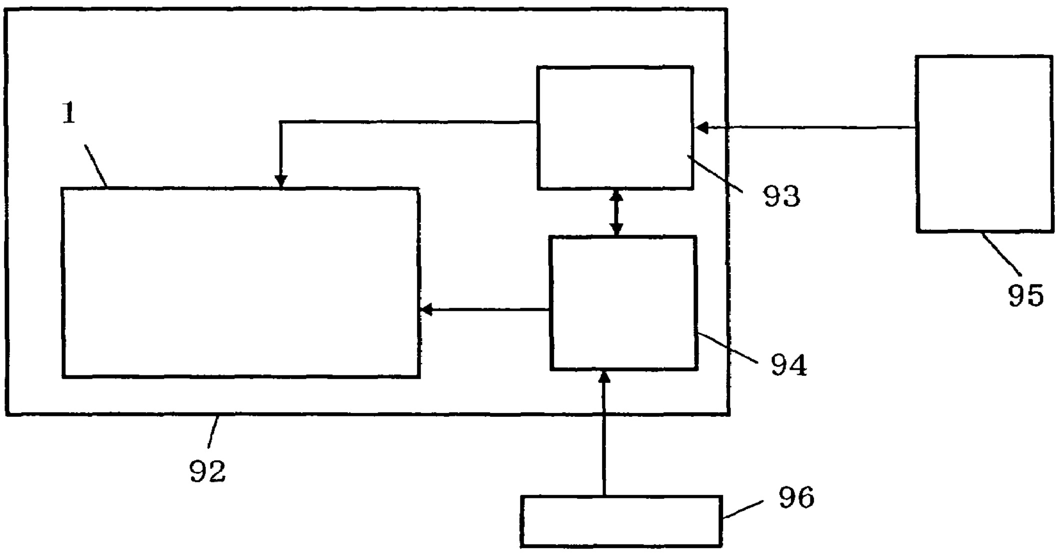
FIG. 38 is a view showing one embodiment of an image display device which uses a liquid crystal display device according to the present invention.

The power supply switch is irrelevant to the flickering due to the interruption or the restarting of the supplying of power which is generated by the combination of the low power consumption mode shifting instruction from the CPU and the manipulation by the user and hence, the power supply switch may be eliminated as shown in FIG. 38.

Figure 39:
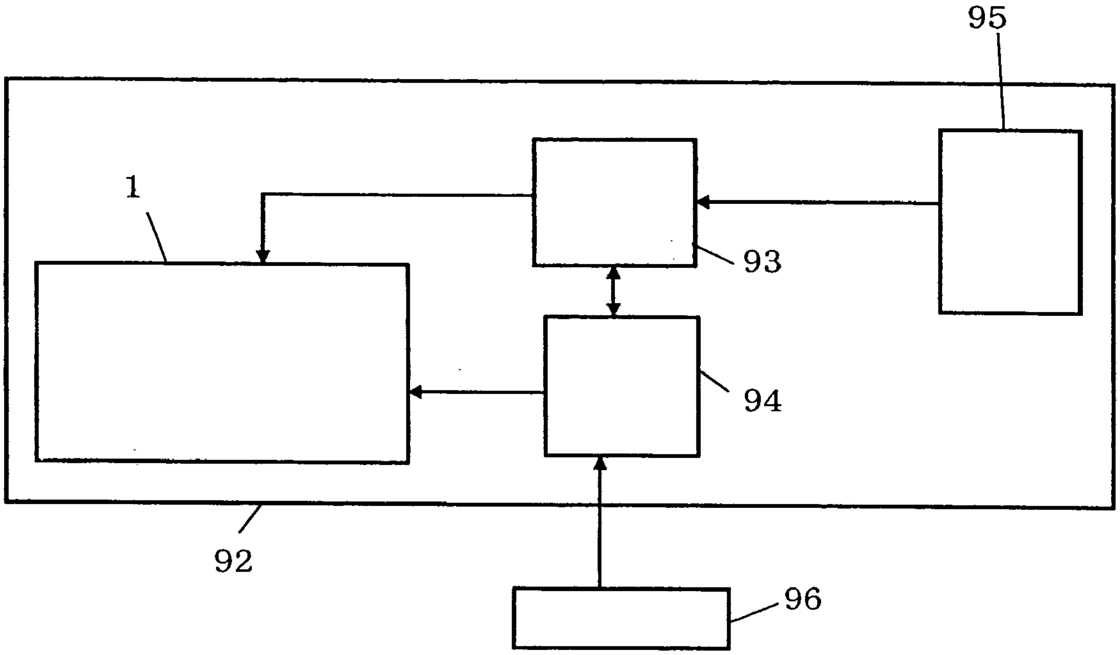
FIG. 39 is a view showing one embodiment of an image display device which uses a liquid crystal display device according to the present invention.

Further, as shown in FIG. 39, the CPU 95 may be constituted in the inside of the housing 92.

Figure 40:
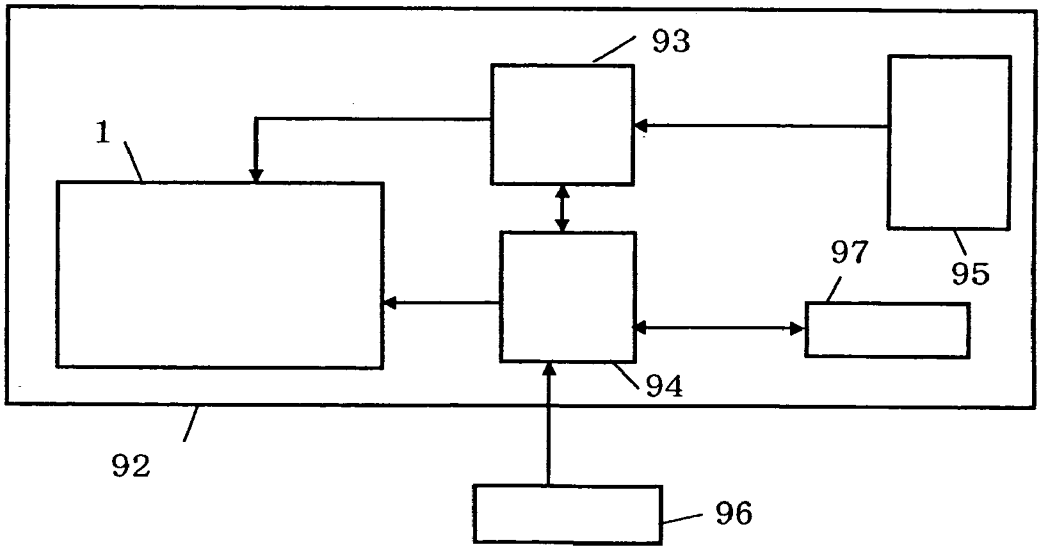
FIG. 40 is a view showing one embodiment of an image display device which uses a liquid crystal display device according to the present invention.

Still further, as shown in FIG. 40, a battery 97 may be incorporated into the inside of the housing 92.

The active elements in the inside of the pixels used in the embodiments 1 to 17 include MIMs besides the TFTs. In case the active elements are TFTs, they include the TFTs whose semiconductors layers are formed of amorphous silicon, the TFTs whose semiconductors layers are formed of polysilicon and the TFTs whose semiconductors layers are formed of crystalline silicon which is similar to single crystal. Particularly, with respect to the TFTs whose semiconductors layers are formed of polysilicon or crystalline silicon which is similar to single crystal, the photo conduction is less liable to be generated compared with amorphous silicon and hence, the reduction of the holding ratio using the photo conduction is, to the contrary, more difficult than the TFTs whose semiconductor layers are formed of amorphous silicon. Accordingly, it is desirable to form the light shielding layers for exclusive use which are different from the CFs only on either one of the video signal lines or the scanning signal lines or to form such light shielding layers only on upper portions of the TFTs or not to form such light shielding layers. Alternatively, it is preferable to use the above provisions along with the countermeasure derived from the circuit of the present invention or to use only the countermeasure derived from the circuit of the present invention.

Further, the transistor element of the gate OFF voltage control circuit is configured such that the transistor element is different from the transistor element in the inside of the pixel with respect to at least one of structure, constitution, size and characteristics. Further, the transistor element of the gate OFF voltage control circuit is to be configured such that the gate OFF voltage control circuit can withstand the larger current than the transistor element in the inside of the pixel.

Further, when an insulation layer is formed between the pixel electrodes and the orientation film, it is preferable to remove a portion of the insulation film such that the pixel electrode and the orientation film are directly brought into contact with each other at least at such a portion. Particularly, when the specific resistance of the liquid crystal layer is not more than $1\times10^{14}$, it becomes possible to expect an advantageous effect that the charge of the pixel electrode can be leaked through the liquid crystal layer. When the pixel electrodes are formed of metal, the pixel electrodes may be brought into contact with the orientation film through a transparent electrode. Due to such a constitution, the compatibility of the charge leaking effect and the prevention of corrosion of the metallic pixel electrodes can be realized. Further, even when the insulation layer is extended over the whole surface, so long as the specific resistance of the liquid crystal layer is not more than $1\times10^{14}$, a given advantageous effect can be expected.

Figure 43:
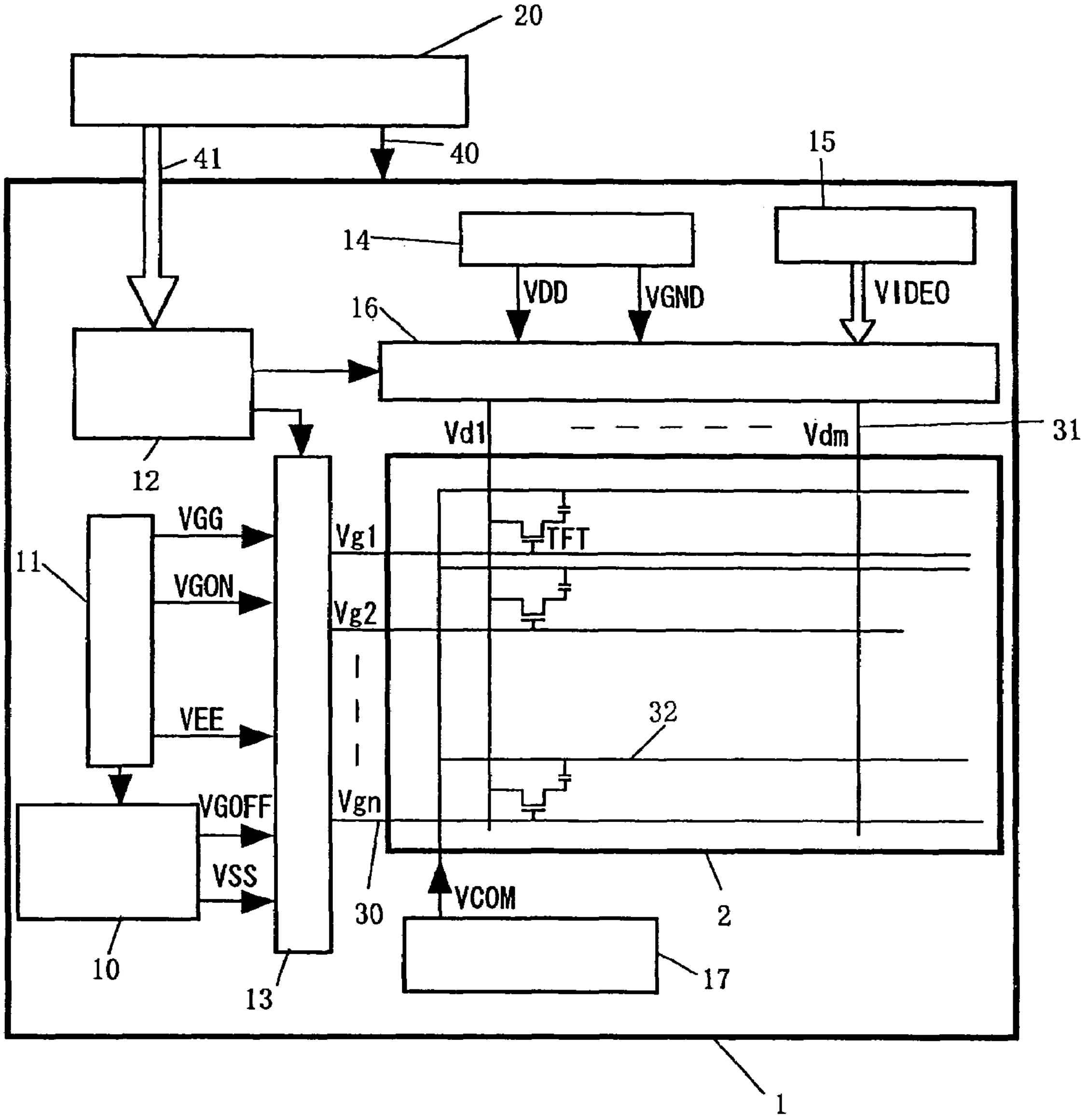
FIG. 43 is a conceptual view showing the constitution of one embodiment of a liquid crystal display device according to the present invention.

FIG. 43 is a view which shows the constitution of embodiment 18 of the liquid crystal display device of the present invention. To a liquid crystal display device 1, interface signals (hereinafter referred to as "I/F signals") 41 and display power 40 are inputted from a system circuit 20. The interface signals 41 and the display power 40 may be supplied through the same group of cables. Alternatively, they may supplied using a cable particularly separate from a cable for a BL (backlight) power supply. I/F signals 41 are inputted to a control circuit 12. Further, the display power 40 is supplied to a scanning power supply circuit 11, a common voltage generation circuit 17, a video power supply circuit 14 and a gray tone power supply circuit 15. These circuits 11, 17, 14, 15 may be integrally constituted.

From the video power supply circuit 14 to the video signal drive circuit 16, a logic voltage VDD for operating video signal driver circuit and a GND voltage VGND are supplied. Further, a gray scale voltage is supplied from the gray scale power supply circuit 15. The video signal drive circuit 16 inputs the video signals to the video signal line 31 in response to the signals from the control circuit 12. A reference voltage VCOM is supplied to the reference electrode from the common voltage generation circuit 17. Although the reference electrode is described as a line in the drawing, the description is made only for the convenience sake. Accordingly, the reference electrode has not only a line shape but also a plane shape. Further, the reference electrode may be on the same substrate or on the separate substrate.

Further, a logic voltage VGG for operating scanning signal drive circuit, an ON potential voltage VGON for scanning signal line and a minus-side voltage VEE for driving the scanning signal drive circuit are supplied from the scanning power supply circuit 11 to the scanning signal drive circuit 13. Either the ON potential or the OFF potential is supplied to respective scanning signal lines 30 from the scanning signal drive circuit in response to signals from the control circuit 12.

In a liquid crystal display panel 2, at crossing portions of the video signal lines 31 and the scanning signal lines 30, active elements are constituted for respective pixels. Typical examples are TFTs. Even with respect to MIMs, although there exist some differences including a major difference that video signal lines also function as reference electrodes and are formed on one substrate different from the other substrate on which scanning signal lines are formed, the MIMs can take the similar constitution. In case that the TFTs are adopted, by writing the video signals from the video signal lines 31 in the pixel electrodes through the TFTs when the ON potential is applied to the scanning signal lines 30 and thereafter by using the potential of the scanning signal lines 30 as the OFF potential, it becomes possible to hold the potential of the written video signals lines for a long time compared with the case in which the liquid crystal display panel 2 does not have the active elements. This potential is held by the liquid crystal capacitance generated between the scanning signal lines and the reference electrode.

Further, as a technique which improves such holding characteristics, there has been a technique which forms a region where the scanning signal line and the pixel electrode in the pre-stage are superposed each other by way of the insulation film thus constituting a so-called additional capacitance Cadd. There has been also known a technique which forms the reference signal lines or the reference electrode on the same substrate and forms regions where they are superposed with the pixel electrodes thus constituting the holding capacitance Cstg. The holding characteristics can be improved using either one or both of these methods.

Then, due to the potential difference between the potential written in the pixel electrodes and the reference electrode, the image display can be realized by modulating the optical characteristics of the liquid crystal.

Here, with respect to the scanning signal line drive circuit 13 of the liquid crystal display devices, for example, gate driver ICs which are constituted of semiconductor chips or gate drive circuits which are constituted of semiconductors having crystallinity such as polysilicon, crystalline silicon or the like mounted on the substrates, some of them may be constituted such that a gate OFF level VGOFF can be elevated only to the reference logic potential level VSS. Usually, the reference logic potential level is set to GND level. Accordingly, in the liquid crystal display device having such a constitution, the gate OFF level can be elevated only to the GND level, that is, to 0 V.

Accordingly, in the liquid crystal display device using the scanning signal line drive circuit having the constitution which holds the gate OFF level state after stopping the supplying of power to the liquid crystal display device, it is impossible to sufficiently release the charge stored in the pixel electrodes after stopping the supplying of power from the outside. This is because that it is impossible to bring the active elements into the complete ON state. In view of the above, the inventors have found a task that the effect to suppress the flickering at the time of interrupting the supplying of power or at the time of restarting the supplying of power becomes insufficient.

In view of the above, according to this embodiment, as shown in FIG. 43, the reference logic potential VSS of the scanning signal line drive circuit 13 is separated from the GND level and the reference logic potential is configured to be controllable so that the above-mentioned task can be solved. This control is realized by providing the gate OFF voltage control circuit between the scanning power supply circuit 11 and the scanning signal drive circuit 13. By controlling the reference logic potential of the scanning signal line drive circuit 13 in the above-mentioned manner, it becomes possible to elevate the gate OFF potential up to the ON potential of the TFT while holding the gate OFF potential to a value equal to or below the reference logic potential level so that the charge stored in the pixel electrodes of the liquid crystal display device can be released.

Figure 46:
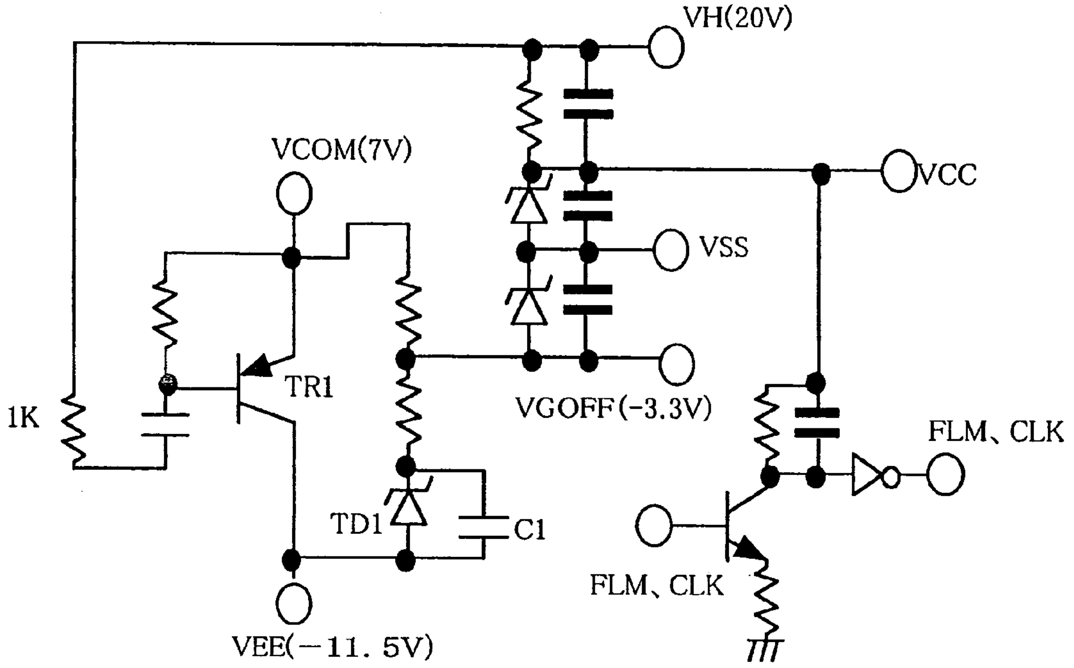
FIG. 46 is a view showing one embodiment of a circuit used in a liquid crystal display device according to the present invention.
Figure 47:
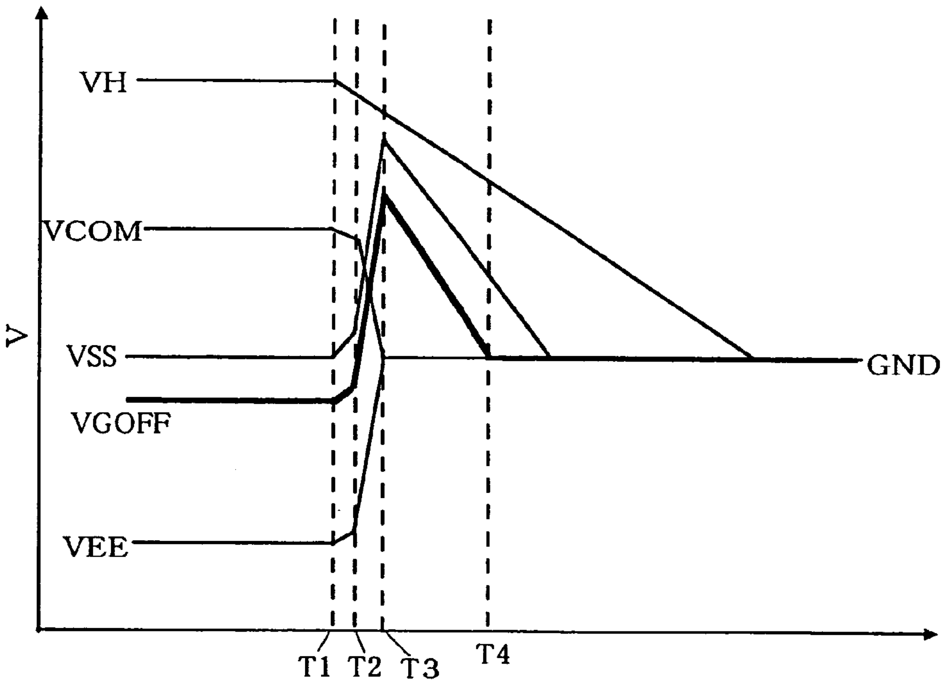
FIG. 47 is a schematic graph showing the fluctuation of potential of one embodiment of a liquid crystal display device according to the present invention.

FIG. 46 shows an example of the constitution of the gate OFF voltage control circuit shown in FIG. 43 and FIG. 47 is a schematic view which shows the transient characteristics of the potentials of essential portions of the circuit shown in FIG. 46 after the supplying of power is interrupted. When the supply of an external power is stopped at a point of time T1, the lowering of the potential VH is started. At a point of time T2, when the potential VH is lowered below a threshold value voltage of a transistor TR1 which is set between the potential VCOM and the potential VEE, the transistor becomes conductive so that the potential VCOM and the potential VEE are short-circuited so that the potential VEE rapidly approaches the GND level. At this point of time, since a Zener diode TD1 is interposed between the potential VEE and potential VGOFF, the VEE potential approaches the GND potential and, at the same time, the VGOFF potential is rapidly elevated and reaches the maximum value at a point of time T3. Here, it is preferable to provide a holding capacitance C1 in parallel with the Zener diode TD1.

Further, in this embodiment, Zener diodes are interposed between the potential VSS and the VGOFF as well as between the potential VSS and the VL. Accordingly, the potential VSS is always held at not less than potential VGOFF and hence, even with respect to the constitution which can elevate the gate OFF level VGOFF to only the reference logic potential VSS level, the state that the gate OFF level VGOFF is set to not less than GND level after stopping the supplying of power can be realized without collapsing such a condition so that the charge of the pixel electrodes can be released.

Here, it is needless to say that even when the level of the reference logic potential VSS of the scanning signal line drive circuit is always set to a fixed value which is substantially equal to the ON potential of the TFT, it becomes possible to obtain the advantageous effect of the present invention. However, from a viewpoint of the reduction of the power consumption, it is desirable that the reference logic potential level VSS takes the usual GND level, that is, 0 volt when power is supplied from the outside, reaches the state not less than the ON potential of the TFT after stopping of the supplying of power, and is converged to 0 V thereafter so that both of the reduction of the power consumption and the flicker reduction effect can be achieved.

The most important point in this embodiment is a concept of the voltage fluctuation shown in FIG. 47. That is, the non-selection potential VGOFF and the reference logic potential VSS of the liquid crystal display device exhibit the mountain-like characteristics that the non-selection potential VGOFF and the reference logic potential VSS are once elevated after the supplying of power from the outside to the liquid crystal display device is stopped and are lowered thereafter and the potential VSS is set to not less than the potential VGOFF. Accordingly, a case in which the potential VSS and the potential VGOFF exhibit the change in accordance with the concept shown in FIG. 47 is included in the category of this embodiment.

Although this embodiment discloses an example of the circuit constitution thereof in FIG. 46, it is needless to say that a case in which the same function is realized by other circuit is included in this embodiment. Further, although this embodiment has been explained by focusing on the liquid crystal display device which uses the gate driver ICs or the scanning signal line drive circuit which requires the potential VSS to be not less than the potential VGOFF, in a liquid crystal display device which uses gate driver ICs or a scanning signal line drive circuit which does not require such a condition, the non-selection potential VGOFF and the reference logic potential VSS of the liquid crystal display device may exhibit the mountain-like characteristics that the non-selection potential VGOFF and the reference logic potential VSS are once elevated after the supplying of power from the outside to the liquid crystal display device is stopped and are lowered thereafter. This case is also included in the category of this embodiment.

Embodiment 19

Followings are constitutions which make this embodiment different from the embodiment 18.

Figure 48:
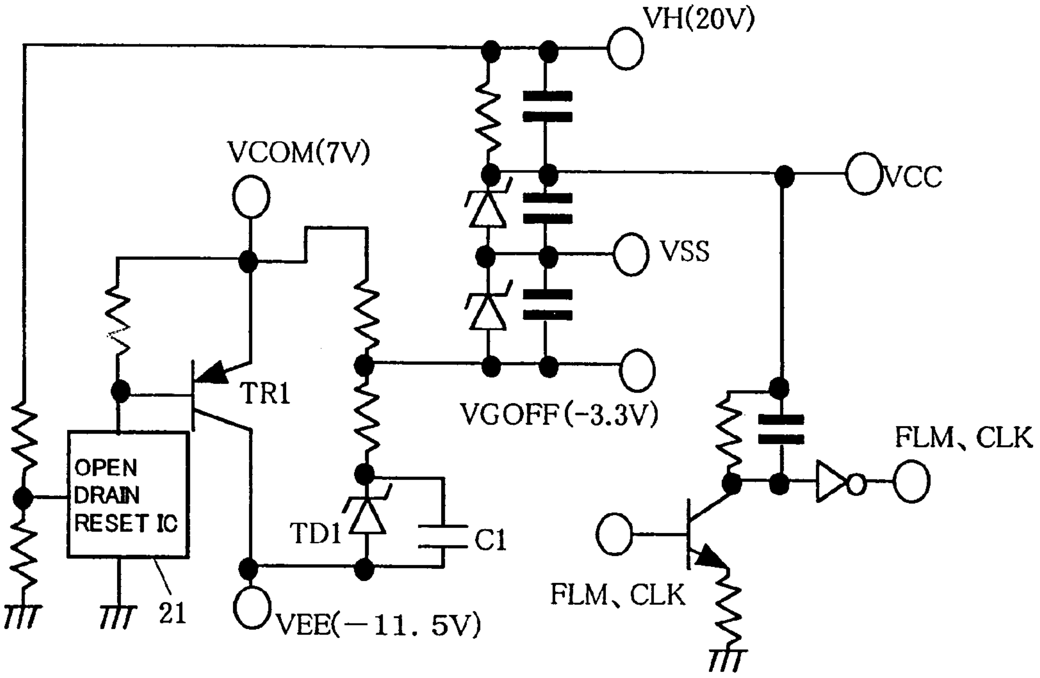
FIG. 48 is a view showing one embodiment of a circuit used in a liquid crystal display device according to the present invention.

FIG. 48 is a view which corresponds to FIG. 46 of the embodiment 18. In this embodiment, an open drain reset IC is provided between the potential VH and a transistor TR1 for performing the operation of the transistor TR1 in a more rapid and reliable manner.

Due to such a constitution, the time counted from the starting of the voltage drop of the potential VH to the turning ON of the transistor TR1 can be shortened in a reliable manner. Further, the constitution is not limited to the provision of the open drain reset IC. That is, this embodiment may be provided with a detection circuit for detecting the voltage drop and the transistor TR1 may be operated in response to the detected signal of the detection circuit.

Embodiment 20

Followings are constitutions which make this embodiment different from the embodiment 18.

Figure 49:
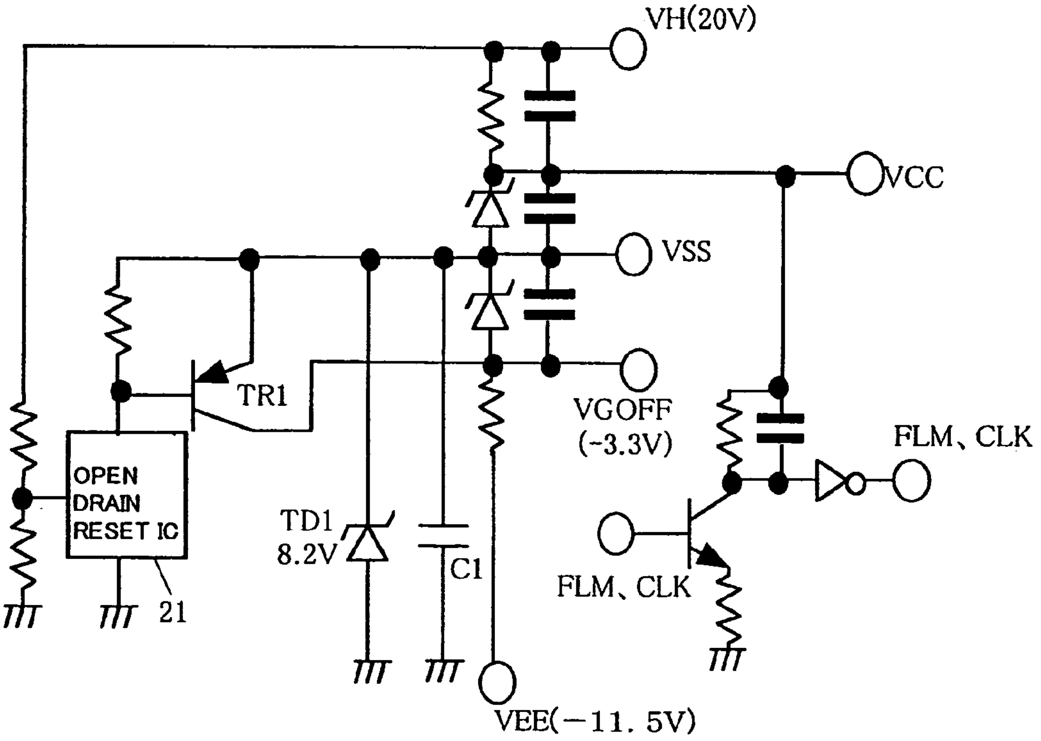
FIG. 49 is a view showing one embodiment of a circuit used in a liquid crystal display device according to the present invention.
Figure 50:
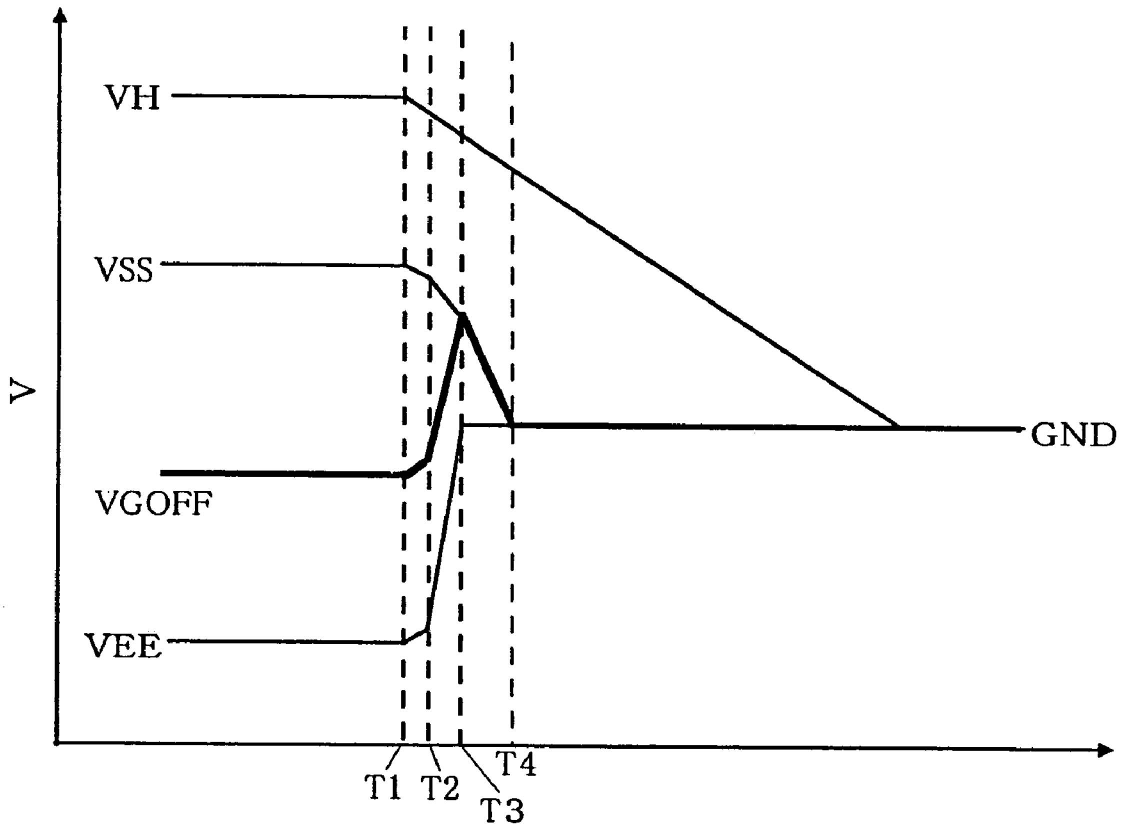
FIG. 50 is a schematic graph showing the fluctuation of potential of one embodiment of a liquid crystal display device according to the present invention.

FIG. 49 is a view which corresponds to FIG. 46 of the embodiment 18 and FIG. 50 is a view which corresponds to FIG. 47 of the embodiment 18. In this embodiment, the potential vss is preliminarily set as a value which is not less than the GND level during the operation. When a Zener diode TD1 of 8.2 V is used as shown in FIG. 49, the operational voltage at the time of supplying power is set to approximately 8.2 V. When the supplying of power from the outside is stopped at a point of time T1, the potentials VH and VSS start the lowering thereof and approach the GND potential. When an open drain reset IC senses the lowering of the potential VH at a point of time T2, the open drain reset IC changes an output potential thereof from High to Low.

Accordingly, the transistor TR1 immediately assumes the conductive state. An advantage brought about by the use of the open drain reset IC lies in that the time counted from the point of time T1 to the point of time T2 can be shortened or the output to the transistor TR1 is changed over with the potential difference from High to Low and hence, it is possible to surely bring the transistor TR1 into the ON state. It is needless to say that, as shown in FIG. 46, the transistor TR1 may be directly connected to the potential VH through a resistance component and a capacitor in place of the open drain reset IC. When the transistor TR1 becomes the conductive state at the point of time T2, the potential VGOFF and the potential VSS are short-circuited. As a result, the rearrangement of the charge between both potentials is generated and both potentials assume the same potential at a point of time T3.

Here, when the charge held by the potential VSS is insufficient, both of the potential VGOFF and the potential VSS immediately reach the GND potential level and hence, it is desirable that a storage capacitor C1 is arranged in parallel to a Zener diode TD1. With the provision of the capacitor C1, the potential VGOFF and the potential VSS, after they are short-circuited due to the storage charge, assume values which are not lower than the GND level and not higher than the original VSS level so that they can exhibit the mountain-like characteristics in the same manner as those shown in FIG. 47. Further, although the potential VGOFF reaches the same potential with the potential VSS, there is basically no possibility that the potential VGOFF exceeds the potential VSS so that the advantageous effect similar to that obtained by the embodiment 1 can be obtained.

Embodiment 21

To suppress the flickering which is generated at the time of cutting or restarting the supplying of power, it is sufficient to release the charge stored in pixel electrodes at the time of cutting the supplying of power. To release the charge, it is necessary to bring active elements into the ON state after the interruption of the supplying of power. Besides a method which elevates the potential of the scanning signal lines, it becomes possible to bring the active element into the ON state by lowering the potential of pixel electrodes by not less than a given value with respect to the potential of the scanning signal lines. This embodiment is an example to which the above concept is applied.

Figure 44:
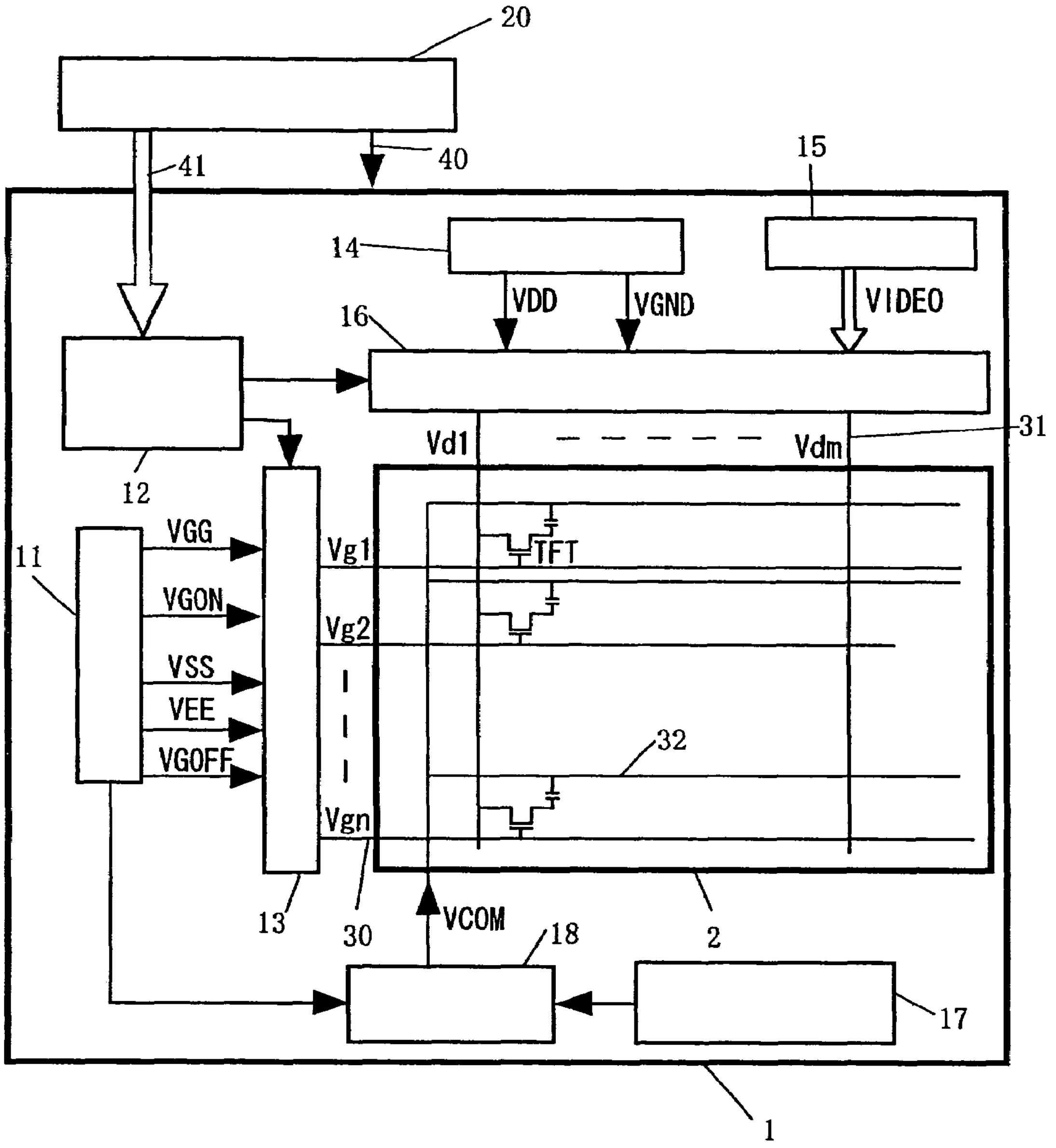
FIG. 44 is a conceptual view showing the constitution of one embodiment of a liquid crystal display device according to the present invention.
Figure 51:
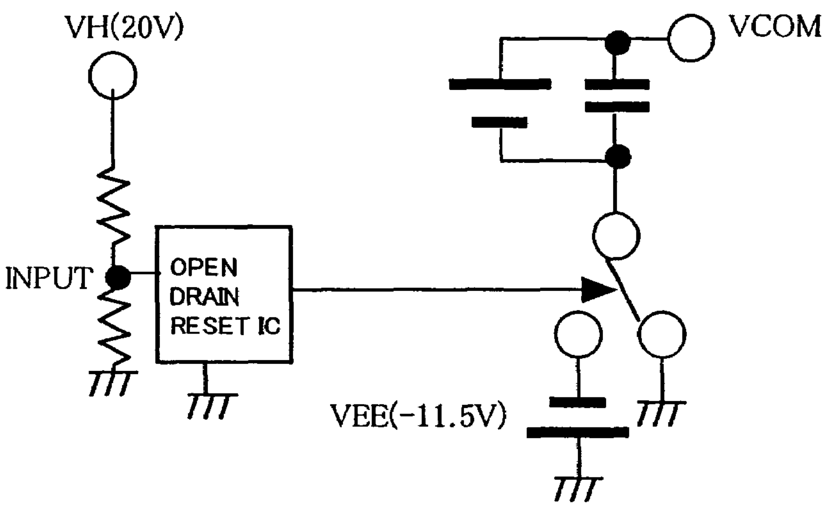
FIG. 51 is a conceptual view showing the constitution of one embodiment of a liquid crystal display device according to the present invention.
Figure 52:
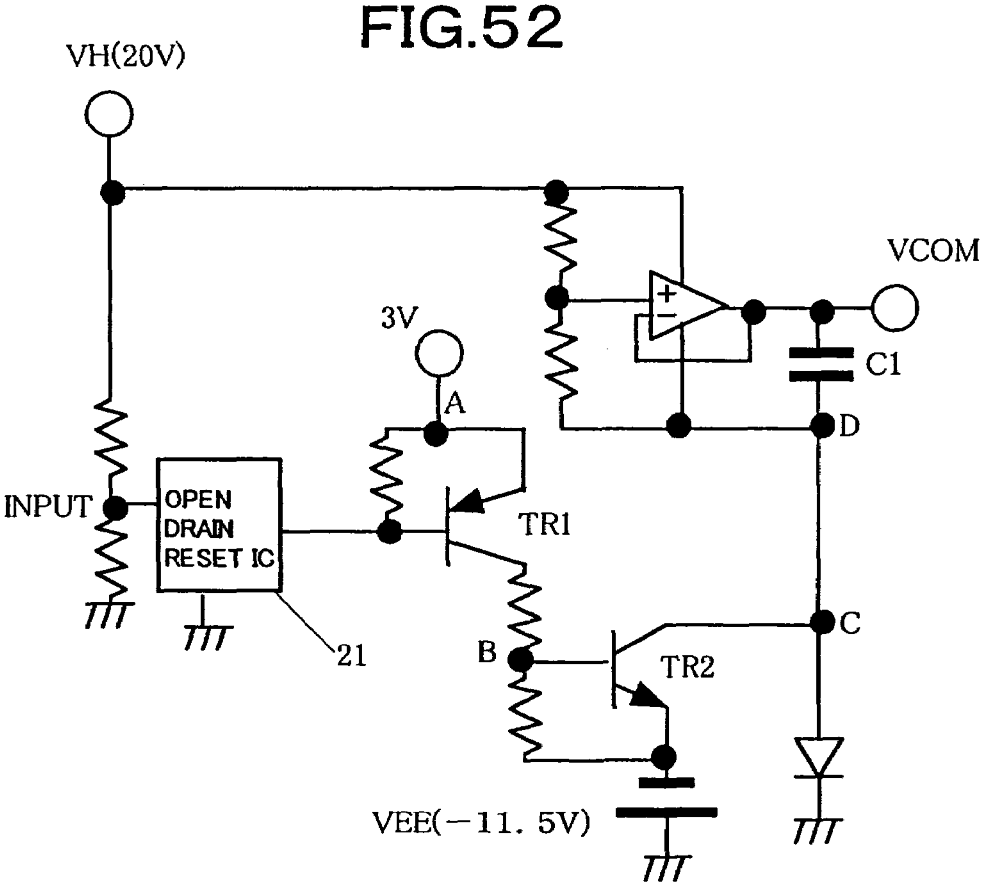
FIG. 52 is a view showing one embodiment of a circuit used in a liquid crystal display device according to the present invention.

Followings make this embodiment different from the embodiment 18. FIG. 44 is a view which corresponds to FIG. 43 of the embodiment 18. The greatest difference between the constitution of this embodiment shown in FIG. 44 and the constitution shown in FIG. 43 lies in that this embodiment is not provided with the gate OFF voltage control circuit 10 and is provided with a common voltage changeover circuit 18 in place of such a gate OFF voltage control circuit 10. FIG. 51 is a conceptual view of the common voltage changeover circuit 18. Here, a detection circuit senses the lowering of the potential VH brought about by the stopping of the supplying of power from the outside and the common voltage changeover circuit 18 changes over an output of the potential VCOM to a value at the usual state. An example of a more specific circuit diagram is shown in FIG. 52. The voltage drop of the potential VH is detected by the open drain reset IC 10 and the output thereof becomes Low. Accordingly, the transistor TR1 becomes the ON state. Then, the potential of a point B is short-circuited with the potential of a point A and hence, the potential of the point B is elevated so that the transistor TR2 is shifted to the ON state.

Accordingly, the potential of a point C becomes a value which is obtained by subtracting a voltage fluctuation amount at the transistor TR2 from the potential VEE. Since the potential of the point C and the potential VCOM are coupled through a capacitor C1, the potential VCOM is lowered by an amount which corresponds to the lowering of the potential at the point C. For example, when the potential VCOM is 4 V and the potential VEE is −11.5 V at the time of performing the operation, the minimum value at the time of performing no operation becomes −7.5 V at 4-11.5. Although the leaking from the circuit is generated simultaneously in the actual operation, with the use of the above-mentioned concept, the potential VCOM can be set to a negative value after stopping the supplying of power to the liquid crystal display device from the outside.

Here, the various liquid crystal display panels which are explained in conjunction with FIG. 16 to FIG. 27 of the embodiment 18 have a capacitive coupling between the reference electrode or the reference signal line to which the potential VCOM is applied and the pixel electrodes. Accordingly, by lowering the reference potential below the negative given value, the negative potential of the pixel electrodes can be lowered. Then, at the stage that the potential of the pixel electrodes is lowered below the potential of scanning signal lines by not less than a given value, a leaking amount of the charge from the TFT is increased so that the release of the charge stored in the pixel electrodes is realized.

The method of this embodiment may be combined with a method which sets the potential VGOFF to a value not less than the GND potential. In this case, the advantageous effect can be further enhanced. Further, the gist of this embodiment lies in the above-mentioned concept and it is needless to say that any constitutions which satisfy the concept are included in the category of this embodiment besides the constitutions described in the drawing 51 and the drawing 52.

Embodiment 22

To release the charge stored in the pixel electrodes, it is sufficient to bring the scanning signal lines into the selection state, that is, the state in which the TFTs are in the ON state. Usually, in the liquid crystal display device, the scanning signal lines are sequentially selected line by line for the purpose of writing given information to given pixels. Accordingly, to complete the selection of the full scanning signal lines, it takes one frame, that is, approximately 16.6 ms provided that the frame frequency is 60 Hz. Further, the time that one line is selected is a very short time of several μs to several tens μs. However, when the release of the charge of the pixel electrodes is sought, the charge can be released in a shorter time by selecting the full scanning signal lines simultaneously. Further, to surely release the charge of the pixel electrodes, it is preferable to continuously bring the scanning signal lines into the selective state so as to make the ON-state time longer than the usual operational state. This embodiment shows an example of the constitution which realizes this concept.

This embodiment differs from the embodiment 18 in the following constitution.

Figure 45:
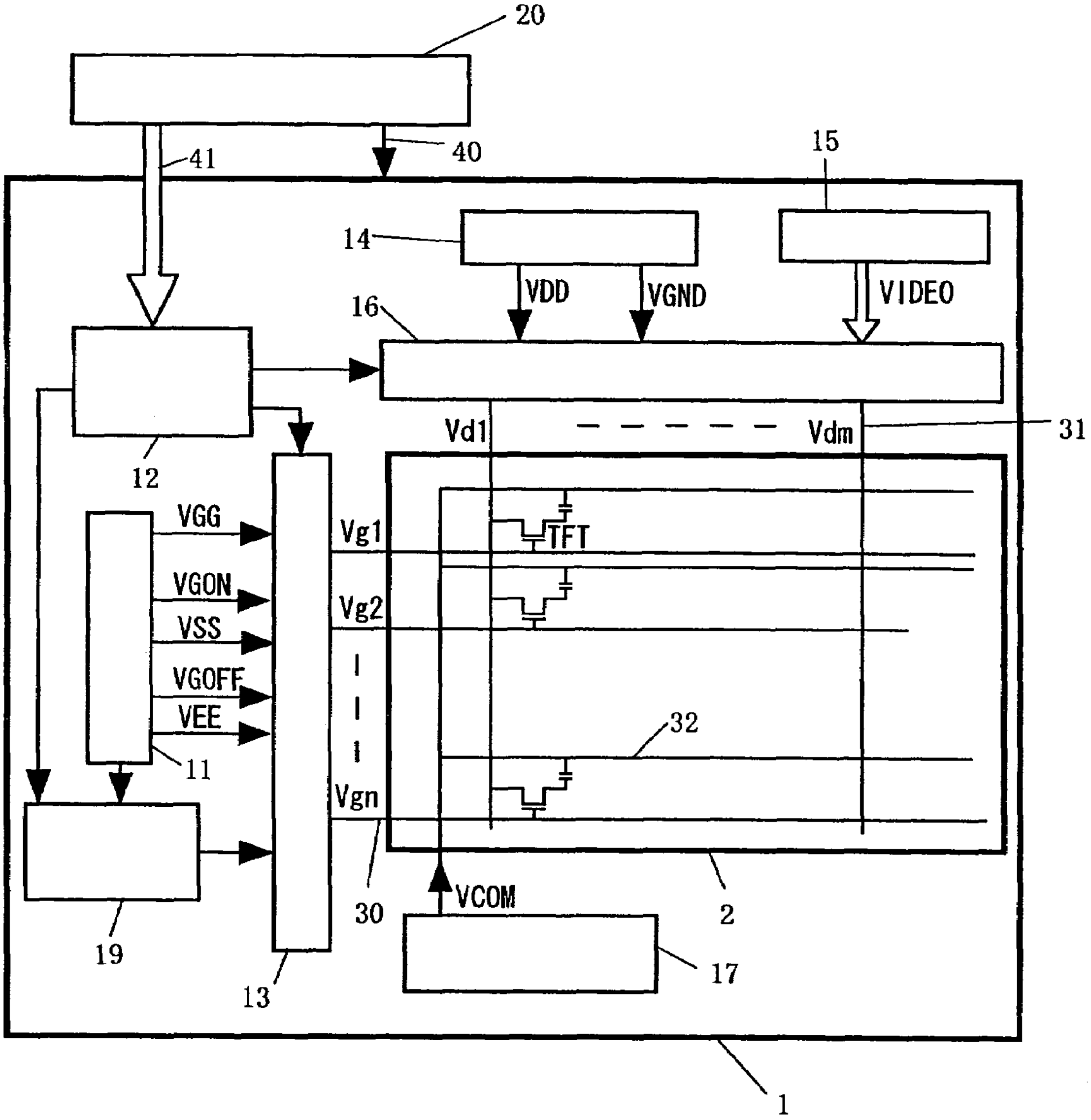
FIG. 45 is a conceptual view showing the constitution of one embodiment of a liquid crystal display device according to the present invention.

FIG. 45 is a view which shows this embodiment and corresponds to FIG. 1 which shows the first embodiment. This embodiment is characterized by providing a mode control circuit 19 in place of the gate OFF voltage control circuit 10 shown in FIG. 43.

Figure 53:
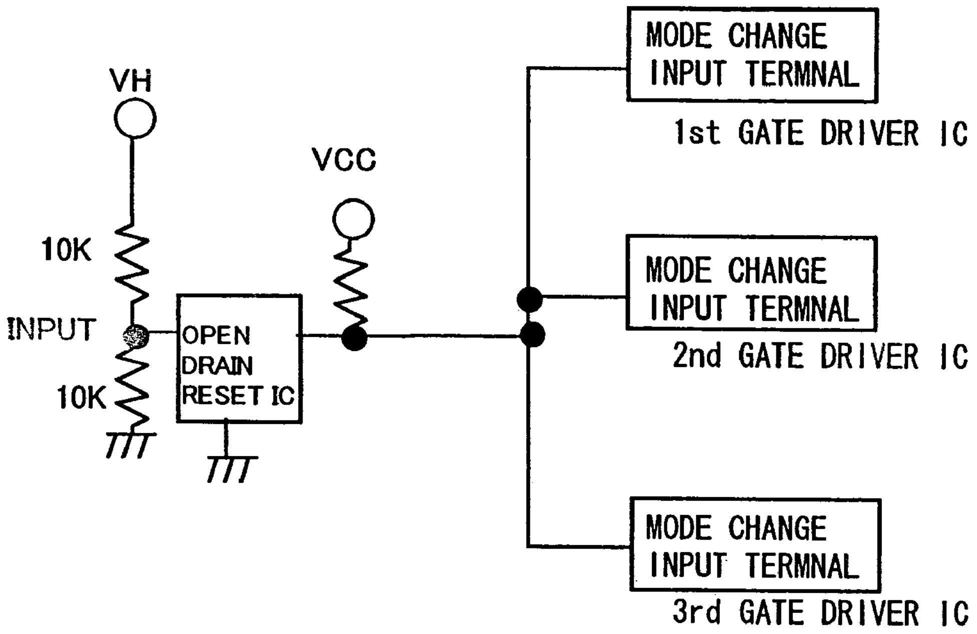
FIG. 53 is a conceptual view showing the constitution of one embodiment of a liquid crystal display device according to the present invention.

FIG. 53 is a conceptual view which shows the relationship between the mode control circuit and the respective scanning signal drive circuits. This embodiment is provided with a circuit which detects the lowering of the potential VH. For example, an open drain reset IC is provided as a mode control circuit. On the other hand, each scanning signal drive circuit which is constituted of a plurality of gate driver ICs includes mode changeover signal input terminals. Here, outputs of the mode control circuit are inputted to respective gate driver ICs in parallel.

In the usual operational mode in which power is supplied to the liquid crystal display device from the outside, a logic output from the mode control circuit is in the High state. At this point of time, the respective gate driver ICs perform the usual operation, that is, sequentially select the scanning signal lines line by line and perform the display of images. On the other hand, when the supplying of power from the outside is stopped, the potential VH is lowered and hence, the output of the mode control circuit becomes the Low state. Upon receiving this output, the respective gate drivers simultaneously select the full lines, that is, the voltage of potential VH is applied to the full lines. Accordingly, it becomes possible to bring all scanning signal lines into the High state so that the potential stored in the pixel electrodes can be released.

As the gate driver ICs, those ICs which have a function of changing over the mode between the usual operational mode and the full-line non-selection state have been commercialized as HD66343, for example. Accordingly, those ICs which have a function of changing over the state between the usual operational mode and the full-line selection state can be relatively easily manufactured. Further, as the mode changeover signal input terminals, the input terminals for the full-line non-selection terminals are used. These terminals can be also used as the pin arrangement. This is because that the change of the panel design becomes unnecessary. It is needless to say that the gate driver ICs may have a function of changing over three mode consisting of the full-line non-selection mode, the usual operation mode and the full-line selection mode. This is because that the ICs can be used for various purposes so that parts can be used in common.

Although the information from the control circuit 12 in FIG. 45 is not used in the concept shown in FIG. 53, it is needless to say that the concept may be constituted by using such information.

Embodiment 23

This embodiment differs from the embodiment 22 in the following constitution.

Figure 54:
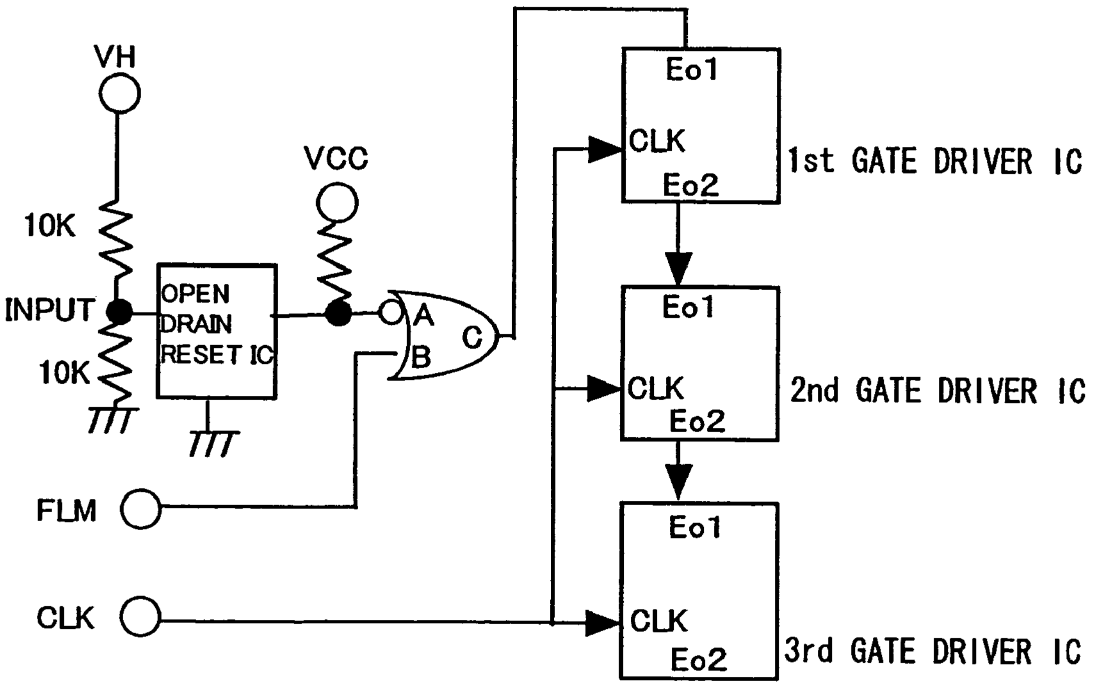
FIG. 54 is a conceptual view showing the constitution of one embodiment of a liquid crystal display device according to the present invention.

That is, this embodiment differs from the embodiment 22 in the constitution of the mode control circuit and the gate driver ICs. FIG. 54 is a conceptual view which corresponds to FIG. 53 of the embodiment 22. An output of the open drain reset IC is inputted to A of an AND type logic circuit. A first line marker FLM of a gate from the control circuit 12 of FIG. 45 is inputted to B of the AND type logic circuit. Here, the first line marker FLM is explained. The scanning signal drive circuit applies selection signal data corresponding to one line as the first line marker FLM and this is latched by a clock CLK and is transferred using a shift register whereby the selection of one line is realized.

In this embodiment, the gist of the constitution lies in that the first line marker FLM is controlled by the mode control circuit and an output C of the mode control circuit is inputted to the scanning signal drive circuit as the first line marker FLM. Accordingly, in this embodiment, the mode changeover signal input terminals for exclusive use which are provided in the embodiment 5 are not necessary in the scanning signal drive circuit and this embodiment is applicable to any scanning signal drive circuit or the gate driver ICs. The first line marker FLM is inputted to a FLM input terminal Eo1 of the first gate driver IC. Then, the first line marker FLM is successively inputted to the next gate driver IC by the FLM output terminal Eo2. The clock CLK is supplied in parallel to respective gate driver ICs from the control circuit 12.

Figure 55:
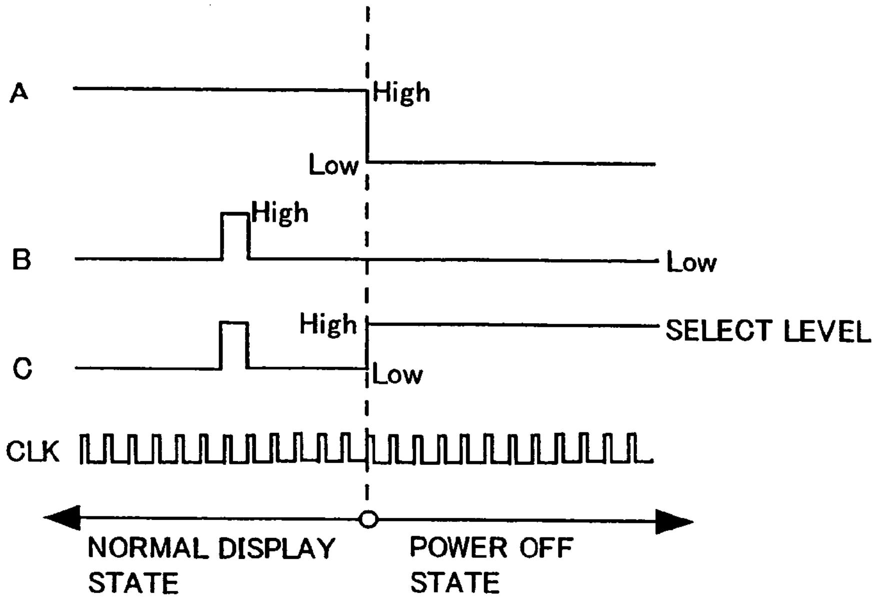
FIG. 55 is a schematic graph showing a logic of one embodiment of a liquid crystal display device according to the present invention.

First of all, the usual operational state is explained using FIG. 55 which is a conceptual view of an operation logic. Usually, the A point is in the High state. When the first line marker FLM corresponding to one line is inputted to the point B as High, an output of an AND logic circuit of the point C becomes High. When the first line marker FLM is Low, the output of the point C is also Low. As can be understood from the drawing, in the usual operational state, the logic of point B and the logic of point C are equal so that the first line marker FLM is not influenced by the presence of this AND logic circuit.

On the other hand, when the supplying of power to the liquid crystal display device from the outside is stopped, due to the function of the open drain reset IC which is brought about by the lowering of the potential VH, the logic of the point A becomes Low. Since the High signal does not enter as the first line marker FLM, the logic of the point B also becomes Low. As a result, the logic of the point C continuously becomes the High state.

Various signals and the clock supplied to the video signal line drive circuit and the scanning signal line drive circuit in the inside of the liquid crystal display device are fed from the control circuit 12 (usually referred to as TCON:TFT controller) shown in FIG. 45. The TCON is roughly classified into two kinds wherein one stops the output irrespective of the power supply when the input signals are stopped and the other which enters a self-running mode which generates existing signals or clocks when the input signals are stopped. This embodiment adopts the latter TCON which has the self-running mode.

In the control circuit of this type, even after the supplying of power is stopped, it is possible to make given clocks or signals oscillated until the potential of power for operation is lowered to a value equal to or below the operable potential. The length of time which enables such an oscillation can be set to a desired value of several ms to several seconds by providing a capacitor to the power supply which supplies power to the control circuit. Accordingly, in this embodiment, the control circuit adopts the constitution which oscillates the clock CLK in the self-running mode.

Accordingly, since the first line marker FLM continuously becomes High, that is, the selection potential, the number of scanning signal lines in the selection state can be increased for every clock CLK so that the selection state of all lines can be realized eventually.

Further, the role of the clock after the interruption of the supplying of power is only to realize the full-line selection state and hence, the frequency can be changed from that of the usual operational state. Particularly, when the frequency of the clock CLK is increased in the self-running mode compared with the frequency of the clock CLK in the usual operation mode, the time until the full line selection is achieved can be further reduced.

Further, the TCON having the self-running mode per se may have the function of bringing the first line marker FLM into the High state after the interruption of the supplying of power. In this case, the mode control circuit 19 becomes unnecessary so that the reduction of the cost can be realized.

Embodiment 24

Usually, a group of scanning signal line drive circuits or gate driver ICs are, as shown in FIG. 54, constituted such that a selection signal output terminal Eo2 and a selection signal input terminal Eo1 of a next stage are connected in a cascade connection. This embodiment is characterized in that different groups of scanning signal drive circuits or gate driver ICs are simultaneously driven by providing a changeover element to a cascade connection portion.

Figure 56:
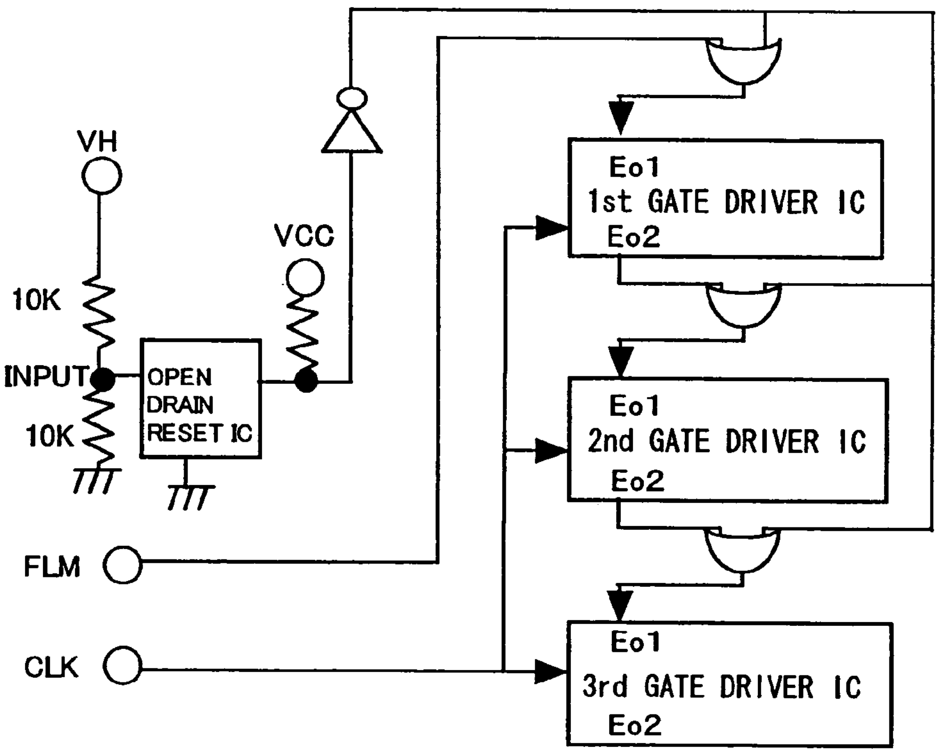
FIG. 56 is a conceptual view showing the constitution of one embodiment of a liquid crystal display device according to the present invention.

FIG. 56 is a view which corresponds to FIG. 54 of the embodiment 23. An OR logic is arranged between respective gate driver ICs, wherein one logic input is connected to the output Eo2 of the gate driver IC of a preceding stage and the other logic input is connected to the mode control circuit. To the first gate driver IC, the first line marker FLM is inputted in place of the output Eo2. The mode control circuit is provided with, for example, a logic inversion circuit of NOT type behind the open drain reset IC. That is, the mode control circuit is configured such that when the output of the open drain IC is High, the output of the mode control circuit becomes Low, while when the output of the open drain IC is Low, the output of the mode control circuit becomes High.

In the usual operational mode, Low is always applied to one end of the OR logic and the first line marker FLM is applied to the other end of the OR logic. Since the major portion of the first line marker FLM is usually Low, the output of the OR logic is also Low. Only when a High pulse is applied to the first line marker FLM, the output of the OR logic also becomes High. Accordingly, in the usual operational state, the input to the input terminal Eo1 is as same as the input to the input terminal Eo1 when the line between the gate driver ICs is connected in a cascade connection.

Subsequently, when the supplying of power to the liquid crystal display device from the outside is stopped, the lowering of the potential VH is sensed and the output of the open drain IC becomes Low. Accordingly, the High signal is inputted to the OR logic through the NOT logic. Since the first line marker FLM is Low, the output of the OR logic, that is, the input to the input terminal Eo1 of respective gate driver ICs becomes high. As has been explained with respect to the embodiment 23, in the liquid crystal display device using the TCON which uses the self-running mode, it becomes also possible to oscillate the clock CLK for a fixed time even after the stopping of the supplying of power. Accordingly, the respective gate drivers IC are operated in parallel and the scanning signal lines in the selection state are increased in number for every inputting of clock so that the full selection state can be obtained.

In this embodiment, the respective gate driver ICs or the group of scanning signal line drive circuits are operated in parallel after the stopping of the supplying of power. Accordingly, when the number of the gate driver ICs is three, for example, it becomes possible to reduce the time until the full selection state is obtained to ⅓ of the corresponding time of the embodiment 23, while when the number of the gate driver ICs is six, for example, it becomes possible to reduce the time until the full selection state is obtained to ⅙ of the corresponding time of the embodiment 23. Accordingly, the potential of the pixel electrodes can be more rapidly released. At the same time, this implies that the operation continuation time of the TCON after the interruption of the supplying of power may be shortened so that when a capacitor which supplies the potential for operating the TCON after the interruption of the supplying of power is provided, the capacitance can be reduced so that the low power consumption can be realized by an amount that the electric power stored in the capacitor is reduced.

Embodiment 25

To release the charge of pixel electrodes more reliably, it is desirable to make a voltage applied to video signal lines at the time of interrupting the supplying of power to a liquid crystal display device from the outside have the same potential as a potential VCOM. This is because that the storage of new charge to the pixel electrodes can be prevented.

Figure 57:
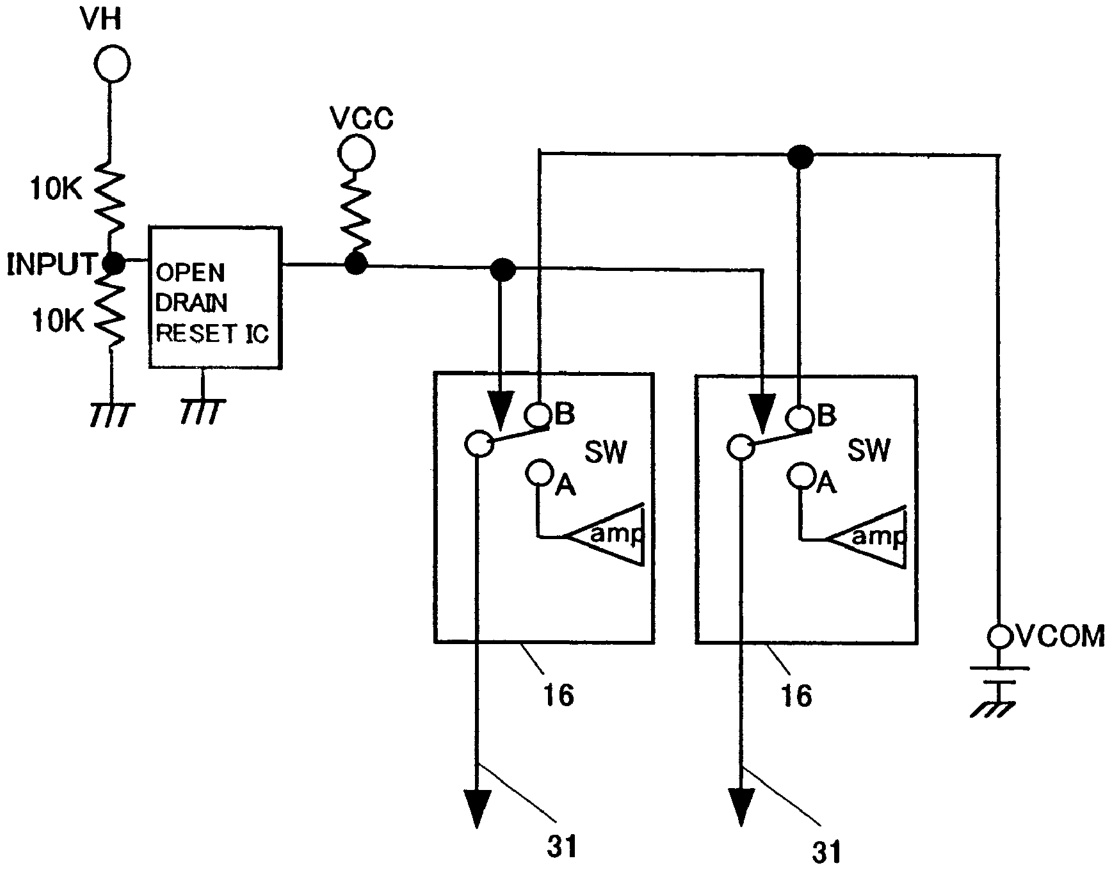
FIG. 57 is a conceptual view showing the constitution of one embodiment of a liquid crystal display device according to the present invention.

FIG. 57 is a conceptual view of this embodiment. Mode changeover switches SW are provided in the inside of respective video signal drive circuits 16. In the usual operational mode, outputs of the video signal drive circuits 16 to video signal lines 31 are connected to A sides of the mode changeover switches SW, that is, an image display circuit in a video signal drive circuit, for example, an output amplifier or the like. On the other hand, at the time of interrupting the supplying of power to the liquid crystal display device from the outside, the logic of an output signal from a detection circuit which is constituted of an open drain reset IC is inverted. Accordingly, the mode changeover switches SW in the inside of the video signal drive circuits 16 are changed over to B sides. Since the VCOM potential is supplied to the B sides, the potential VCOM is supplied to the video signal lines at the time of stopping the supplying of power.

Further, the GND potential may be used as the voltage inputted to the B sides. In this case, the charge in the inside of the pixel electrodes can be more rapidly released. Alternatively, the neighboring video signal lines may be short-circuited or a given potential may be inputted to the B sides.

Further, the technique of this embodiment may be combined with a technique which brings the scanning signal lines into the selective state after stopping the supplying of power to the liquid crystal display device from the outside such as, for example, the technique which is disclosed in the embodiments 18 to 24 or the like. In this case, the release of the charge in the inside of the pixels can be performed more rapidly and reliably.

Further, the potential which is at the same level as the potential VCOM may be written in the pixels before stopping the supplying of power.

Further, in the techniques disclosed in the above-mentioned embodiments 18 to 25, since the operational mode is different from the usual operational mode, there arises a problem that the irregularities are generated between respective pixels in the process of releasing the charge from the pixel electrodes. Accordingly, it is preferable to stop the oscillation of the inverter which supplies power to the backlight immediately after the stopping of the supplying of power to the liquid crystal display device from the outside.

Further, by combining this embodiment with one or a plurality of embodiments 18 to 25, the advantageous effect can be further enhanced.

Embodiment 26

This embodiment is characterized by constituting an image display device which can prevent the generation of flickering even when power is supplied again in a short time after the interruption of the supplying of power by using the liquid crystal display device of any one of the embodiments 18 to 25 as a liquid crystal display device.

An example of the liquid crystal display device which has been explained in the embodiments 18 to 26 and is constituted in a liquid crystal monitor mode is shown in FIG. 28. An example of the liquid crystal display device which is constituted in a notebook type personal computer mode is shown in FIG. 29. An example of the liquid crystal display device which is constituted in a liquid crystal television set mode is shown in FIG. 30. Further, the image display device may be constituted in other mode such as a PDA mode or a liquid-crystal-integral-type personal computer mode besides the above-mentioned modes.

Any one of the devices of this embodiment is characterized by having a power supply switch 90 in the same manner as the embodiments 1 to 17. Due to such a provision, it becomes possible for a user to repeat the interruption and the restarting the supplying of power in a short time and hence, on the contrary, with the use of the any one of the liquid crystal display devices described in the embodiments 1 to 8, it becomes necessary to prevent the generation of flickering at the time of interrupting or restarting the supplying of power.

Embodiment 27

FIG. 31 shows the manner of supplying power to the liquid crystal display device 1 of the image display device shown in the embodiment 9. In a housing 92, the liquid crystal display device 1, a control circuit 93, a power supply circuit 94 and the power supply switch 90 are provided. The control circuit 93 and the power supply circuit 94 constitute the system circuit indicated by numeral 20 in FIG. 1 when viewed with reference to the liquid crystal display device 1. A voltage with which the power supply circuit is compatible is supplied to the power supply circuit from an external power supply 96 irrespective of whether the voltage is AC or DC.

In this constitution, the signals are inputted to the control circuit 93 from the external CPU 95 and the power supply circuit 94 is instructed by the control circuit 93 to supply power to the liquid crystal display device 1 or to interrupt such a supplying of power.

Further, from a viewpoint of the reduction of the unnecessary power consumption, the control circuit 93 is provided with a function of stopping the supplying of power to the liquid crystal display device 1 when there is no inputting of signals from a CPU for a fixed time. Accordingly, the control circuit 93 is configured to perform the interruption of the supplying of power and the restarting of the supplying of power relatively frequently and hence, the countermeasures to cope with the flickering generated in the process becomes further necessary.

Further, with respect to a recent CPU device, when there is no manipulation of an inputting device by a user for a fixed time, from a viewpoint of the low power consumption, a function to instruct the control circuit to shift the operation mode to the low power consumption mode is incorporated in the CPU device on an OS level in advance while centering around a so-called WINDOWS-system OS. Upon receiving the instruction to shift the operation mode to the low power consumption mode which is generated here, the control circuit 93 instructs the interruption to the power supply circuit 94. Particularly, with respect to the power saving function which is incorporated into the CPU device in an OS level, along with the spreading of the personal computers to users of all walks of life, users who do not know the manner of changing the setting time are increasing in number.

These users are usually instructed to move a mouse when a monitoring disappears during operation. In such a case, they tend to promptly turn on the monitor again by moving a mouse when the screen disappears during the manipulation. Here, when the supplying of power to the liquid crystal display device 1 from the power supply circuit 94 is interrupted, the power is immediately supplied to the monitor again. Accordingly, the situation in which the flickering frequently occurs becomes the usual mode of operation. Further, from a viewpoint of the low power consumption, a trend in which the setting time until the CPU outputs an instruction to shift the operation mode to the low power consumption mode is required to be shortened will arise. The inventors are afraid this trend further accelerate the situation that the flickering frequently occurs in the usual mode of operation.

To cope with such a problem, the inventors have realized the use of the liquid crystal display devices of the present invention described in the embodiments 1 to 9 as the liquid crystal display device of the image display device. With the use of such liquid crystal display device, it becomes possible to meet the further demand for the low power consumption of the image display device.

Further, the power supply switch 90 may be constituted of a software switch and an example of the software switch is shown in FIG. 32.

The power supply switch is irrelevant to the flickering due to the interruption or the restarting of the supplying of power which is generated by the combination of the low power consumption mode shifting instruction from the CPU and the manipulation by the user and hence, the power supply switch may be eliminated as shown in FIG. 33.

Further, as shown in FIG. 34, the CPU1 may be constituted in the inside of the housing 92.

Still further, as shown in FIG. 35, a battery 97 may be incorporated into the inside of the housing 92.

The active elements in the inside of the pixels used in the embodiments 1 to 10 include MIMs besides the TFTs. In case the active elements are TFTs, they include the TFTs whose semiconductors layers are formed of amorphous silicon, the TFTs whose semiconductors layers are formed of polysilicon and the TFTs whose semiconductors layers are formed of crystalline silicon which is similar to single crystal.

The above-mentioned embodiments show only an example of the mode for carrying out the present invention and it is needless to say that the present invention should be construed based on the concepts disclosed in this specification including claims.

As has been described heretofore, according to the liquid crystal display device of the present invention, the generation of the flickering at the time of restarting the supplying of power after stopping the supplying of power can be prevented. Further, the present invention can also realize the image display device which uses the thin and light-weighted liquid crystal display device which can prevent the generation of the flickering at the time of restarting the supplying of power after stopping the supplying of power.

What is claimed is:

1. A liquid crystal display device comprising:

first and second substrates having a liquid crystal layer therebetween;

a plurality of scanning signal lines and a plurality of video signal lines formed on the first substrate;

a plurality of thin film transistors formed proximate to a crossing point of the scanning signal lines and video signal lines; and pixel electrodes connected to the scanning signal lines and the video signal lines through the thin film transistors;

a light shielding layer formed on the second substrate and overlapped with at least one thin film transistor and with at least one signal line of the scanning signal lines and the video signal lines in plane view;

wherein the light shielding layer has a first aperture region and a second aperture region, the first aperture region being formed over at least one of the pixel electrodes and the second aperture region being formed proximate to the at least one thin film transistor and formed within the at least one signal line in plane view.

2. A liquid crystal display device according to claim 1, wherein the at least one signal line is scanning signal line.

3. A liquid crystal display device according to claim 2, wherein the second aperture region has a rectangular shape.

4. A liquid crystal display device according to claim 3, wherein one edge of the second aperture region is parallel with at least one edge of the scanning signal line.

5. A liquid crystal display device according to claim 1, wherein the second aperture region has rectangular shape.

6. A liquid crystal display device according to claim 5, wherein one edge of the second aperture region is parallel with one edge of the at least one signal line.

* * * * *